United States Patent
Roy et al.

(10) Patent No.: US 11,008,717 B2
(45) Date of Patent: May 18, 2021

(54) SAFETY TRUCK ATTACHMENTS, AND METHODS OF SAFETY TRUCK USE

(71) Applicants: Robert H Roy, Emmaus, PA (US); Andrew Washburn, Coopersburg, PA (US); Joseph T Piggott, Easton, PA (US); Siddharth Balasubramanian, Bethlehem, PA (US)

(72) Inventors: Robert H Roy, Emmaus, PA (US); Andrew Washburn, Coopersburg, PA (US); Joseph T Piggott, Easton, PA (US); Siddharth Balasubramanian, Bethlehem, PA (US)

(73) Assignee: Royal Truck & Equipment, Inc.

( * ) Notice: Subject to any disclaimer, the term of this patent is extended or adjusted under 35 U.S.C. 154(b) by 0 days.

(21) Appl. No.: 16/427,242

(22) Filed: May 30, 2019

(65) Prior Publication Data

US 2019/0330811 A1    Oct. 31, 2019

Related U.S. Application Data

(63) Continuation-in-part of application No. 16/159,813, filed on Oct. 15, 2018, now Pat. No. 10,801,169, (Continued)

(51) Int. Cl.
*B60R 9/048* (2006.01)
*E01F 9/70* (2016.01)
(Continued)

(52) U.S. Cl.
CPC .............. *E01F 9/70* (2016.02); *B60K 20/02* (2013.01); *B60P 3/14* (2013.01); *B60Q 7/02* (2013.01);
(Continued)

(58) Field of Classification Search
CPC ... E01F 9/70; E01F 9/662; G08G 1/09; G08G 1/07; G08G 1/095; G08G 1/0955;
(Continued)

(56) References Cited

U.S. PATENT DOCUMENTS

| 3,157,267 A | 11/1964 | Asbury | 198/7 |
| 3,232,408 A | 2/1966 | Asbury | 198/7 |

(Continued)

FOREIGN PATENT DOCUMENTS

| WO | WO 94/16150 | 7/1994 | ........... E01F 9/01 |
| WO | WO 99/40554 | 8/1999 | |

(Continued)

*Primary Examiner* — Hoi C Lau
(74) *Attorney, Agent, or Firm* — David A. Burge

(57) ABSTRACT

Embodiments of safety trucks incorporate multiple connection points to which a variety of attachments, or combinations of attachments, can be releasably and interchangeably coupled to enable their use with increased effectiveness to safeguard roadway construction, maintenance and repair personnel as they perform tasks within or relatively near to roadway workzones and worksites. Also, methods of operation of the safety truck embodiments enhance their ability to guard and protect roadway construction, maintenance and repair personnel while they work within or relatively near to roadway workzone and worksite locations.

27 Claims, 43 Drawing Sheets

Related U.S. Application Data which is a continuation-in-part of application No. 16/132,376, filed on Sep. 15, 2018, now Pat. No. 10,556,545, which is a continuation-in-part of application No. 15/913,562, filed on Mar. 6, 2018, now Pat. No. 10,319,227, which is a continuation-in-part of application No. 15/197,685, filed on Jun. 29, 2016, now abandoned.

(60) Provisional application No. 62/780,909, filed on Dec. 17, 2018, provisional application No. 62/638,818, filed on Mar. 5, 2018, provisional application No. 62/631,840, filed on Feb. 18, 2018, provisional application No. 62/186,036, filed on Jun. 29, 2015.

(51) Int. Cl.

| | | |
|---|---|---|
| *E01F 9/688* | (2016.01) | |
| *E01F 15/14* | (2006.01) | |
| *B62D 33/06* | (2006.01) | |
| *B62D 33/02* | (2006.01) | |
| *B62D 39/00* | (2006.01) | |
| *B60R 21/34* | (2011.01) | |
| *B60R 1/00* | (2006.01) | |
| *B60R 9/02* | (2006.01) | |
| *B60R 9/06* | (2006.01) | |
| *B62D 21/09* | (2006.01) | |
| *B60R 3/00* | (2006.01) | |
| *B60Q 7/02* | (2006.01) | |
| *B60P 3/14* | (2006.01) | |
| *F16F 7/00* | (2006.01) | |
| *B60K 20/02* | (2006.01) | |

(52) U.S. Cl.
CPC .............. *B60R 1/002* (2013.01); *B60R 3/005* (2013.01); *B60R 9/02* (2013.01); *B60R 9/06* (2013.01); *B60R 21/34* (2013.01); *B62D 21/09* (2013.01); *B62D 33/02* (2013.01); *B62D 33/06* (2013.01); *B62D 39/00* (2013.01); *E01F 15/148* (2013.01); *F16F 7/003* (2013.01); *B60R 2021/343* (2013.01)

(58) Field of Classification Search
CPC ........ B60W 30/08; B60R 11/06; B60R 1/002; G09F 27/005; B60P 3/14; G01L 19/08
See application file for complete search history.

(56) References Cited

U.S. PATENT DOCUMENTS

| | | | | |
|---|---|---|---|---|
| 3,709,178 A * | 1/1973 | Piker | ............ | B63B 35/732 114/61.33 |
| 3,733,096 A | 5/1973 | Kassbohrer | ............ | B60R 19/10 293/63 |
| 3,761,890 A * | 9/1973 | Fritts | ............ | G08G 1/096791 340/473 |
| 3,772,811 A * | 11/1973 | Alsup | ............ | B60Q 7/005 40/592 |
| 3,776,400 A | 12/1973 | Schwartz | ............ | B62D 33/08 214/38 |
| D229,784 S | 1/1974 | Carter | ............ | D29/2 |
| 3,788,268 A | 1/1974 | Hiatt et al. | ............ | 116/28 |
| 3,907,353 A | 9/1975 | Dinitz | ............ | B60R 21/14 293/81 |
| 3,952,690 A | 4/1976 | Rizzo et al. | ............ | E01F 9/01 116/63 |
| D243,073 S | 1/1977 | Kulp et al. | ............ | D10/109 |
| D243,075 S | 1/1977 | Kulp et al. | ............ | D10/109 |
| 4,008,915 A | 2/1977 | Walker | ............ | B60R 19/04 293/60 |
| 4,083,033 A | 4/1978 | Kulp et al. | ............ | E01F 9/00 340/114 |
| 4,152,854 A * | 5/1979 | Berry, Jr. | ............ | E01F 9/662 40/550 |
| 4,190,275 A | 2/1980 | Mileti | ............ | B60R 19/04 293/102 |
| 4,190,276 A | 2/1980 | Hirano et al. | ............ | B60R 19/06 293/133 |
| 4,219,141 A * | 8/1980 | Lovy | ............ | E01F 9/70 116/28 R |
| 4,259,660 A * | 3/1981 | Oliver | ............ | B60Q 1/2611 116/40 |
| 4,272,114 A | 6/1981 | Hirano et al. | ............ | B60R 19/04 293/133 |
| 4,319,778 A | 3/1982 | Leonard et al. | ............ | B60P 3/34 296/166 |
| 4,321,989 A | 3/1982 | Meinzer | ............ | F16F 7/12 188/377 |
| 4,597,706 A * | 7/1986 | Michit | ............ | E01F 9/688 414/788.2 |
| 4,635,981 A | 1/1987 | Friton | ............ | B60R 19/02 293/1 |
| 4,642,007 A | 2/1987 | Marshall et al. | ............ | B62D 23/00 410/78 |
| 4,658,941 A | 4/1987 | Gottwald et al. | ............ | F16F 7/12 188/377 |
| 4,674,431 A | 6/1987 | Cory | ............ | G08B 23/00 116/63 |
| 4,710,053 A | 12/1987 | Kulp et al. | ............ | E01F 9/00 404/9 |
| 4,711,481 A | 12/1987 | Krage et al. | ............ | B60R 19/34 293/133 |
| 4,747,515 A | 5/1988 | Kasher et al. | ............ | B65G 59/06 221/116 |
| 4,770,420 A | 9/1988 | Gottwald et al. | ............ | B60R 19/22 293/104 |
| 4,879,549 A * | 11/1989 | Eby | ............ | G09F 9/307 340/815.73 |
| 4,925,334 A | 4/1990 | Beard | ............ | E01F 9/10 404/9 |
| 4,973,190 A | 11/1990 | Erwin et al. | ............ | E01F 9/00 404/10 |
| 5,010,319 A * | 4/1991 | Killinger | ............ | B60Q 1/2611 340/472 |
| 5,052,732 A | 10/1991 | Oplet et al. | ............ | B60R 19/26 293/102 |
| 5,054,648 A | 10/1991 | Luoma | ............ | B65G 65/18 221/185 |
| 5,080,541 A * | 1/1992 | Andre | ............ | B60P 3/08 410/24.1 |
| 5,097,612 A * | 3/1992 | Williams | ............ | E01F 9/662 116/28 R |
| 5,190,337 A | 3/1993 | McDaniel | ............ | B60P 3/00 296/3 |
| 5,199,755 A | 4/1993 | Gertz | ............ | B60R 19/04 293/120 |
| 5,201,599 A | 4/1993 | Kulp et al. | ............ | E01F 13/00 404/6 |
| 5,208,585 A | 5/1993 | Sprague | ............ | E01F 15/086 116/63 |
| 5,209,540 A | 5/1993 | Metler | ............ | B60P 3/42 296/3 |
| 5,213,464 A | 5/1993 | Nicholson et al. | ............ | B65G 59/06 414/440 |
| 5,231,393 A | 7/1993 | Strickland | ............ | G08G 1/01 340/936 |
| 5,234,280 A | 8/1993 | Cowan | ............ | E01F 9/00 404/6 |
| 5,244,334 A * | 9/1993 | Akita | ............ | E01F 9/70 414/502 |
| 5,248,129 A | 9/1993 | Gertz | ............ | B60R 19/34 256/13.1 |
| 5,251,999 A * | 10/1993 | McCracken | ............ | E01C 23/06 404/109 |
| 5,403,112 A | 4/1995 | Carney, III | ............ | F01F 13/00 404/6 |

(56) References Cited

U.S. PATENT DOCUMENTS

| | | | | |
|---|---|---|---|---|
| 5,433,026 A * | 7/1995 | McDermott | G09F 21/04 | 248/292.14 |
| 5,435,662 A * | 7/1995 | Brown | E01C 23/06 | 116/63 C |
| 5,438,780 A * | 8/1995 | Winner | G09F 7/18 | 160/370.22 |
| 5,476,301 A | 12/1995 | Berkich | B60P 3/00 | 296/3 |
| 5,525,021 A * | 6/1996 | Larguier | E01F 9/70 | 414/551 |
| 5,535,775 A * | 7/1996 | Blaine | B65H 75/44 | 137/355.17 |
| 5,642,792 A | 7/1997 | June | F16F 7/12 | 188/377 |
| 5,649,730 A * | 7/1997 | Ramos | B60R 13/005 | 296/21 |
| 5,697,657 A | 12/1997 | Unrath, Sr. | B60R 19/38 | 293/118 |
| 5,846,045 A | 12/1998 | Johnson et al. | B60R 9/00 | 414/462 |
| 5,868,520 A | 2/1999 | Kulp et al. | E01F 13/00 | 404/6 |
| 5,905,434 A | 5/1999 | Steffan | B60Q 1/50 | 116/28 |
| 5,947,452 A | 9/1999 | Albritton | B60R 19/34 | 256/13.1 |
| 6,019,542 A | 2/2000 | Bent et al. | E01F 13/02 | 404/6 |
| 6,024,341 A | 2/2000 | Gertz | A01K 3/00 | 256/13.1 |
| 6,056,498 A * | 5/2000 | Velinsky | E01F 9/70 | 414/501 |
| 6,092,959 A | 7/2000 | Leonhardt et al. | E01F 15/00 | 404/6 |
| 6,158,948 A * | 12/2000 | Calvert | B60P 1/38 | 116/63 C |
| 6,182,600 B1 | 2/2001 | Brown et al. | E01F 9/012 | 116/63 |
| 6,183,042 B1 * | 2/2001 | Unrath | E01F 9/662 | 293/118 |
| 6,183,942 B1 | 2/2001 | Kim et al. | G03F 7/42 | 430/331 |
| 6,203,079 B1 | 3/2001 | Breed | B60R 19/40 | 293/119 |
| 6,204,778 B1 | 3/2001 | Bergan et al. | G08G 1/01 | 340/936 |
| 6,244,637 B1 | 6/2001 | Leonhardt et al. | B60R 19/02 | 293/102 |
| 6,354,788 B1 * | 3/2002 | Adams | B60P 1/26 | 296/56 |
| 6,364,400 B1 * | 4/2002 | Unrath | E01F 9/662 | 296/1.05 |
| 6,394,513 B2 * | 5/2002 | Rossmann | B60R 19/00 | 293/117 |
| 6,412,203 B1 * | 7/2002 | Libhart | G09F 21/04 | 340/472 |
| 6,413,033 B1 * | 7/2002 | Monroig, Jr. | B60P 3/122 | 414/462 |
| 6,435,369 B1 * | 8/2002 | Poursayadi | E01F 9/70 | 221/185 |
| 6,478,505 B1 | 11/2002 | Kulp et al. | E01F 15/00 | 404/6 |
| 6,481,920 B1 | 11/2002 | Leonhardt et al. | E01F 15/00 | 404/6 |
| 6,484,427 B1 * | 11/2002 | Santa Cruz | G09F 21/04 | 296/21 |
| 6,579,034 B1 | 6/2003 | Welch et al. | E01F 15/00 | 404/6 |
| 6,581,992 B1 | 6/2003 | Gertz | B60R 19/14 | 293/133 |
| D481,965 S | 11/2003 | Feit et al. | | D10/113 |
| 6,668,989 B2 | 12/2003 | Reid et al. | F16F 7/12 | 188/377 |
| D486,089 S | 2/2004 | Mettler et al. | | D10/109 |
| 6,726,434 B2 * | 4/2004 | Orthaus | E01F 9/70 | 414/435 |
| 6,752,582 B2 * | 6/2004 | Garcia | E01F 9/688 | 116/63 C |
| 6,786,673 B2 | 9/2004 | Kulp et al. | E01F 15/00 | 404/6 |
| 6,809,654 B2 * | 10/2004 | Hudson | E01F 9/662 | 340/468 |
| 6,809,656 B2 | 10/2004 | Mitchell et al. | G08G 1/02 | 340/936 |
| 6,866,284 B2 | 3/2005 | Carlsson | B60R 19/38 | 280/474 |
| 6,905,282 B2 | 6/2005 | Leonhardt et al. | E01F 15/00 | 404/6 |
| 6,926,324 B1 | 8/2005 | Gertz | B60R 19/34 | 293/133 |
| 6,942,263 B2 | 9/2005 | Welch et al. | B60R 19/34 | 293/133 |
| 6,971,329 B1 * | 12/2005 | Stewart | E01F 13/028 | 116/63 C |
| 7,070,220 B1 * | 7/2006 | Lantaigne | B60P 1/435 | 14/69.5 |
| 7,101,143 B2 * | 9/2006 | Orthaus | E01F 9/70 | 414/551 |
| 7,112,004 B2 | 9/2006 | Alberson et al. | E01F 15/00 | 404/6 |
| 7,243,964 B1 | 7/2007 | Gertz | B60R 19/18 | 293/133 |
| 7,287,349 B1 * | 10/2007 | MacDonald | G09F 21/04 | 296/21 |
| 7,341,397 B2 * | 3/2008 | Murphy | B62D 21/20 | 188/377 |
| 7,354,180 B2 | 4/2008 | Sawhney et al. | G09F 19/22 | 362/388 |
| 7,370,602 B2 * | 5/2008 | Greves | B60Q 7/005 | 116/28 R |
| 7,404,372 B2 * | 7/2008 | Aasgaard | B60Q 1/52 | 116/28 R |
| 7,410,321 B1 | 8/2008 | Schiefferly et al. | B60R 21/00 | 404/6 |
| 7,431,532 B2 * | 10/2008 | Lidster | E01F 9/70 | 404/6 |
| 7,438,337 B1 | 10/2008 | Gertz | B60R 19/18 | 293/133 |
| 7,441,817 B1 | 10/2008 | Unrath, Sr. | B60R 19/38 | 293/118 |
| 7,581,918 B2 * | 9/2009 | Jordan | E01F 9/70 | 198/315 |
| 7,690,687 B2 | 4/2010 | Reid et al. | B62D 7/22 | 280/784 |
| 7,708,324 B2 | 5/2010 | Murray et al. | B60R 19/26 | 293/133 |
| 7,737,912 B2 | 6/2010 | Graef et al. | G09G 5/00 | 345/1.1 |
| 7,766,403 B2 | 8/2010 | Alvarsson et al. | B60R 19/34 | 293/133 |
| 7,802,829 B2 | 9/2010 | Maus | B60R 19/24 | 293/133 |
| 7,871,220 B2 | 1/2011 | Albriton | E01F 15/00 | 404/6 |
| 7,874,572 B2 | 1/2011 | Buehler et al. | A01B 59/041 | 280/474 |
| 7,931,317 B2 | 4/2011 | Kern | B60R 19/18 | 293/118 |
| 8,074,761 B2 | 12/2011 | LaTurner et al. | B60R 19/34 | 180/274 |
| 8,136,281 B2 | 3/2012 | MacDougall | G09F 21/104 | 40/590 |
| D662,443 S * | 6/2012 | Voss | | D12/93 |
| 8,246,068 B2 * | 8/2012 | MacDougall | G09F 7/20 | 280/491.1 |
| 8,246,091 B1 | 8/2012 | Jayasuriya et al. | B60R 19/26 | 293/133 |

(56) References Cited

U.S. PATENT DOCUMENTS

| | | | |
|---|---|---|---|
| 8,267,445 B1 | 9/2012 | Jayasuriya et al. | B60R 19/26 293/133 |
| 8,322,945 B2 | 12/2012 | Griebeweg et al. | E01F 15/00 404/6 |
| 8,500,360 B1* | 8/2013 | Jones | E01F 9/70 256/13.1 |
| 8,638,209 B1* | 1/2014 | Oskroba | G09F 9/30 340/425.5 |
| 8,653,988 B2* | 2/2014 | Legare | E01F 9/662 340/908 |
| 8,657,525 B2 | 2/2014 | Groeneweg et al. | E01F 15/10 404/6 |
| 8,732,999 B1* | 5/2014 | Hughes | G09F 15/0018 160/329 |
| 8,740,241 B2 | 6/2014 | Groeneweg | E01F 13/00 280/423.1 |
| 8,757,640 B2 | 6/2014 | Schaufelberger et al. | B62B 7/12 280/30 |
| 8,794,172 B2 | 8/2014 | Bromm et al. | E01F 9/012 116/63 P |
| 8,845,229 B2 | 9/2014 | Groeneweg | E01F 15/10 |
| 8,870,251 B1 | 10/2014 | Kulp et al. | B60R 19/56 293/133 |
| 9,056,572 B2* | 6/2015 | Hemphill | B60P 1/02 |
| 9,273,437 B2 | 3/2016 | Groeneweg et al. | E01F 15/10 280/411.1 |
| 9,365,987 B2 | 6/2016 | Christiansen et al. | E01F 9/0126 180/6.2 |
| 9,339,845 B2 | 7/2016 | Buehler et al. | E01F 15/14 293/118 |
| 9,481,969 B2 | 11/2016 | Groeneweg et al. | E01F 9/662 |
| 9,489,841 B1 | 11/2016 | Huggins | |
| 9,566,923 B2 | 2/2017 | Wylezinski et al. | B60R 19/24 293/118 |
| 9,732,482 B2 | 8/2017 | Groeneweg | E01F 13/022 280/423.1 |
| 9,739,328 B1 | 8/2017 | Degroot et al. | F16F 7/123 404/6 |
| 10,112,528 B1 | 10/2018 | Mazair | B60Q 1/444 |
| 10,160,373 B2 | 12/2018 | Tovornik | B60P 3/14 |
| 10,319,227 B2* | 6/2019 | Roy | G08G 1/0955 |
| 10,529,259 B1* | 1/2020 | Kiehart, III | G09F 7/20 |
| 10,556,545 B2* | 2/2020 | Roy | E01F 9/70 |
| 2001/0000120 A1* | 4/2001 | Unrath | E01F 9/70 296/186.1 |
| 2002/0005826 A1 | 1/2002 | Pederson | G09G 3/32 345/82 |
| 2002/0034430 A1* | 3/2002 | Sotiroff | B60R 9/00 414/462 |
| 2002/0175830 A1* | 11/2002 | Hudson | G08G 1/0955 340/907 |
| 2003/0011180 A1* | 1/2003 | Coffman | B60R 21/02 280/748 |
| 2003/0147733 A1* | 8/2003 | Shimomato | E01F 9/70 414/501 |
| 2004/0021294 A1* | 2/2004 | Carlsson | B60R 19/00 280/486 |
| 2004/0057822 A1* | 3/2004 | Orthaus | E01F 9/70 414/539 |
| 2004/0057824 A1 | 3/2004 | Orthaus | E01F 9/70 414/789.7 |
| 2004/0120760 A1 | 6/2004 | Carlsson | E01F 13/00 404/6 |
| 2004/0128888 A1* | 7/2004 | Payan | G09F 21/048 40/610 |
| 2004/0155811 A1 | 8/2004 | Albero et al. | G01S 13/93 342/70 |
| 2005/0046207 A1 | 3/2005 | Rossmann | B60R 19/34 |
| 2005/0072331 A1 | 4/2005 | Moses | B61C 11/00 105/392.5 |
| 2005/0074143 A1* | 4/2005 | Kawai | B60D 1/36 382/104 |
| 2005/0095105 A1* | 5/2005 | Parks | E01F 9/70 414/540 |
| 2005/0199640 A1* | 9/2005 | Clark | E01F 9/688 221/1 |
| 2006/0012487 A1 | 1/2006 | Gibson | G08B 5/006 340/815.45 |
| 2006/0147264 A1* | 7/2006 | Doran, Jr. | E01F 9/70 404/73 |
| 2006/0291957 A1 | 12/2006 | Lidster | E01F 9/70 404/73 |
| 2007/0071584 A1* | 3/2007 | Beckstead | E01F 9/70 414/467 |
| 2007/0182181 A1* | 8/2007 | Cohen | B60R 13/00 296/21 |
| 2007/0183874 A1 | 8/2007 | Garcia | B60P 1/00 414/437 |
| 2007/0216521 A1 | 9/2007 | Guensler et al. | B60Q 1/00 340/439 |
| 2008/0106058 A1* | 5/2008 | Demick | B60R 3/007 280/164.1 |
| 2009/0097914 A1* | 4/2009 | Flynn | E01F 9/70 404/9 |
| 2009/0166998 A1 | 7/2009 | Groeneweg | E01F 15/148 280/408 |
| 2009/0256697 A1* | 10/2009 | Tallinger | B60Q 1/2611 340/472 |
| 2010/0109287 A1* | 5/2010 | MacDougall | G09F 7/20 280/491.1 |
| 2011/0012751 A1 | 1/2011 | Jones | G08C 19/00 340/825.69 |
| 2011/0163517 A1 | 7/2011 | Groenweg | B60P 3/00 280/423.1 |
| 2011/0205085 A1* | 8/2011 | Legare | E01F 9/662 340/908 |
| 2012/0211302 A1 | 8/2012 | Stewart | B66F 11/04 182/12 |
| 2012/0319413 A1 | 12/2012 | Andres et al. | B60R 19/34 293/133 |
| 2013/0064632 A1* | 3/2013 | Pawluk | B60P 3/08 414/482 |
| 2013/0156532 A1* | 6/2013 | Hemphill | B60P 1/02 414/495 |
| 2014/0111323 A1 | 4/2014 | Strout | B60Q 1/268 340/425.5 |
| 2014/0200759 A1* | 7/2014 | Lu | B60D 1/245 701/28 |
| 2014/0259634 A1* | 9/2014 | Cox | G09F 19/228 29/592.1 |
| 2014/0268565 A1* | 9/2014 | Cox | G09F 9/33 361/692 |
| 2015/0043231 A1* | 2/2015 | Clark | G09F 21/048 362/485 |
| 2015/0225913 A1 | 8/2015 | Groeneweg | E01F 15/148 212/299 |
| 2016/0333537 A1* | 11/2016 | Julien | E01F 9/70 |
| 2016/0378482 A1 | 12/2016 | Roy | G08G 1/09 |
| 2016/0379492 A1* | 12/2016 | Roy | G01S 13/00 340/907 |
| 2017/0106780 A1 | 4/2017 | Tovornik | B60P 3/14 |
| 2017/0154524 A1 | 6/2017 | Beaulieu | G08G 1/07 |
| 2017/0210284 A1 | 7/2017 | Donan | B60Q 1/46 |
| 2017/0246988 A1 | 8/2017 | Ihedinmah | B60Q 1/503 |
| 2017/0287223 A1 | 10/2017 | Nix | G07C 5/008 |
| 2017/0361786 A1* | 12/2017 | Julian | E03D 7/00 |
| 2018/0001817 A1 | 1/2018 | Adams | B60Q 9/00 |
| 2018/0121742 A1* | 5/2018 | Son | G06T 7/74 |
| 2018/0125030 A1* | 5/2018 | Glover | A01K 5/0225 |
| 2018/0194352 A1 | 7/2018 | Avedisov | B60W 30/16 |
| 2018/0195246 A1* | 7/2018 | Hanssen | E01F 9/70 |
| 2018/0261088 A1* | 9/2018 | Roy | B60W 30/08 |
| 2019/0031111 A1* | 1/2019 | Roy | B60R 9/048 |
| 2019/0048543 A1* | 2/2019 | Roy | E01F 9/70 |
| 2019/0241126 A1* | 8/2019 | Murad | B60R 1/12 |
| 2019/0308547 A1* | 10/2019 | Sousa Vazquez | B61D 3/18 |

(56) References Cited

U.S. PATENT DOCUMENTS

2019/0330811 A1\* 10/2019 Roy .................. F16F 7/003
2020/0276927 A1\* 9/2020 York ................ B62D 65/024
2020/0332484 A1\* 10/2020 Roy .................. B60R 11/06

FOREIGN PATENT DOCUMENTS

| WO | WO 2005/010279 | 2/2005 | |
|----|----------------|--------|------|
| WO | WO 2013/172713 | 11/2013 | ............. E01F 9/014 |
| WO | WO 2017/079803 | 5/2017 | ............. G05D 1/02 |

\* cited by examiner

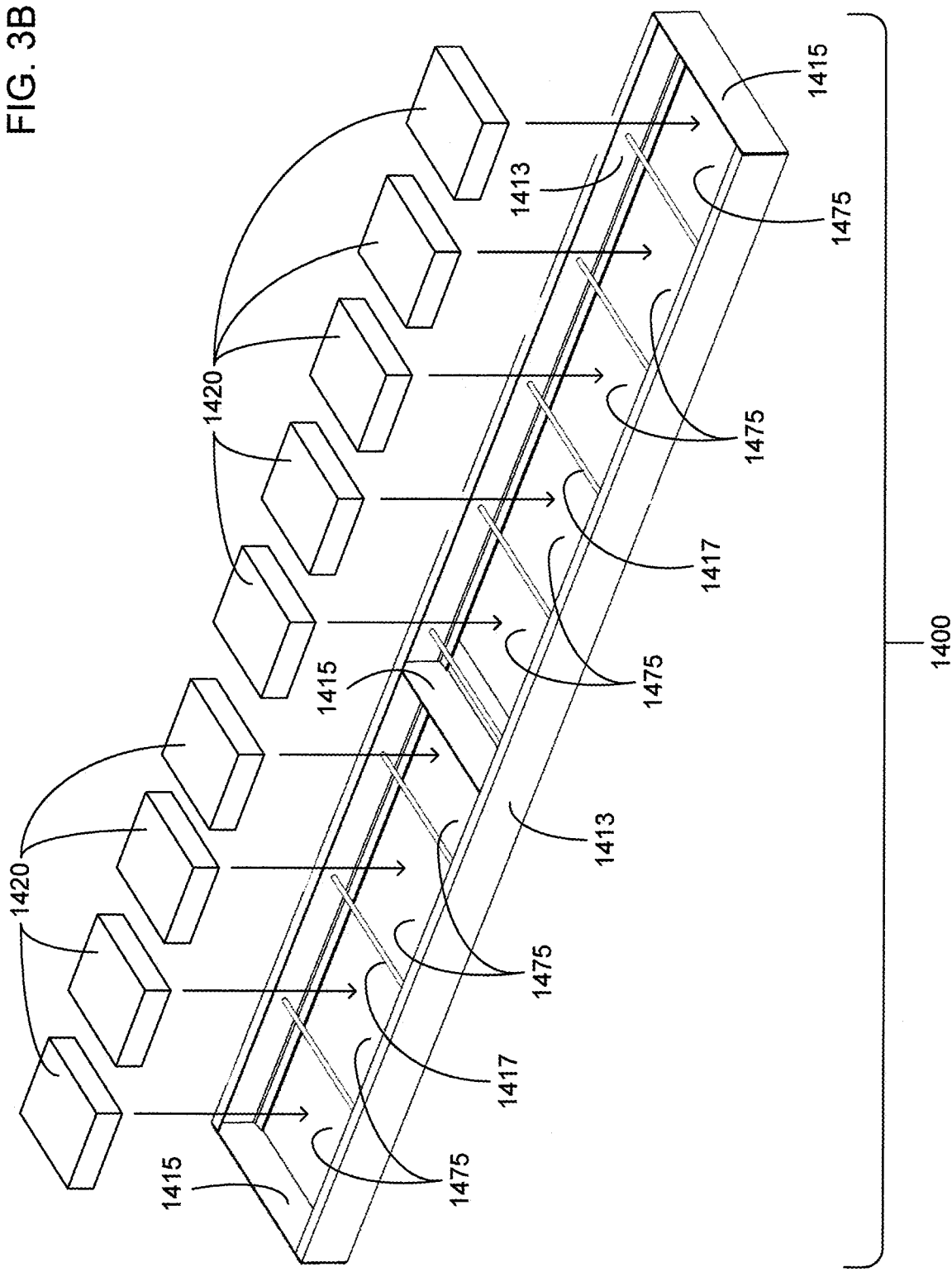

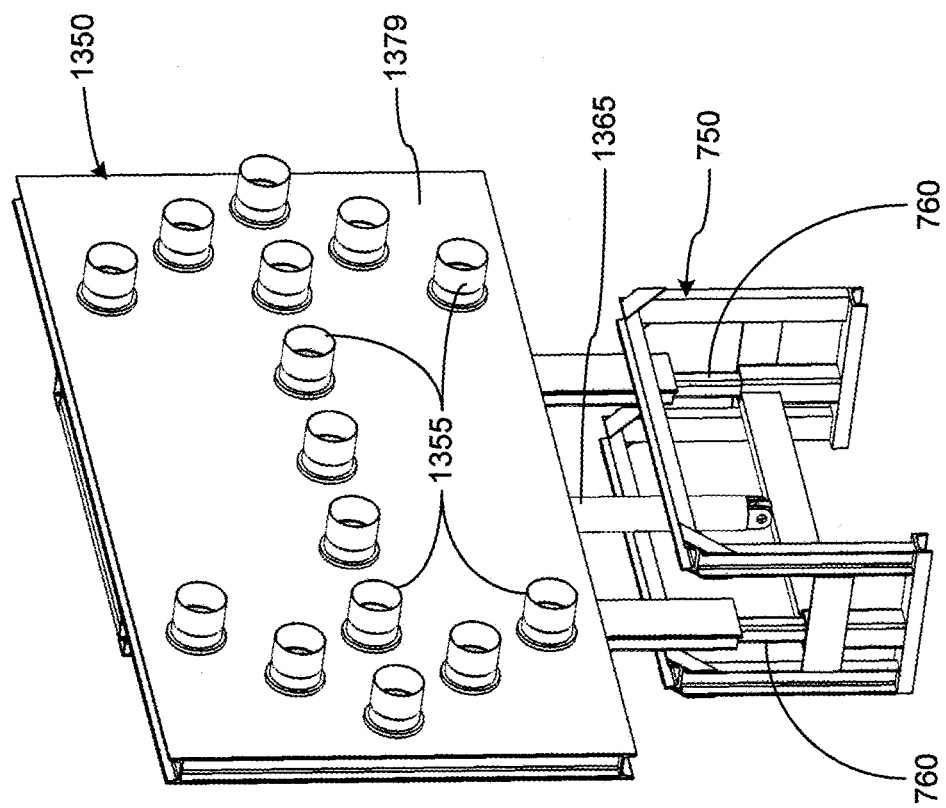

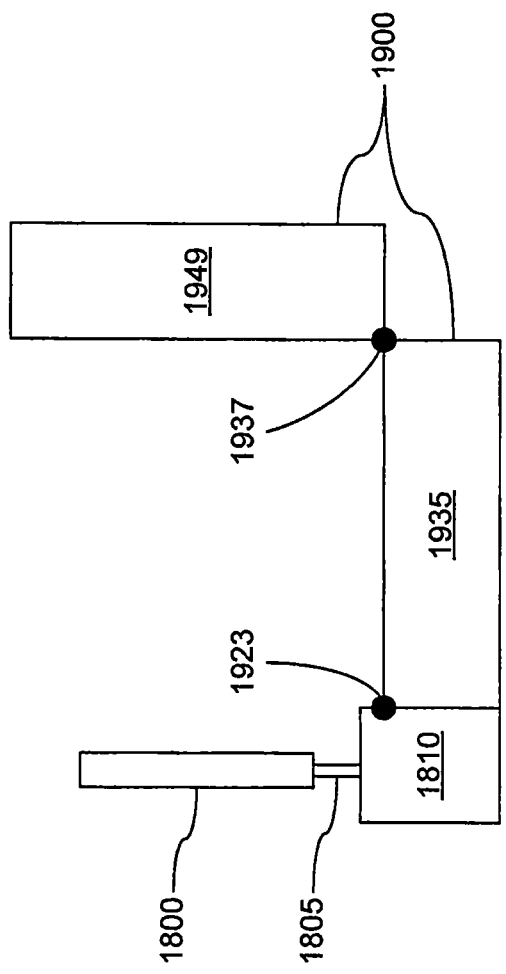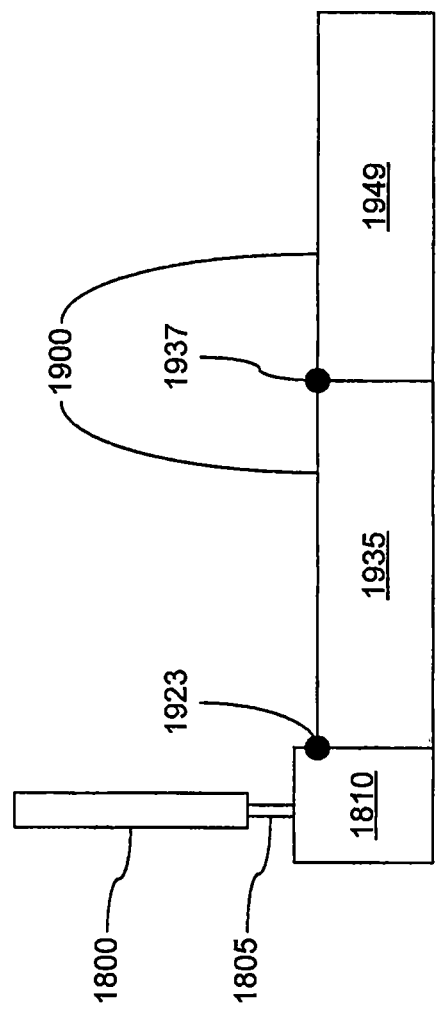
FIG. 6D
FIG. 6E

SAFETY TRUCK ATTACHMENTS, AND METHODS OF SAFETY TRUCK USE

A) Reference to Provisional Applications

This Utility Application claims the benefit of the filing dates of each of the following three Provisional Applications:

1) Ser. No. 62/631,840 Filed Feb. 18, 2018 by Robert H. Roy, Andrew C. Washburn, Joseph T. Piggott and Siddharth Balasubramanian entitled TRUCK MOUNTABLE OVER-CAB RACK FOR TRANSPORTING NESTED STACKS OF BARREL-TYPE TRAFFIC DELINEATORS;

2) Ser. No. 62/638,818 Filed Mar. 5, 2018 by Robert H. Roy, Andrew C. Washburn, Joseph T. Piggott and Siddharth Balasubramanian entitled TRUCK MODULE FOR ASSISTING WORKMEN TO PLACE AND RETRIEVE TRAFFIC DELINEATORS ALONGSIDE HIGHWAY WORK SITES;

3) Ser. No. 62/780,909 Filed Dec. 17, 2018 by Robert H. Roy, Andrew C. Washburn, Joseph T. Piggott and Siddharth Balasubramanian entitled ROADWAY AREA SAFETY TRUCK ENHANCEMENTS.

B) Reference to Related Utility Applications

This Utility Application is also a Continuation-In-Part of each of the following three Utility Applications, namely:

1) Ser. No. 15/913,562 Filed Mar. 6, 2018 by Robert H. Roy, Andrew C. Washburn, Joseph T. Piggott and Siddharth Balasubramanian entitled ROADWAY AREA SAFETY TRUCK;

2) Ser. No. 16/132,376 Filed Sep. 15, 2018 by Robert H. Roy, Andrew C. Washburn, Joseph T. Piggott and Siddharth Balasubramanian entitled OVER-CAB RACK FOR TRAFFIC DELINEATORS;

3) Ser. No. 16/159,813 Filed Oct. 15, 2018 by Robert H. Roy, Andrew C. Washburn, Joseph T. Piggott and Siddharth Balasubramanian entitled TRUCK SAFETY MODULES FOR ASSISTING WORKPERSONS TO PLACE AND RETRIEVE TRAFFIC DELINEATORS.

C) References to Other Pertinent Applications

The attention of the Patent Office is directed to the following additional information, namely that:

1) The aforementioned Utility application Ser. No. 15/913,562 is a Continuation-In-Part of Utility application Ser. No. 15/197,685 filed Jun. 29, 2016 by Robert H. Roy, Andrew C. Washburn, Joseph T. Piggott and Siddharth Balasubramanian entitled ALL-IN-ONE SAFETY DISPLAY; and 2) The aforementioned Utility application Ser. No. 15/197,685 claims the benefit of the Jun. 29, 2015 filing date of Provisional Application Ser. No. 62/186,036 filed by Robert H. Roy, Andrew C. Washburn, Joseph T. Piggott and Siddharth Balasubramanian entitled ALL-IN-ONE SAFETY DISPLAY.

D) Incorporations by Reference Herein of the Entireties of the Disclosures of all the Applications Identified Above Incorporated by reference into the present Utility Application, are the entireties of the content of all of the Applications identified in Sections A), B) and C) presented above.

FIELD OF THE INVENTION

The present invention relates to what have come to be known in the roadway construction, maintenance, and repair industry as "safety trucks" used to protect roadway construction, maintenance and repair personnel.

More particularity, the present invention relates to 1) new safety truck attachments, to 2) new connection points where attachments can releasably couple to safety trucks, and to 3) new methods of use of safety trucks to enhance the protection safety trucks can provide to roadway construction, maintenance and repair personnel working within and relatively near to roadway workzones and worksites.

In this document, the term "safety truck" almost always refers to the combination of a safety truck and towed Truck Mounted Attenuator (or TMA unit). Those who are skilled in the art understand that a TMA unit provides an associated safety truck with what amounts to a sacrificial crumple zone designed to incur a majority of the physical damage that would otherwise be inflicted on the associated safety truck due to a collision of another vehicle therewith.

Modern-day TMA units are designed and engineered to crumple in a controlled manner that 1) not only extends the period of the time during which an accidental impact with a TMA unit takes place, 2) but also diminishes the total magnitude of the resulting force exerted on a safety truck associated with the impacted TMA unit. Indeed, modern-day TMA units are often so well designed that they often succeed in reducing the severity of a highway speed accidental collision with a TMA unit to a level nearly on par with vehicle collisions occurring at lower speeds on residential roads.

The present invention not only recognizes, but also takes advantage of the fact that an accidental impact with a combination safety truck and TMA unit not only causes controlled crumpling of the TMA unit, but also often causes the impacted combination safety truck and TMA unit to roll forwardly for a considerable distance away from the original location of the impact. This tendency of a combination safety truck and TMA unit to roll forwardly from the original location of an impact sometimes causes a safety truck to invade the very same workzone or worksite that the combination safety truck and TMA unit was intended to protect. Accordingly, attempting to use ONLY A SINGLE combination safety truck and TMA unit to protect a workzone or worksite is often not a proper solution to protecting a workzone or worksite.

The present invention takes into account and makes use of the roll forward tendency of impacted combination safety trucks and TMA units by providing a new method of safety truck use that calls for the use of a PLURALITY of combination safety truck and TMA units arranged in spaced relationship to protect each workzone or worksite.

The present invention also urges the addition of weights to selected ones of the spaced-apart safety trucks to thereby increase truck mass (and hence the inertia of weighted safety trucks), to diminish the total distance traveled by the spaced-apart combination safety truck and TMA units when they roll forwardly in response to an accidental impact of a roadway vehicle with the rearmost TMA unit of the spaced-apart combination safety trucks and TMA units.

BACKGROUND OF THE INVENTION

As is explained in introductory portions of the patent applications listed in the foregoing Sections A), B) and C) of this document, when maintenance, repair and/or new construction work is to be performed on portions of busy roadways, the important goal of diminishing and preventing injury-causing accidents to roadway workers, roadway vehicles, construction vehicles, construction machinery and the like often renders it desirable to completely close lengthy reaches of the roadway that is to be repaired, rebuilt or reconstructed. Certainly it is sensible to close at least the roadway reaches where active workzones and worksites are to be located.

Unfortunately, the closing of even a short reach of a busy roadway is often deemed to be impractical, or even impossible—which may require that roadway maintenance, repair and new construction work must be undertaken quite near to, or even alongside where vehicular traffic must be maintained, or must frequently be permitted to flow.

The proximity of maintained flows of traffic to the locations of active workzones and worksites opens the door to instances wherein vehicular traffic may accidentally collide with construction vehicles, construction equipment and/or construction personnel as a result of impatient, distracted, sleep-deprived, intoxicated and/or otherwise impaired motorists who may drive adjacent roadway workzones and worksites, sometimes unnecessarily close to where roadway personnel are performing their work and/or at unnecessarily high speeds.

Various prior art measures have been undertaken to mitigate the dangers and likelihood of injury and death to roadway construction, maintenance and repair personnel. Such measures have included scheduling work during night hours and at other times when traffic volumes are low; imposing reduced speed limits accompanied by stiff fines for speed limit violations; posting brightly colored workzone warning signage together with the use of heavy concrete protective barriers; and the strategic positioning of police vehicles with flashing lights near and adjacent to roadway workzones and worksites.

Advisory signs have often been positioned to warn motorists as they begin to approach the locations of roadway workzones and worksites, with the signs also advising of the times when roadway work is, or will be active. Such measures are typically intended to encourage motorists to slow down as they drive along roadway portions near and adjacent to the locations of active roadway workzones and worksites, to diligently watch for developing dangers, and to be prepared to respond appropriately when developing dangers are noted.

To provide sufficient advance notice to motorists that they are approaching roadway workzones and worksites, and to protect roadway construction, maintenance and repair personnel who work in and relatively near to roadway workzones and worksites, warning signage and safety barriers typically need to be placed as far back as at least a mile or two, or more, before motorists reach the locations of active roadway workzones and worksites.

A significant problem associated with the task of providing adequate warning signage and safety barriers, is the substantial set-up time and manpower required to accomplish these tasks—which takes away from the time and manpower needed to perform actual roadway repair and construction work.

Still another problem associated with the advanced placement of warning signage and safety barriers has to do with the fact that the active work within many roadway workzones and worksites does not remain stationary, but rather is of a "rolling nature." As active repair and/or construction work within an initial length of a roadway workzone or worksite is completed, the location of active work within the roadway workzone or worksite often moves progressively forwardly along the associated roadway.

Accordingly, warning signage and safety barriers often need to be mounted on vehicles that can move forwardly as the active areas within workzones and worksites move forwardly as work is completed within a succession of portions of the workzones and worksites.

Despite the many efforts that always are made to eliminate workzone and worksite dangers, serious accidents still occur each year when impatient, inattentive and/or impaired motorists fail to take notice of, and/or fail to respond appropriately when in the vicinity of roadway workzones and worksites, thereby causing their vehicles often traveling a highway speeds to barrel into roadway workzones and worksites, where the high kinetic energy of their invading vehicles frequently causes deaths and devastating injuries to roadway construction, maintenance and repair personnel.

The present invention provides new methods of use of safety trucks that protect roadway workzones and worksites.

SUMMARY OF THE INVENTION

The present invention addresses the foregoing and other drawbacks of the prior art by providing both methods and apparatus designed to enhance the protection provided by safety trucks to roadway construction, maintenance and repair personnel working in and near roadway workzones and worksites.

More particularly, the present invention improves the protection that can be provided by safety trucks to personnel working within and near to roadway workzones and worksites by providing not only 1) new methods of safety truck use, but also 2) more than a dozen new attachments for safety trucks, and 3) many new connection points where the new attachments can be interchangeably coupled to safety trucks.

As a direct result of the utilization of the inventive subject matter summarized above, the present invention enhances and improves how safety trucks and their attachments are used to guard and protect roadway construction, maintenance and repair personnel who work at locations within and relatively near to roadway workzones and worksites.

BRIEF DESCRIPTIONS OF THE DRAWINGS

A fuller understanding of the invention disclosed herein, as well as other features and advantages of the present invention may be had by referring to the description and claims that follow, taken together with the accompanying drawings, wherein:

FIG. 1A is a front and right side perspective view of a first embodiment of a combination flatbed safety truck and TMA unit that is provided with forwardmost connection point, with an over-cab rack attachment coupled atop bulkhead connection points, with the view also showing a generator-compartment connection point that can contain an auxiliary electric generator attachment for supplying auxiliary electrical power to the safety truck and its attachments, and with the view also showing a relatively wide man basket attachment installed in an inset located along the right side of the flat bed of the truck, with a rear region of the flatbed supporting a rear sign cage attachment atop a rear flatbed connection point, with the safety truck shown towing a rearwardly extending TMA unit attachment for attenuating the kinetic energy of such roadway vehicles as may accidentally crash into the TMA unit;

FIG. 1B is a left side elevational view of another combination safety truck and TMA unit embodiment carrying an over-cab rack attachment for traffic delineators, with a connection point compartment being provided beneath the flatbed for carrying an auxiliary electrical generator attachment, with a rear region of the flatbed shown carrying a rear sign cage attachment, and with a display board attachment connected to the rear of the truck and shown in a raised, and deployed state, with the TMA unit extending rearwardly from the truck in the deployed state as is also shown in FIG. 1A;

FIG. 1C is a front and right side perspective view from above of another combination safety truck and TMA unit embodiment having an upstanding bulkhead separating the cab of the truck from the truck's flatbed, with two flat members atop the bulkhead providing dual bulkhead connection points that can support upstanding rear members of the over-cab rack as is shown in FIGS. 1A, 1B and 1E, with the truck having relatively wide man basket attachments installed in insets along opposite left and right sides of the truck's flatbed, with a rear sign cage attachment supported atop a rear region of the truck's flatbed, with a rear-mounted display board attachment shown lowered to a stowed position, and with the TMA unit shown folded upwardly and forwardly in its transport position;

FIG. 1D is a left side elevational view of another combination safety truck and TMA unit embodiment, with a wide man basket attachment shown midway along the flatbed of the truck, with a rear sign cage attachment supported atop a rear region of the flatbed, with a rear-mounted display board attachment shown lowered to a stowed position, and with the TMA unit shown folded upwardly and forwardly for transport;

FIG. 1E is a left side elevational view of another combination safety truck and TMA unit embodiment that includes the over-cab rack for traffic delineators, a connection point compartment for an auxiliary electrical generator attachment, a new form of man basket attachment that can be raised and lowered as needed, with this safety truck embodiment also being provided with a rear sign cage attachment carried atop a rear connection point region of the flatbed, with the display board attachment shown in FIG. 1D raised to a deployed position, with several camera and speed detection radar attachments connected to parts of the safety truck and its attachments, and with the TMA unit unfolded and extending rearwardly from the truck as is shown in FIGS. 1A and 1B;

FIG. 1F is a rear and left side perspective view from above showing yet another safety truck embodiment provided with an arrow board attachment shown in a raised, operational position at a location between the cab and an upstanding bulkhead that closes an open front of a forward sign cage attachment carried by a front region of the flatbed, with a pair of relatively narrow man baskets installed in insets along opposite sides of the truck's flat bed, and with a safety basket attachment connected to a heavy duty rear connection point of the safety truck, and with the safety basket attachment defining another connection point that opens rearwardly;

FIG. 1G is a left side elevational view of the safety truck embodiment shown in FIG. 1F;

FIG. 1H is a perspective view showing the left side and the rear of another safety truck embodiment having an arrow board in its lowered, stowed position, having a generator compartment defining a connection point beneath where a forward sign cage attachment is carried atop a front region of the truck's flatbed, with dual narrow man basket attachments carried in insets along opposite left and right sides of the flat bed, and with a step bumper attachment connected to the truck's rear that defines another connection point that opens rearwardly;

FIG. 1I is a left side elevational view of yet another combination safety truck and TMA unit embodiment which has a rear sign cage attachment atop a rear flatbed connection point, with the same type of man basket attachment shown in FIG. 1E installed in an inset along the left side of the safety truck, with camera and radar speed detection attachments mounted on connection points atop a bulkhead of the truck and between upwardly and forwardly folded sections of the truck's TMA unit attachment which is connected to the truck's rear, and shown folded upwardly and forwardly to its stowed position for transport;

FIG. 3B is a perspective view of a weight frame attachment that can be installed atop the channel members shown in FIG. 3A, with the weight frame attachment defining a series of compartments into which the depicted weights can be inserted;

FIG. 4A is a perspective view on an enlarged scale showing one form of an inbetween-cab-and-flatbed connection point structure underlying and supporting one embodiment of the arrow board attachment in a fully lowered, stowed position which is also shown in FIG. 1H;

Figure 3A:
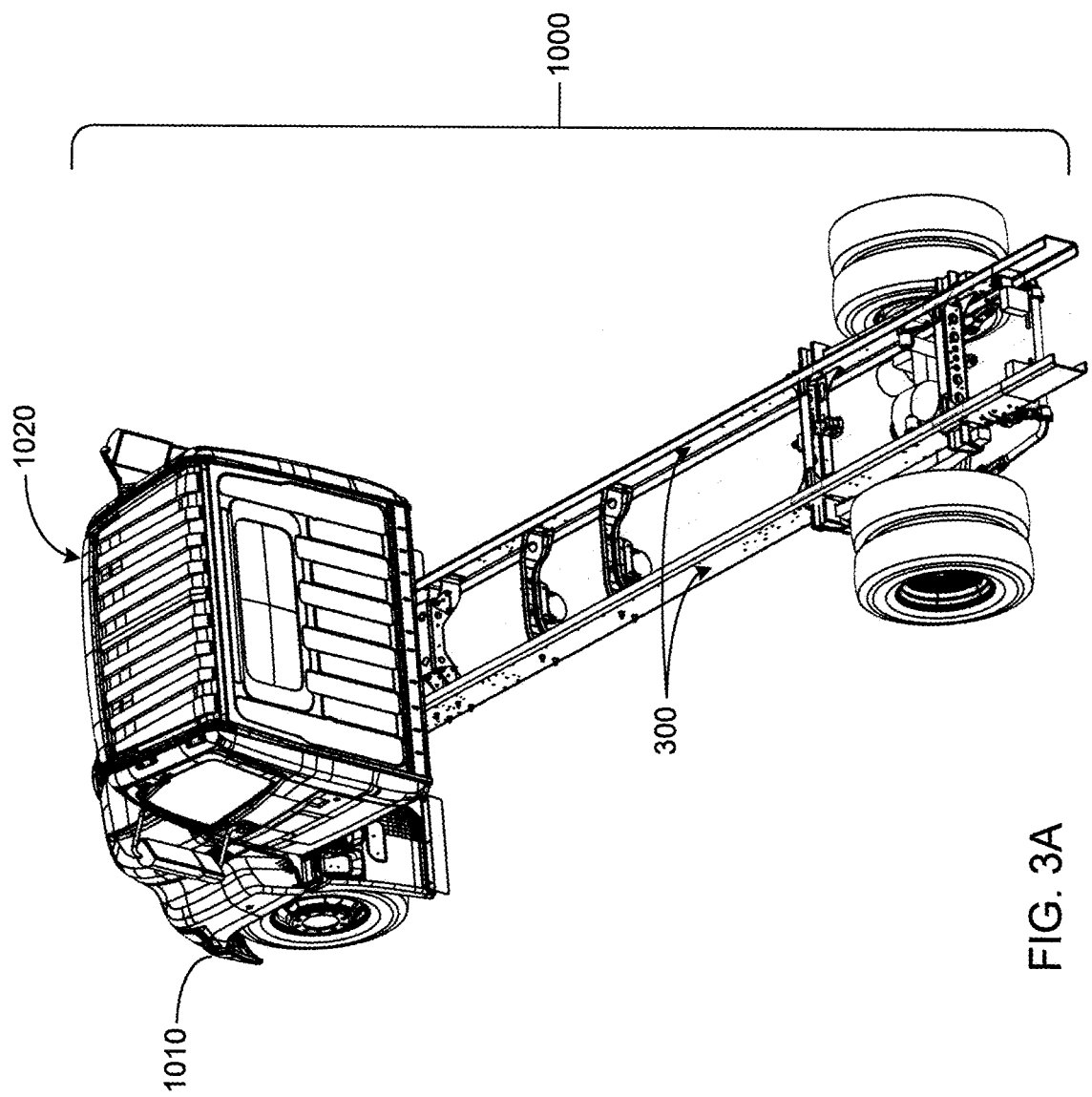
FIG. 3A is a rear and left side perspective view from above showing the cab of a safety truck together with a pair of elongate, horizontally extending channel members of a frame of the safety truck that underlie and extend rearwardly from the cab of a safety truck for overlying a rear axle assembly of the safety truck.
Figure 6A:
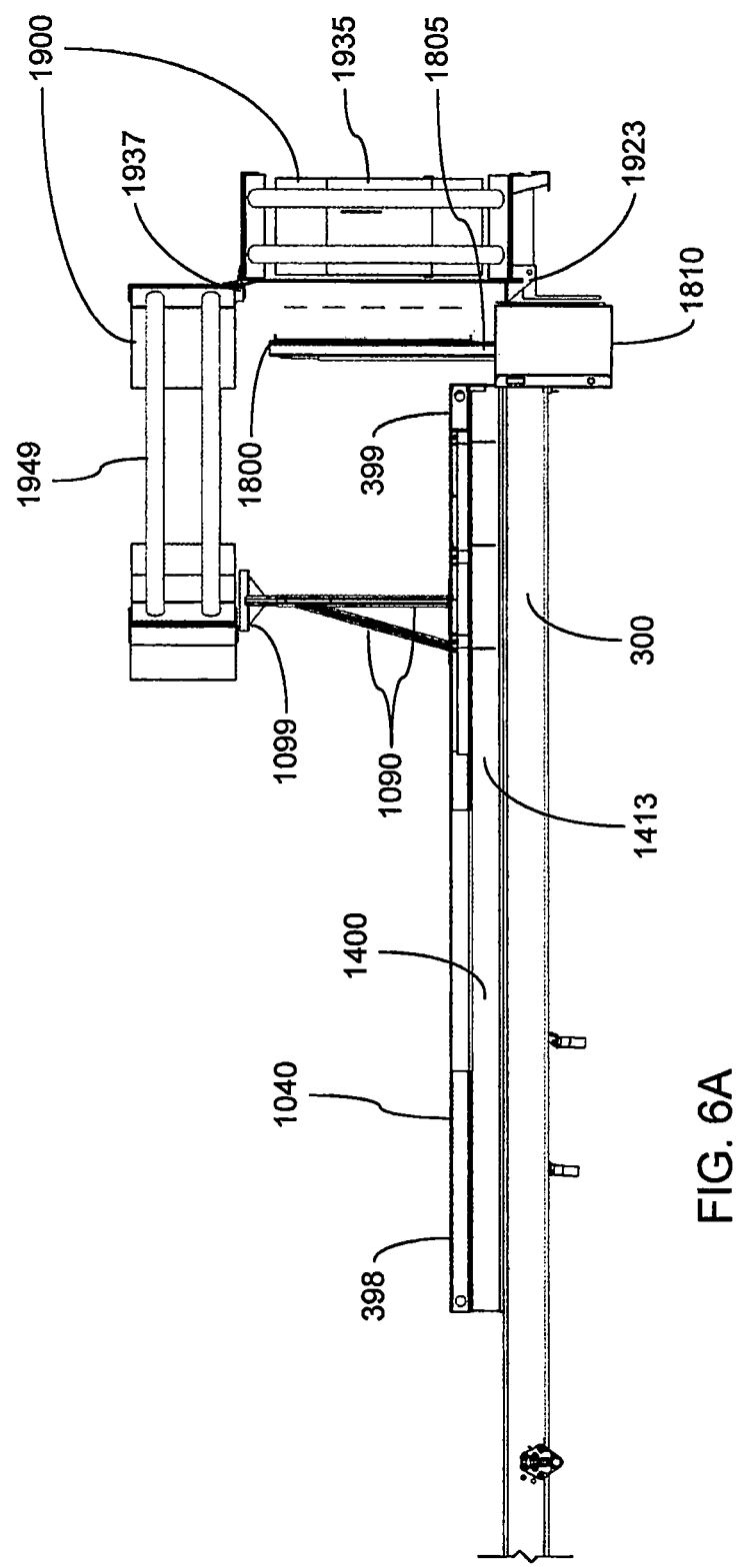

FIG. 6A is a left side elevational view of the pair of elongate channel members of the frame of a safety truck shown in FIG. 3A that underlie and support the weight frame attachment shown in FIG. 3B, with a display board attachment and a TMA unit attachment connected to the a heavy duty rear connection point at the rear of the channel members, with the TMA unit attachment folded upwardly and forwardly to a transport position where a portion of the TMA unit rests atop a support that connects to the top of a safety truck's flatbed.

Figure 1A:
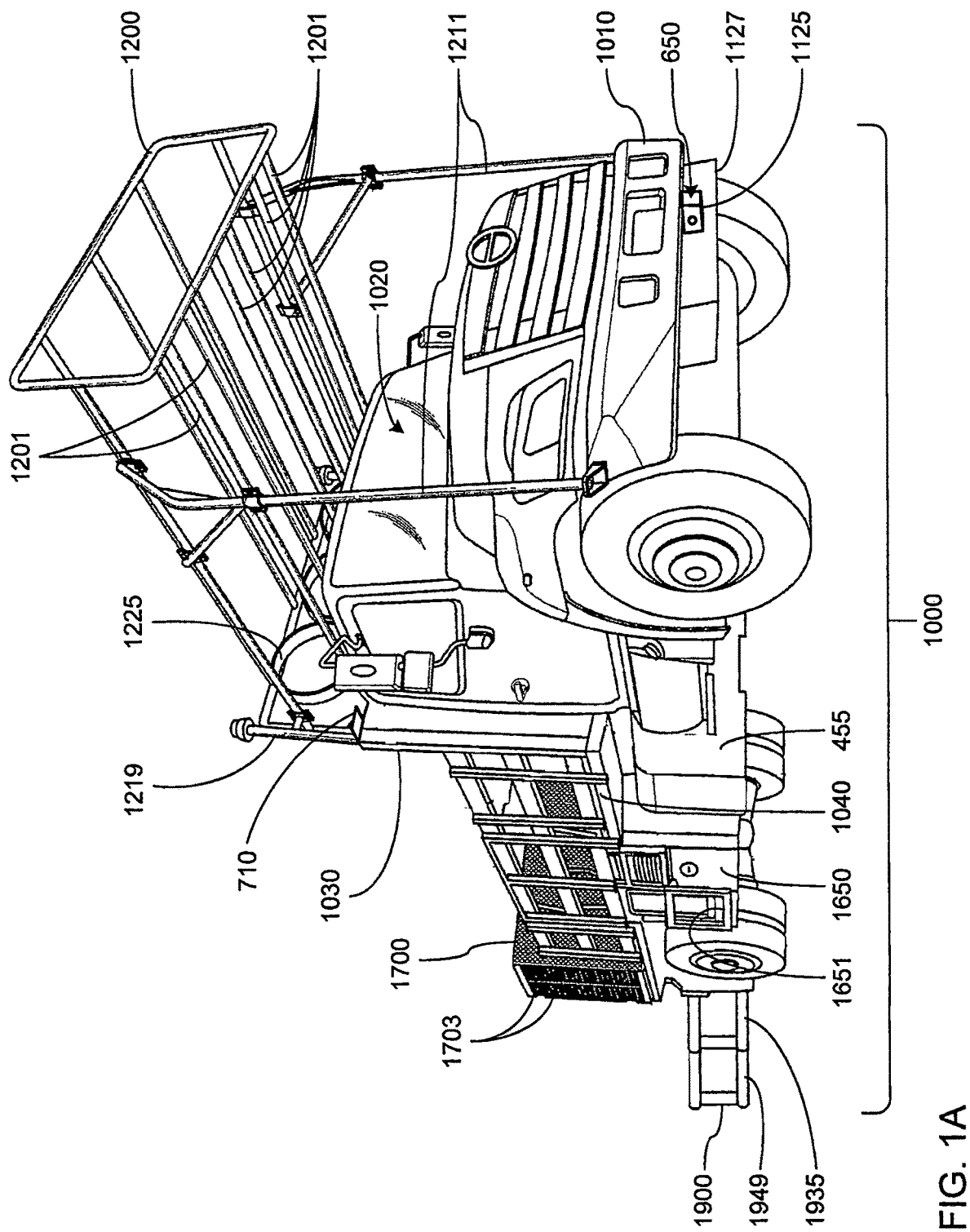
FIG. 1J is a perspective view of the over-cab rack attachment for transporting traffic delineators, which rack attachment is shown connected to front fenders and to upstanding bulkheads of safety trucks in FIGS. 1A, 1B, 1E.
FIG. 1K is a perspective view on an enlarged scale of portions of one of the three side-by-side delineator racks provided by the over-cab rack attachment shown in FIG. 1J, with portions of two traffic delineators shown atop the one depicted rack portion.
Figure 1B:
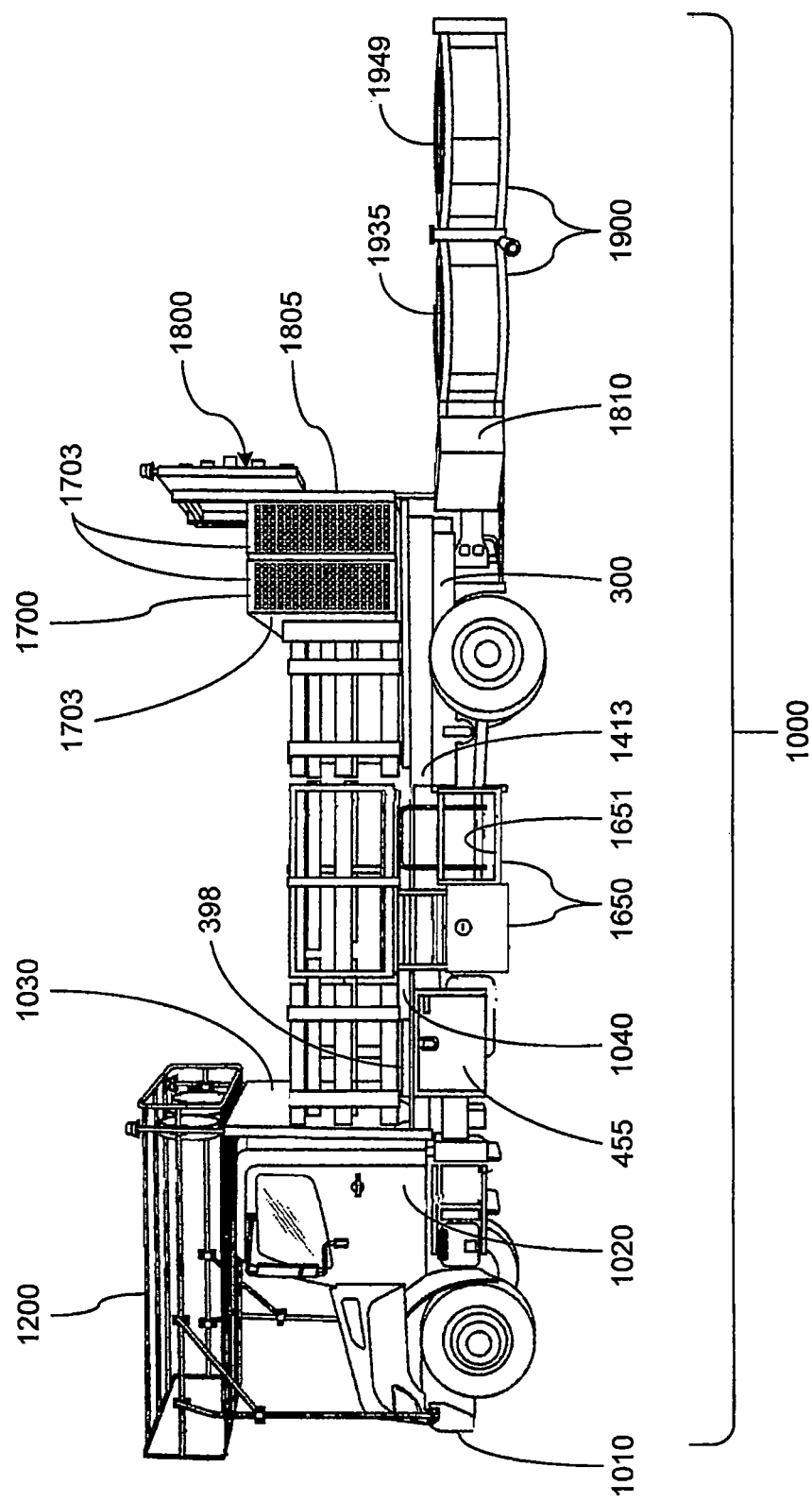
Figure 1C:
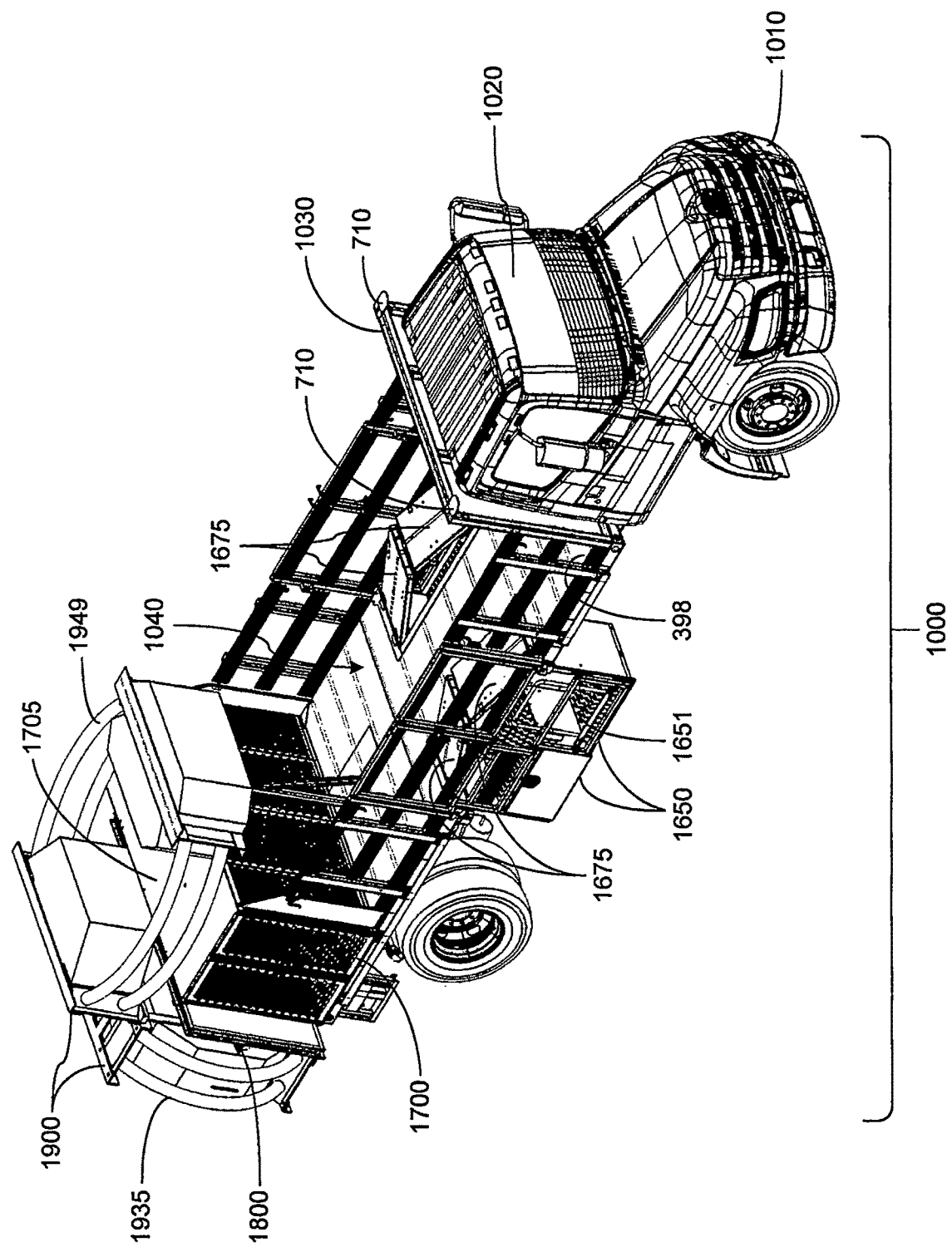
Figure 1D:
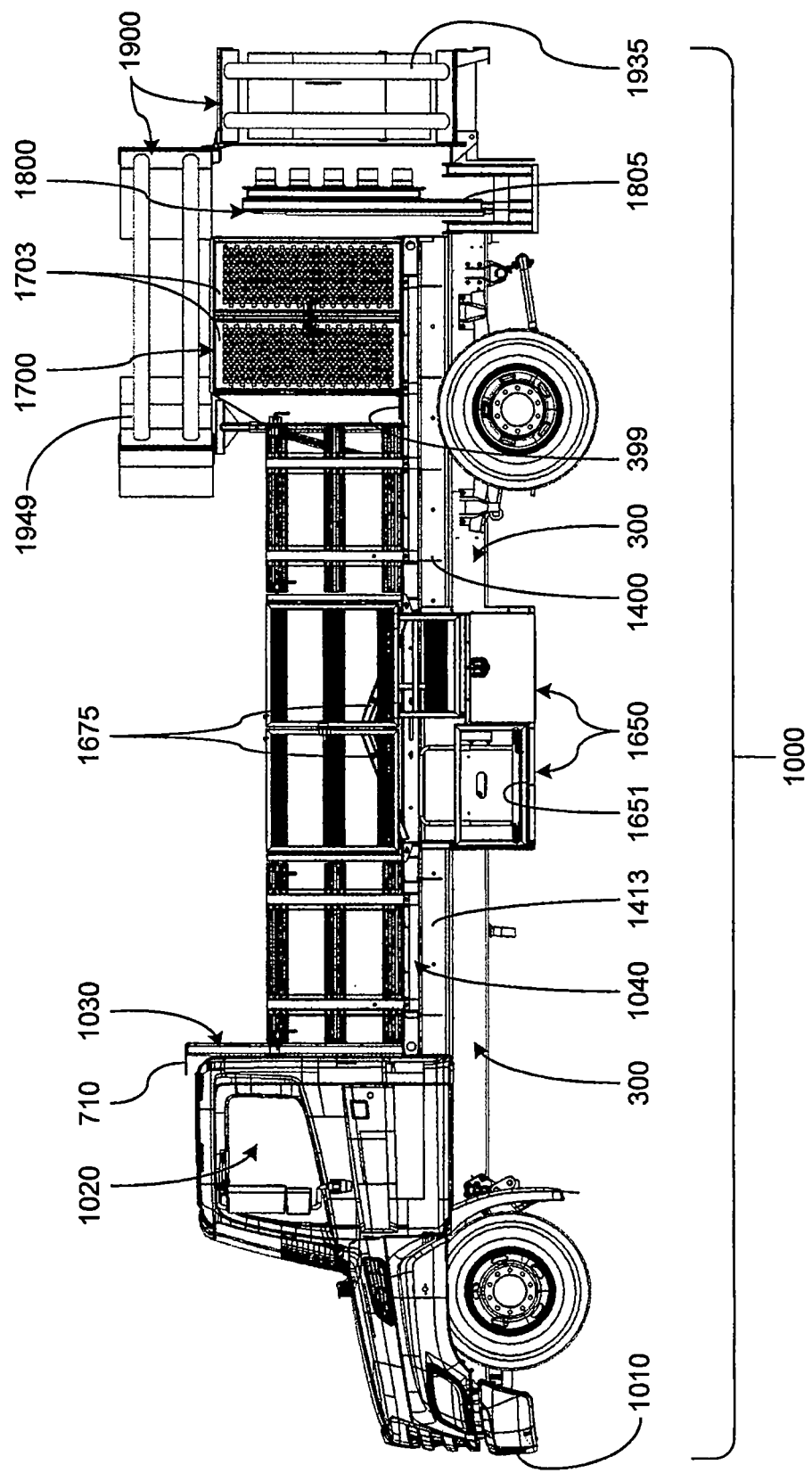
Figure 1E:
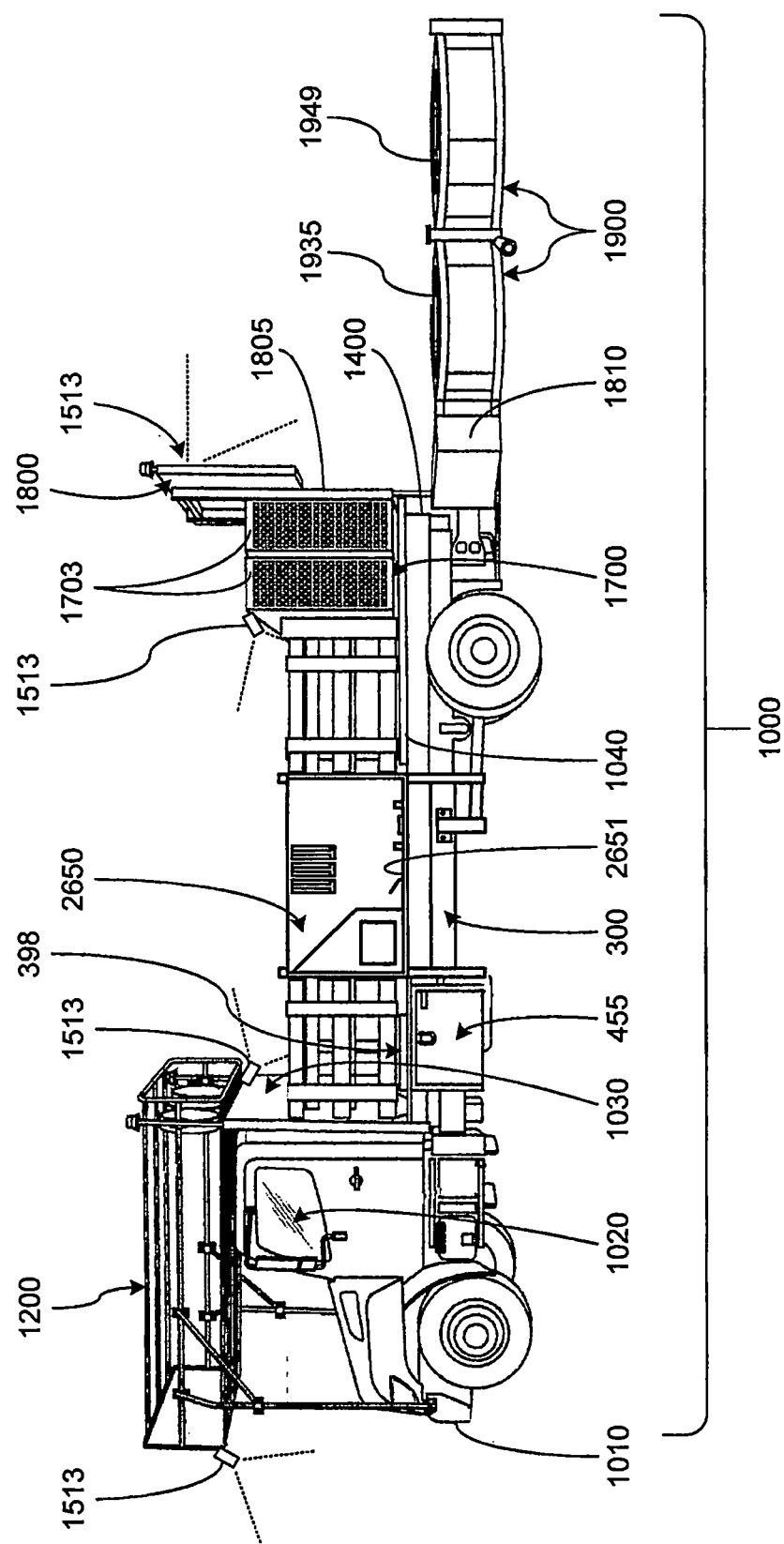
Figure 1F:
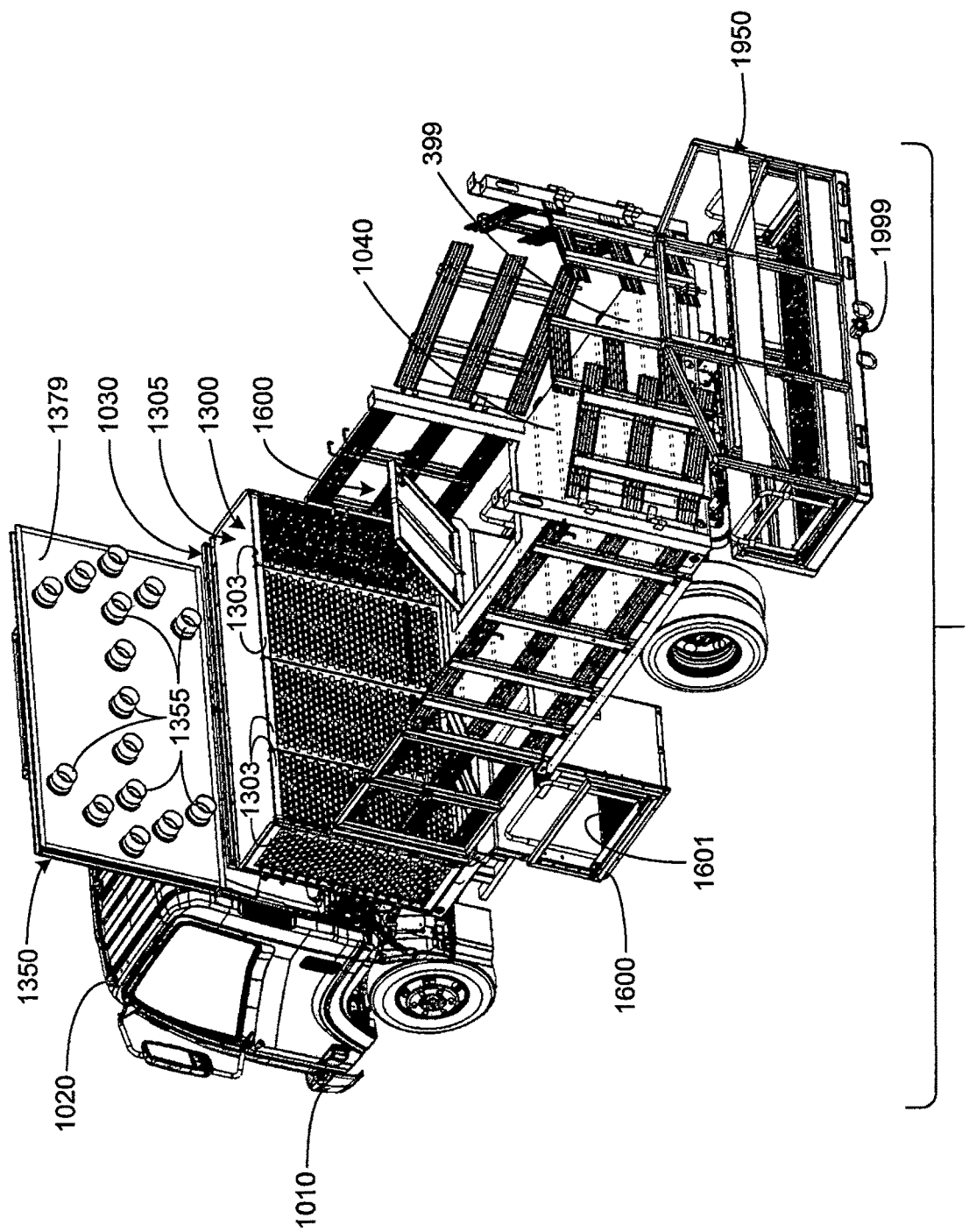
Figure 1G:
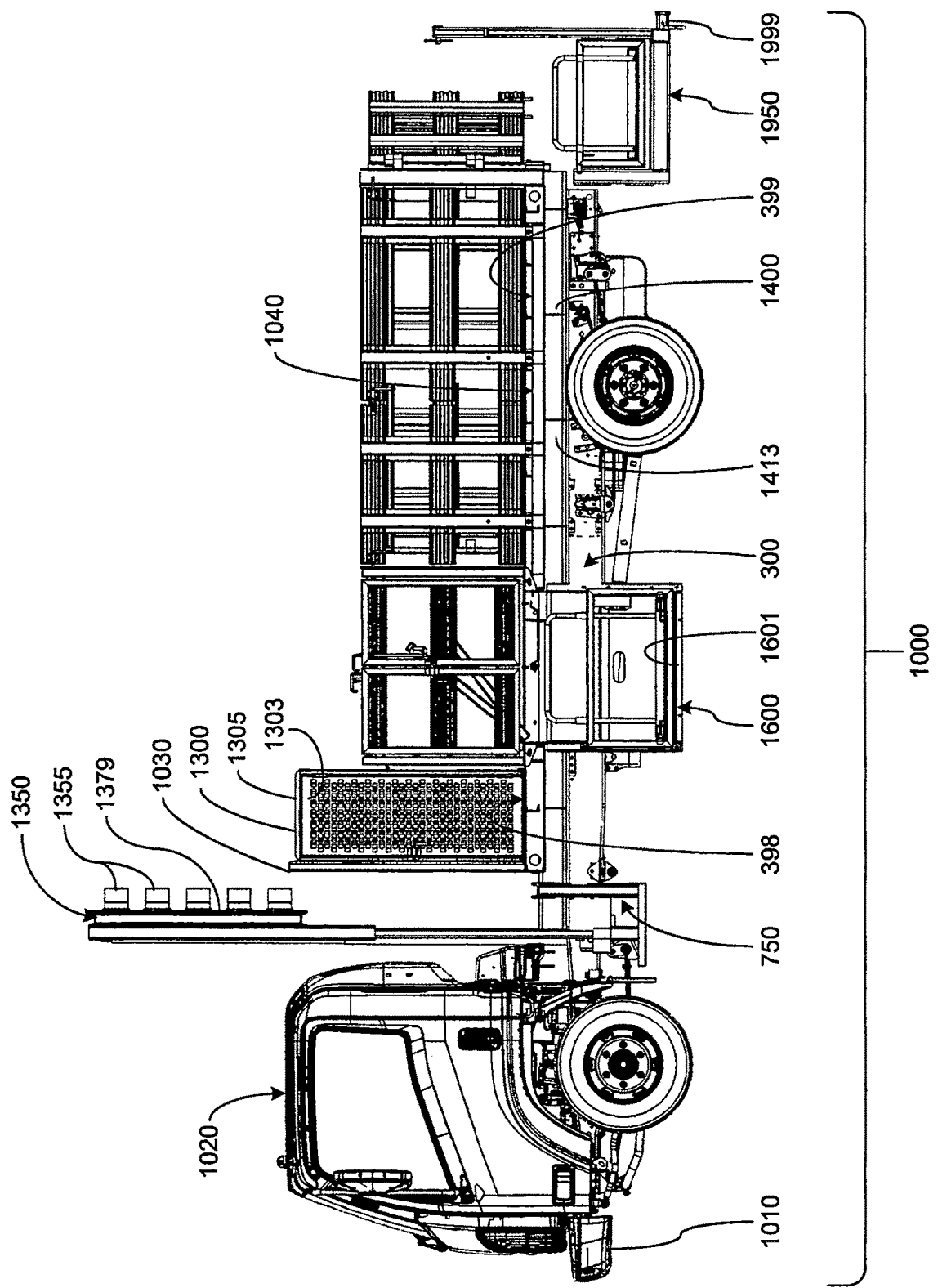
Figure 1H:
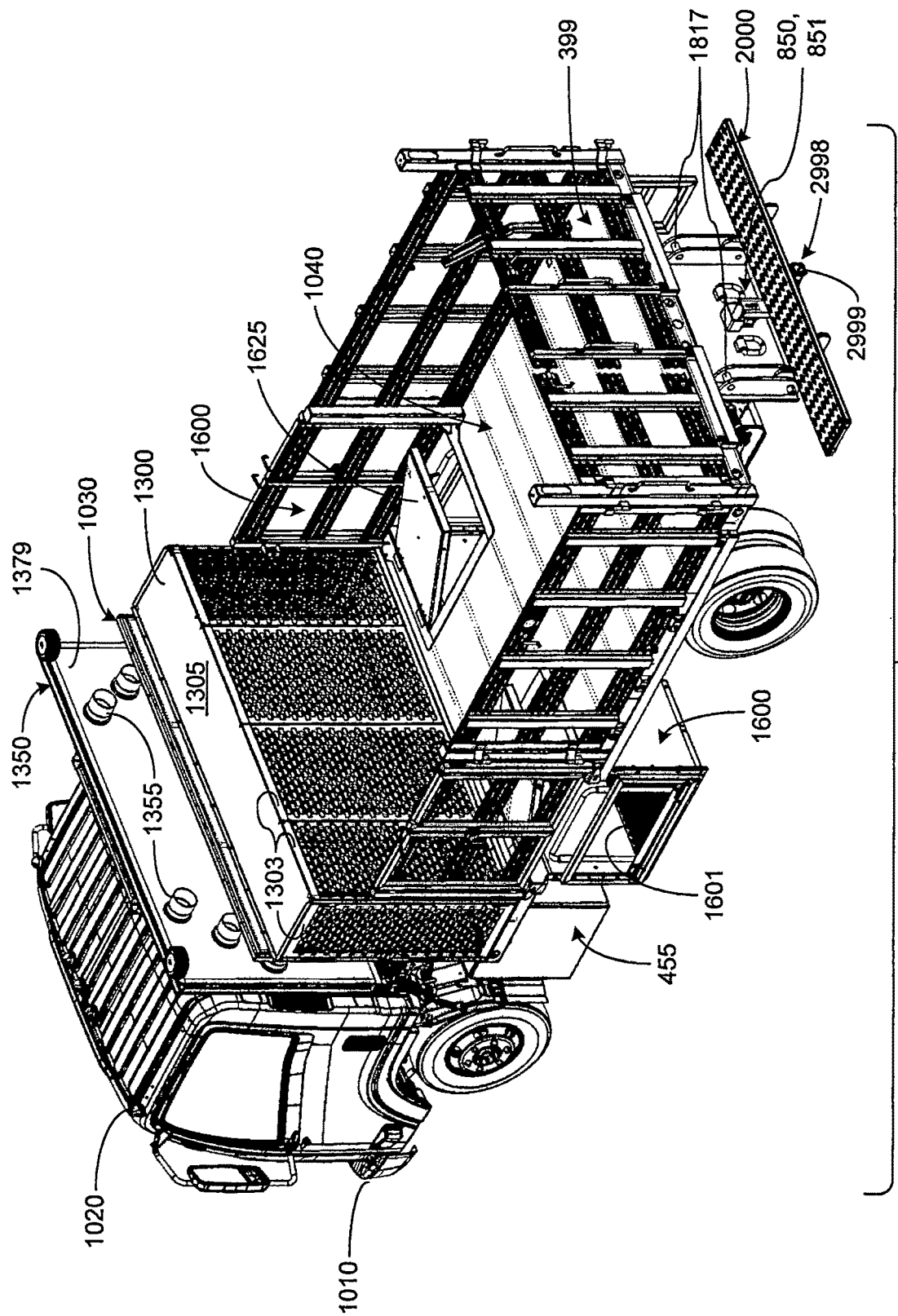
Figure 1I:
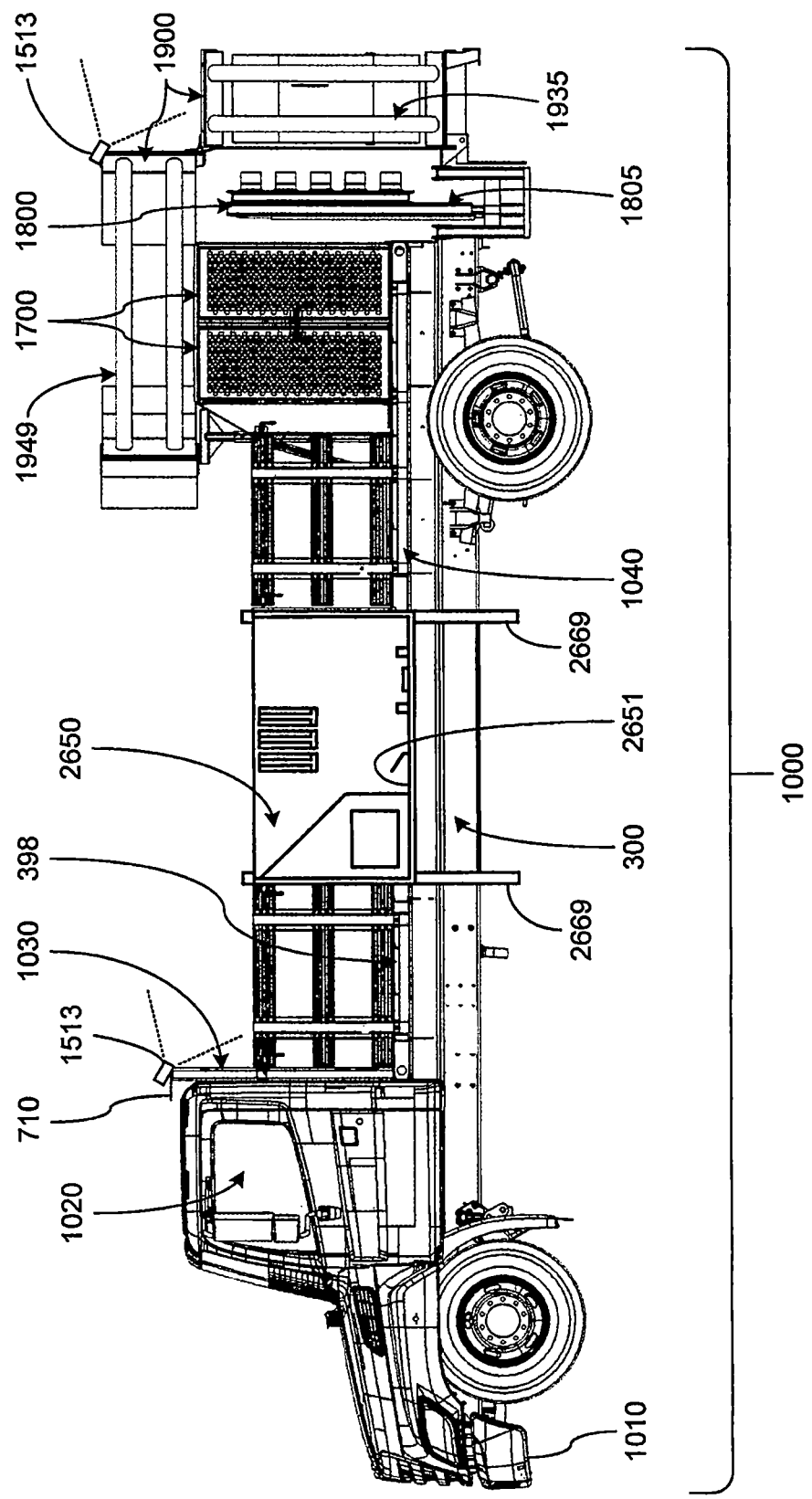
Figure 6C:
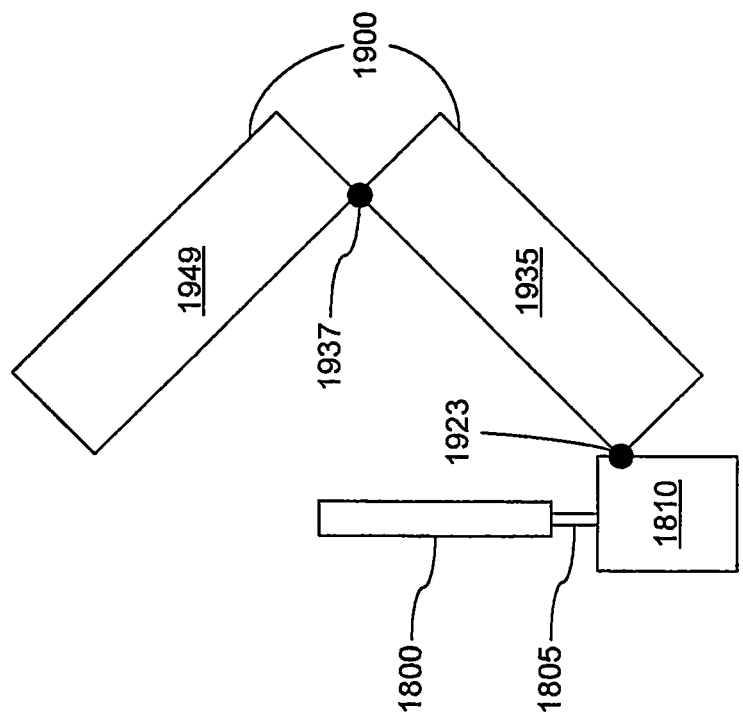
Figure 6B:
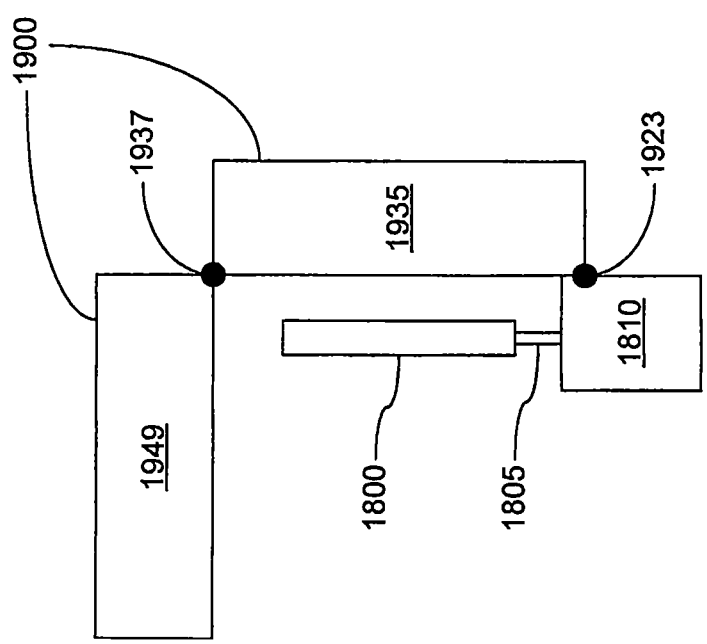
Figure 7A:
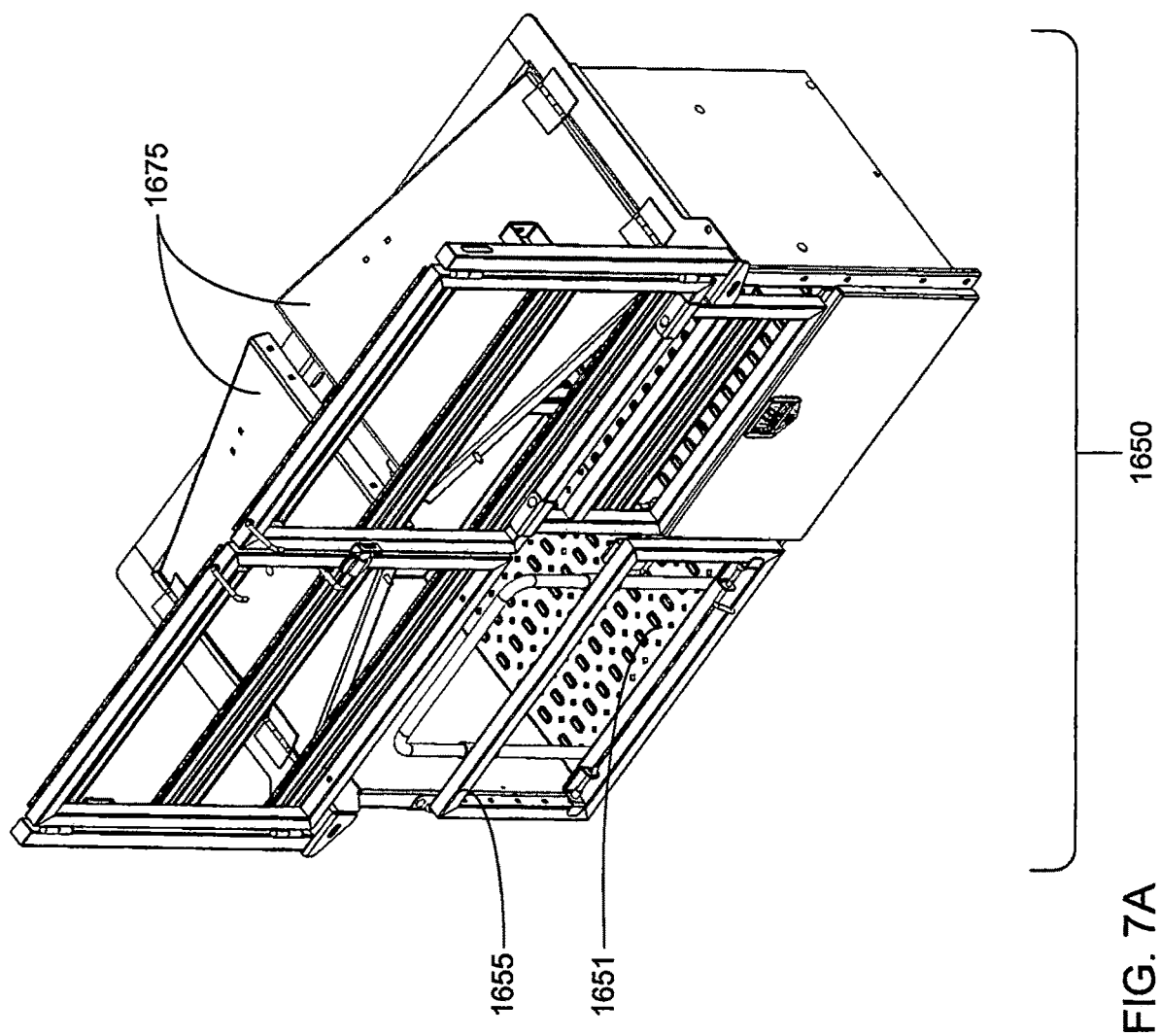
Figure 7B:
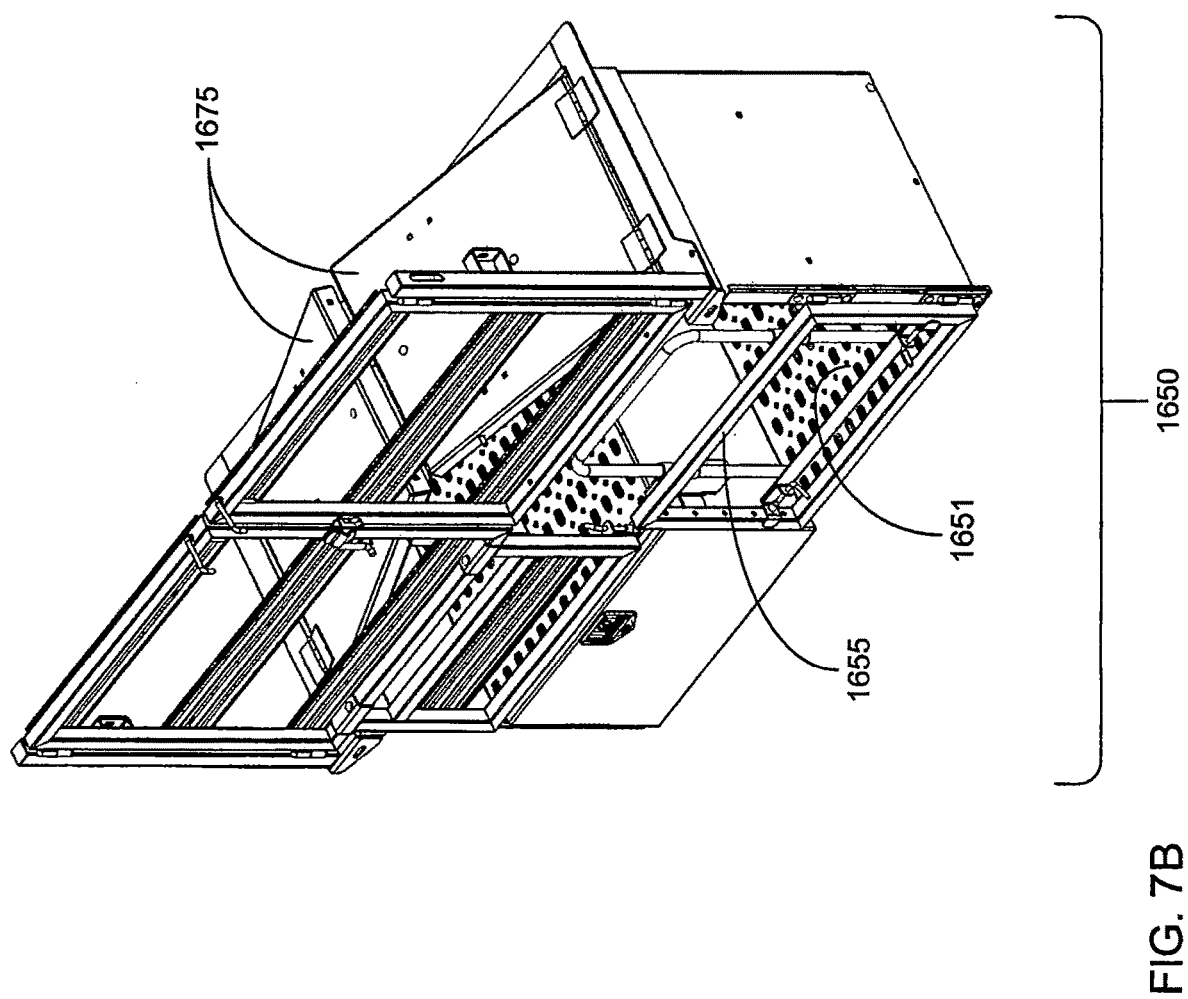
Figure 7C:
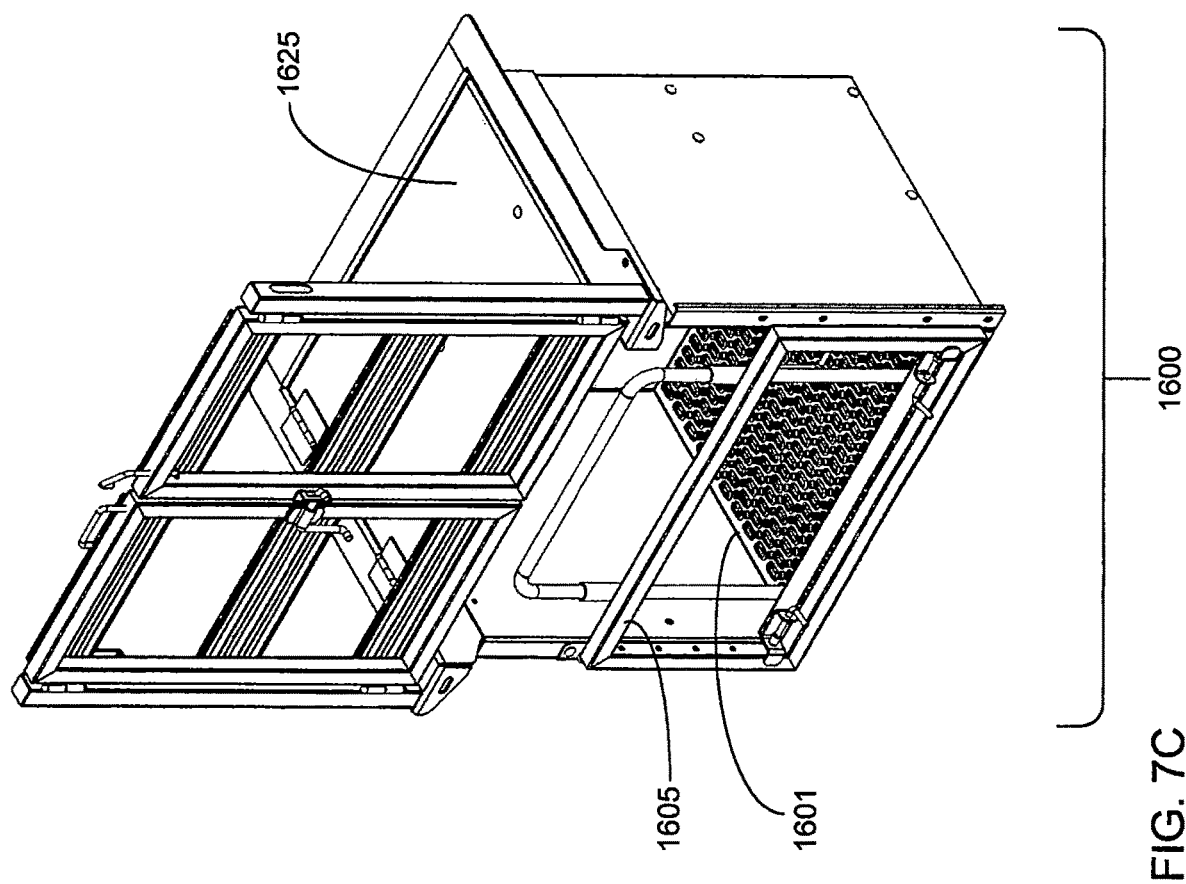
Figure 7D:
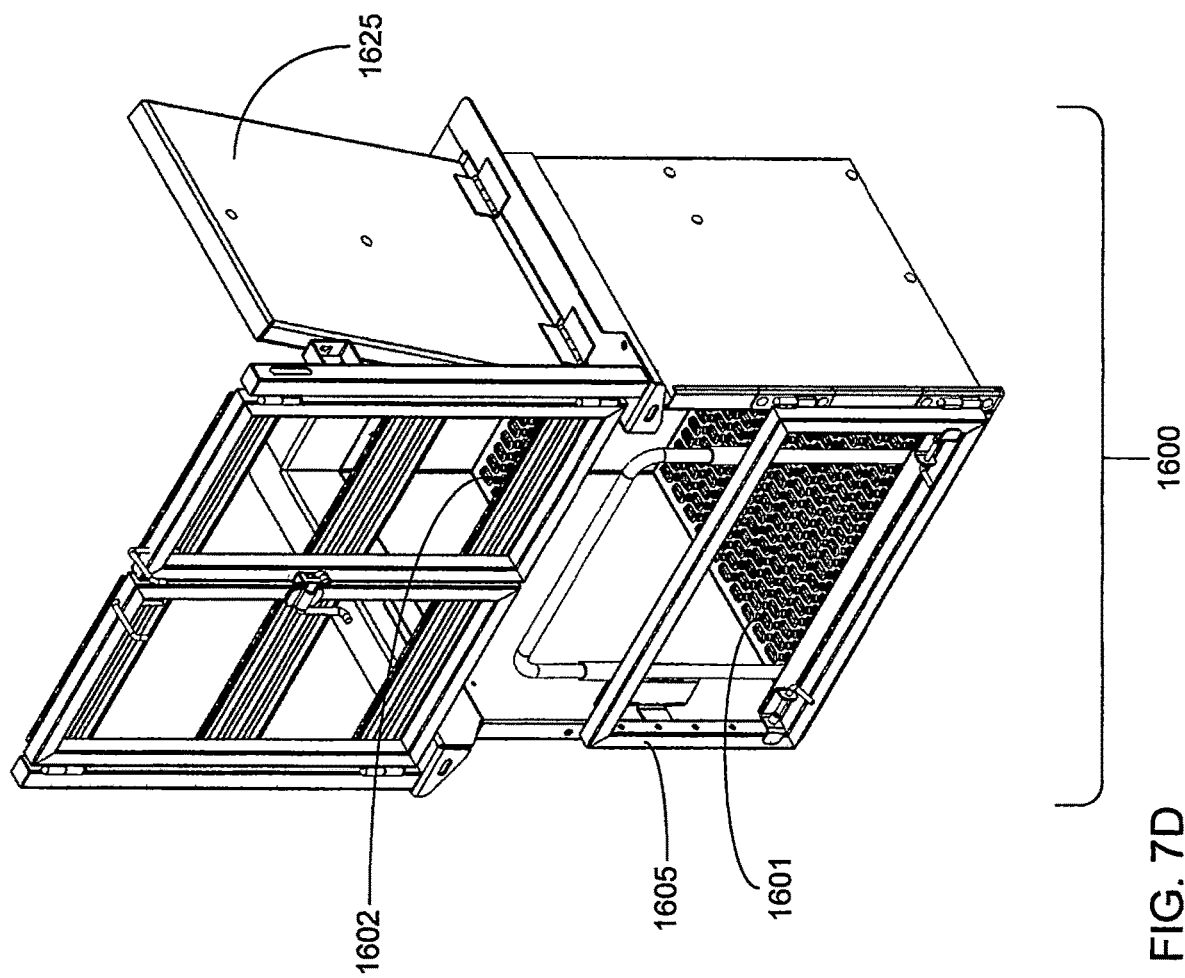
Figure 7E:
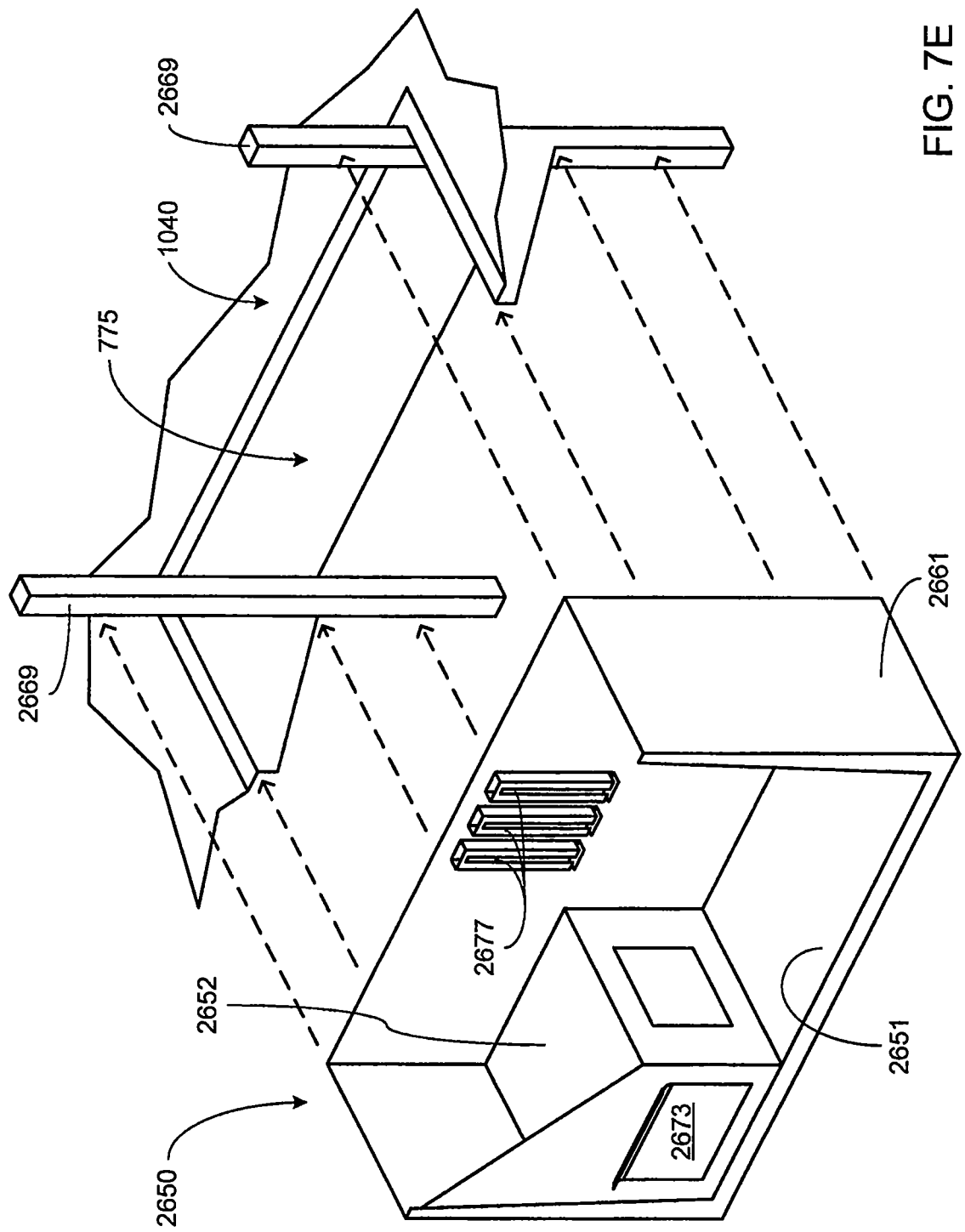
Figure 7F:
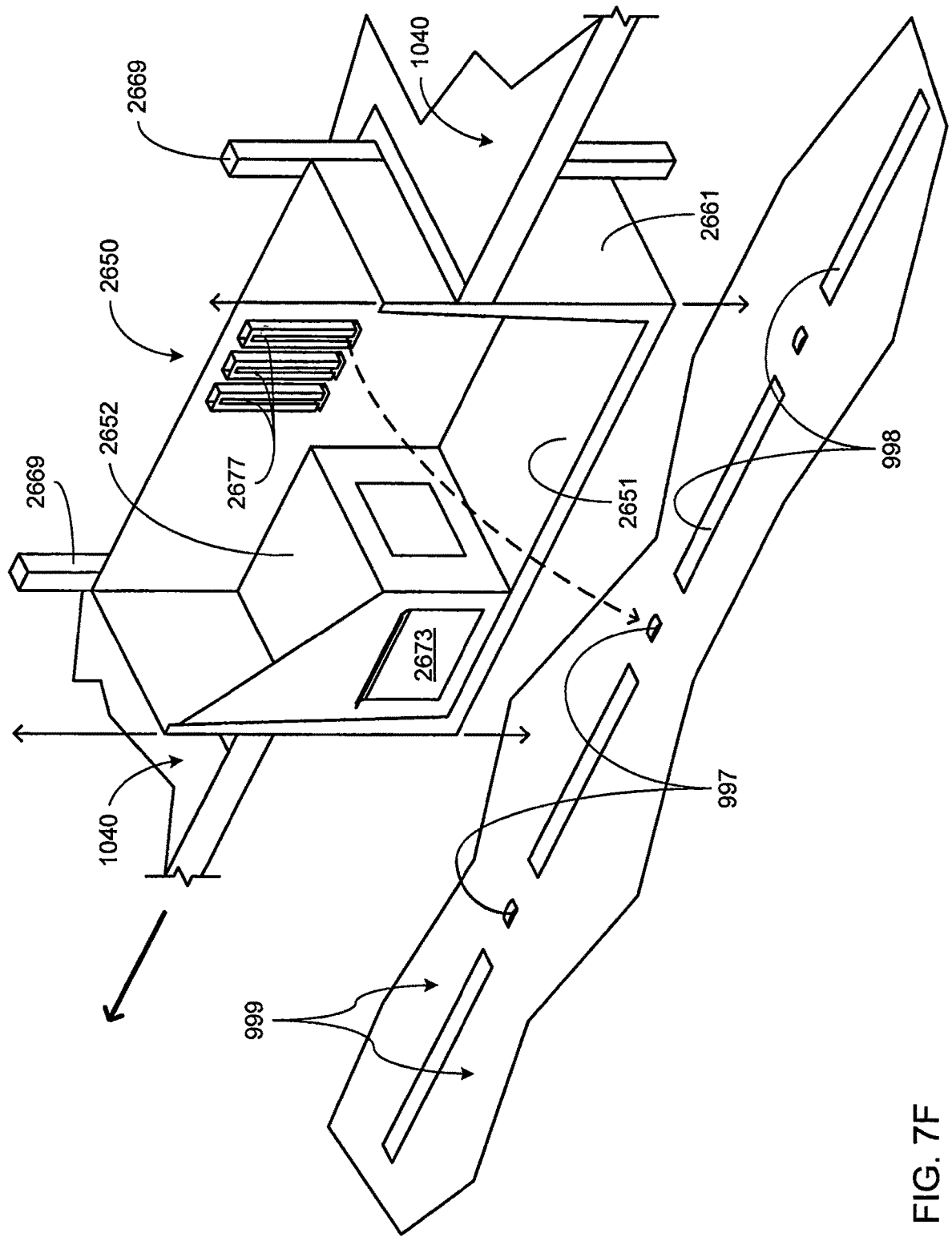
Figure 7G:
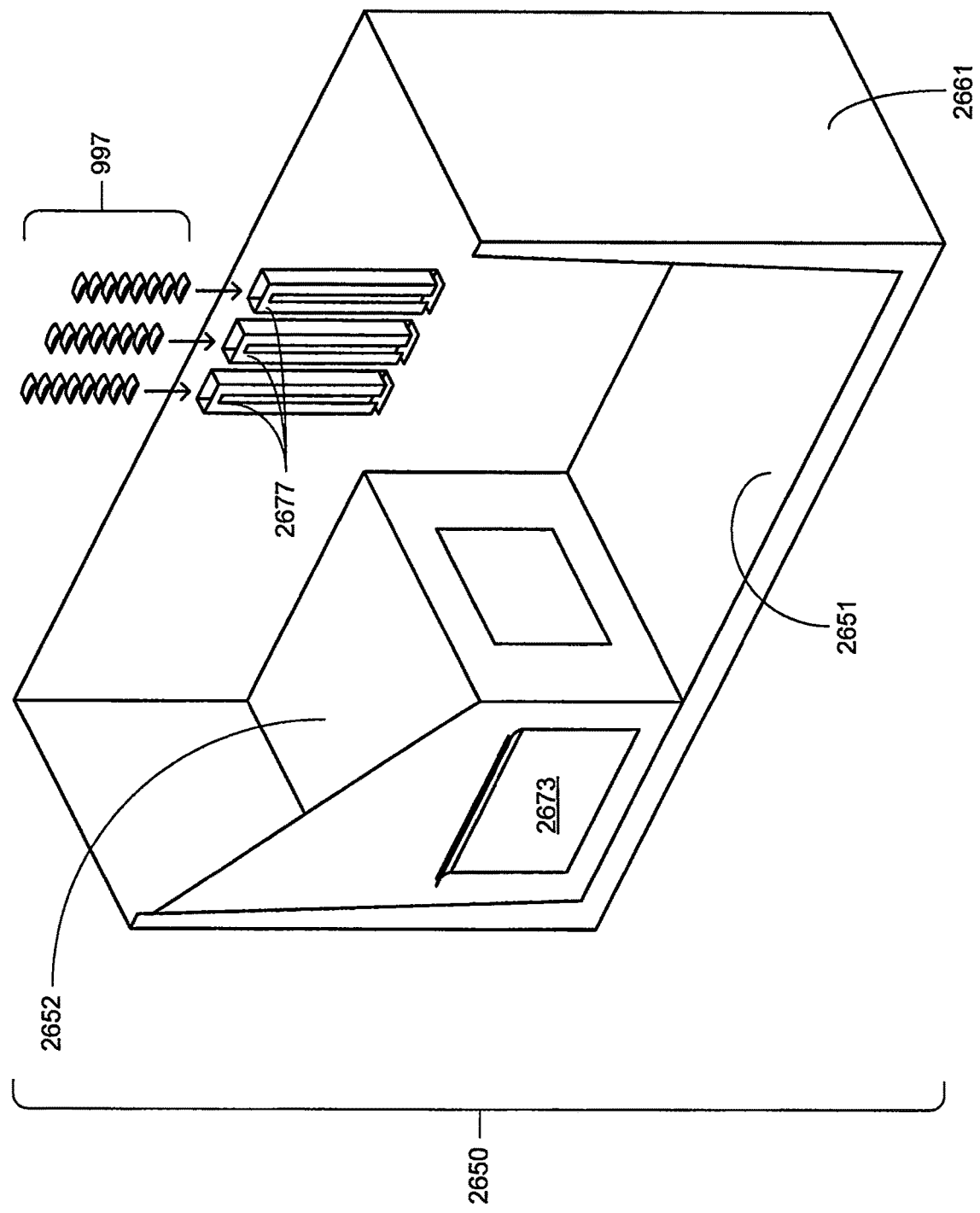
Figure 7H:
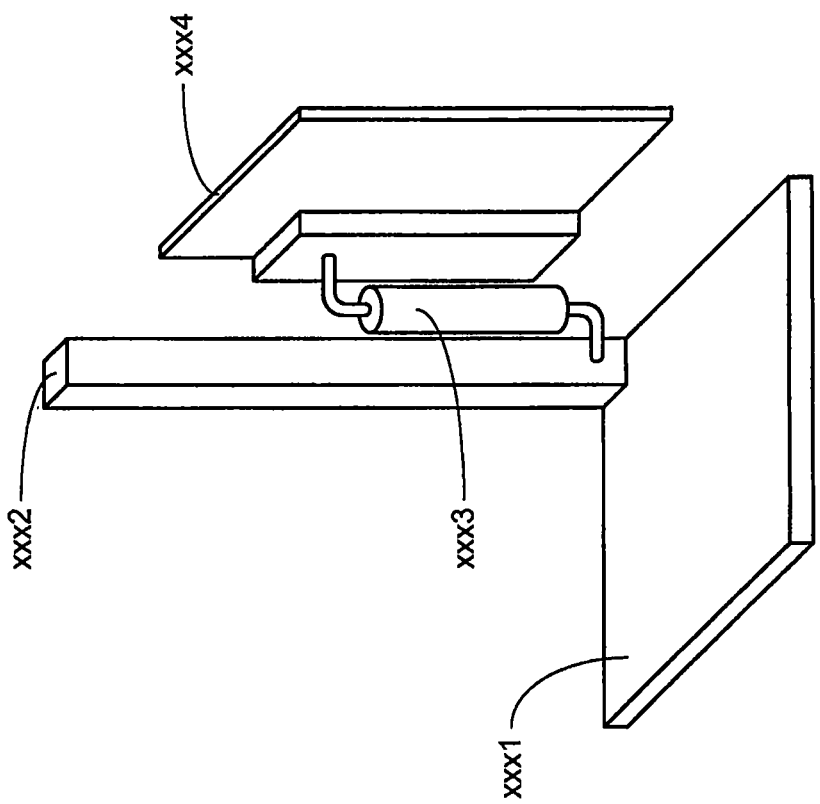
Figure 8A:
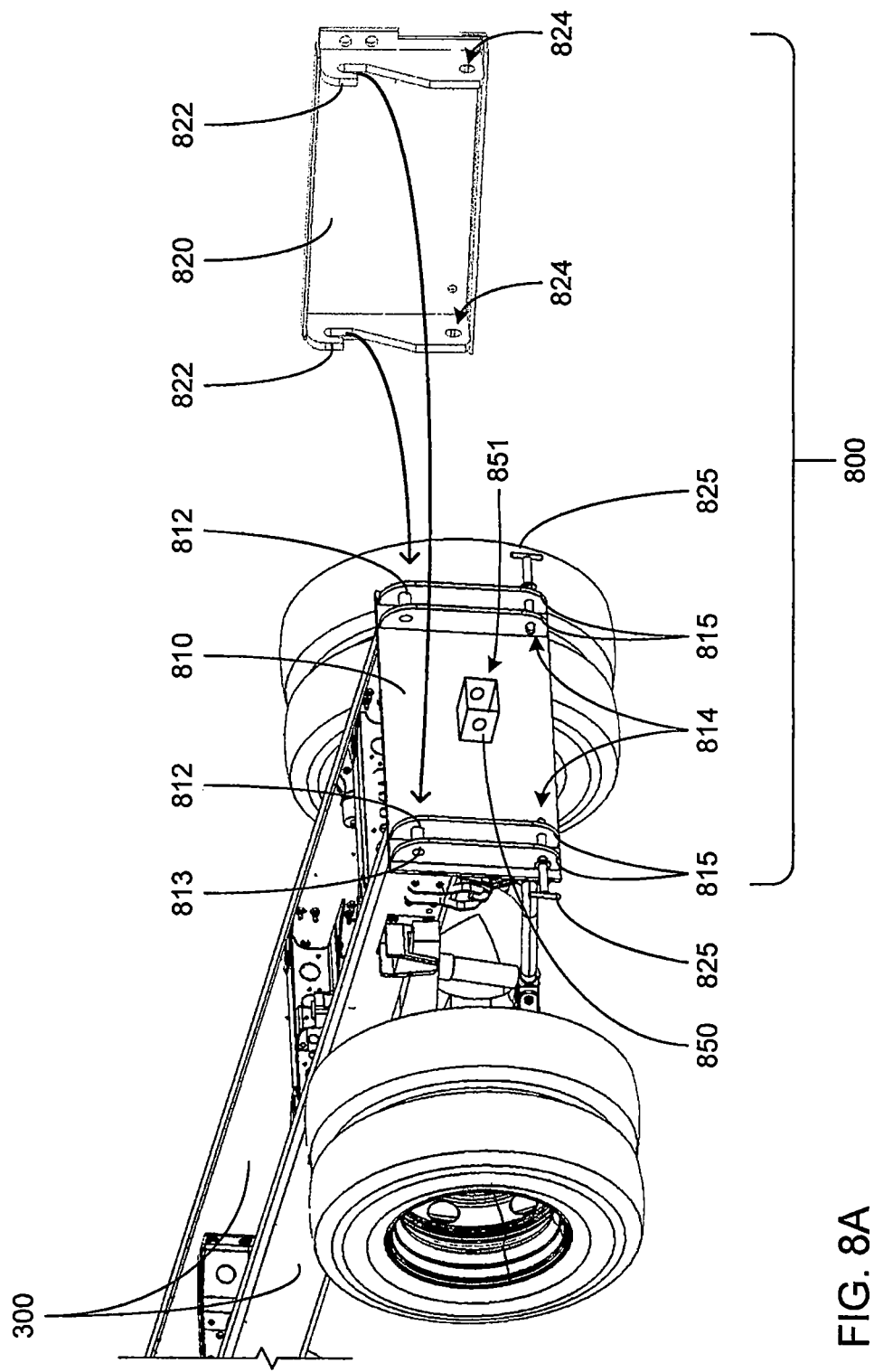
Figure 8B:
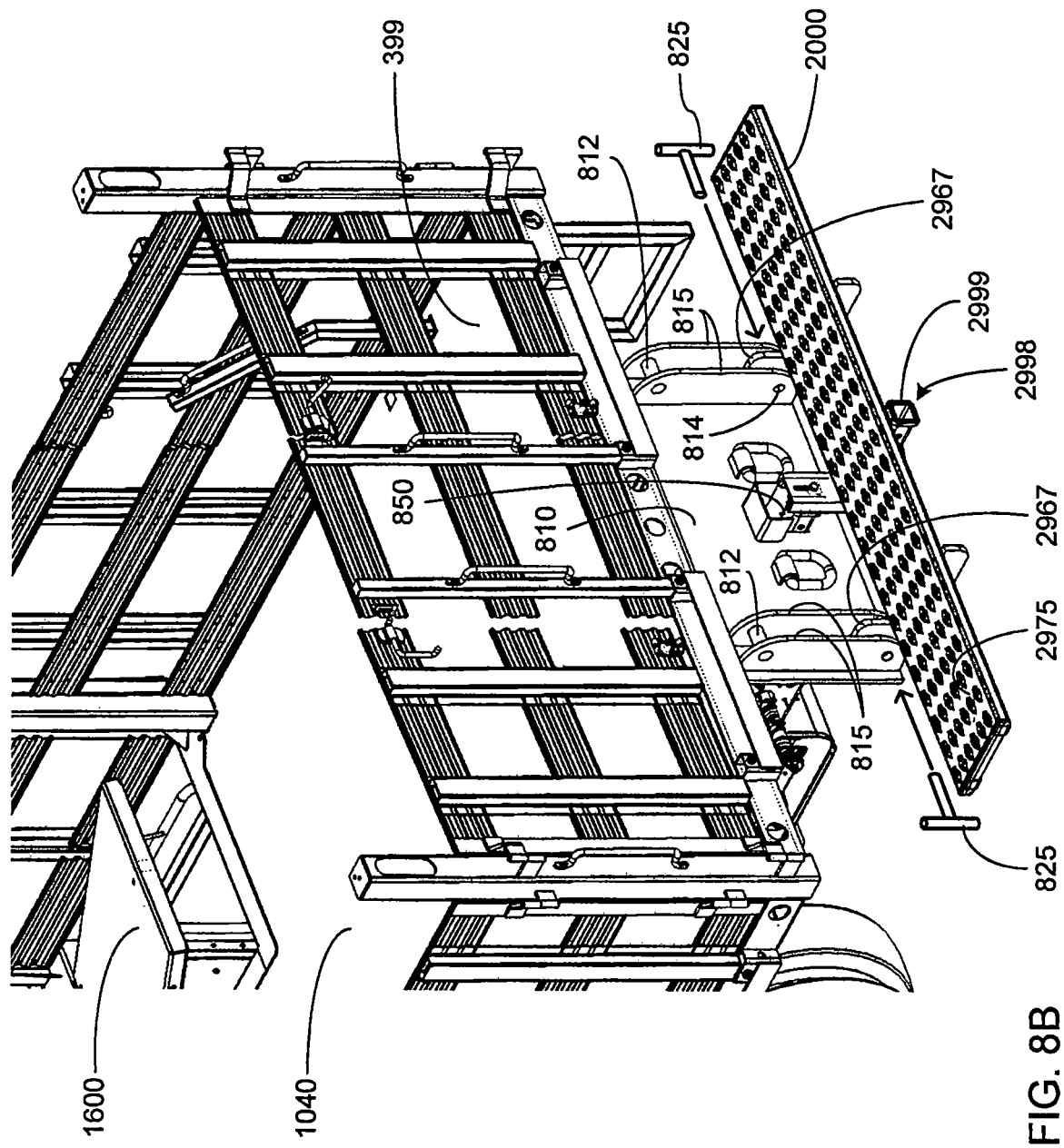
Figure 8C:
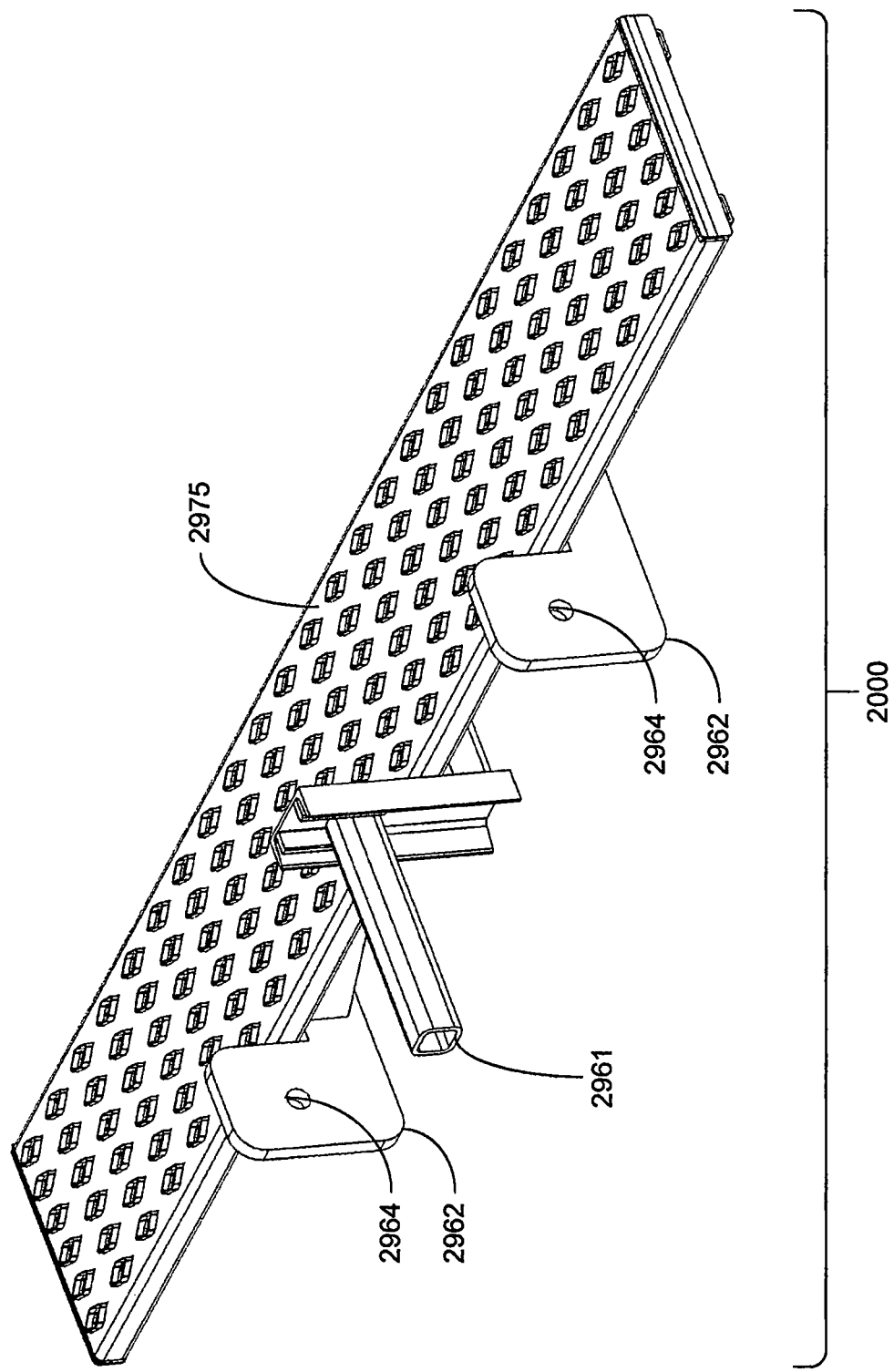
Figure 8D:
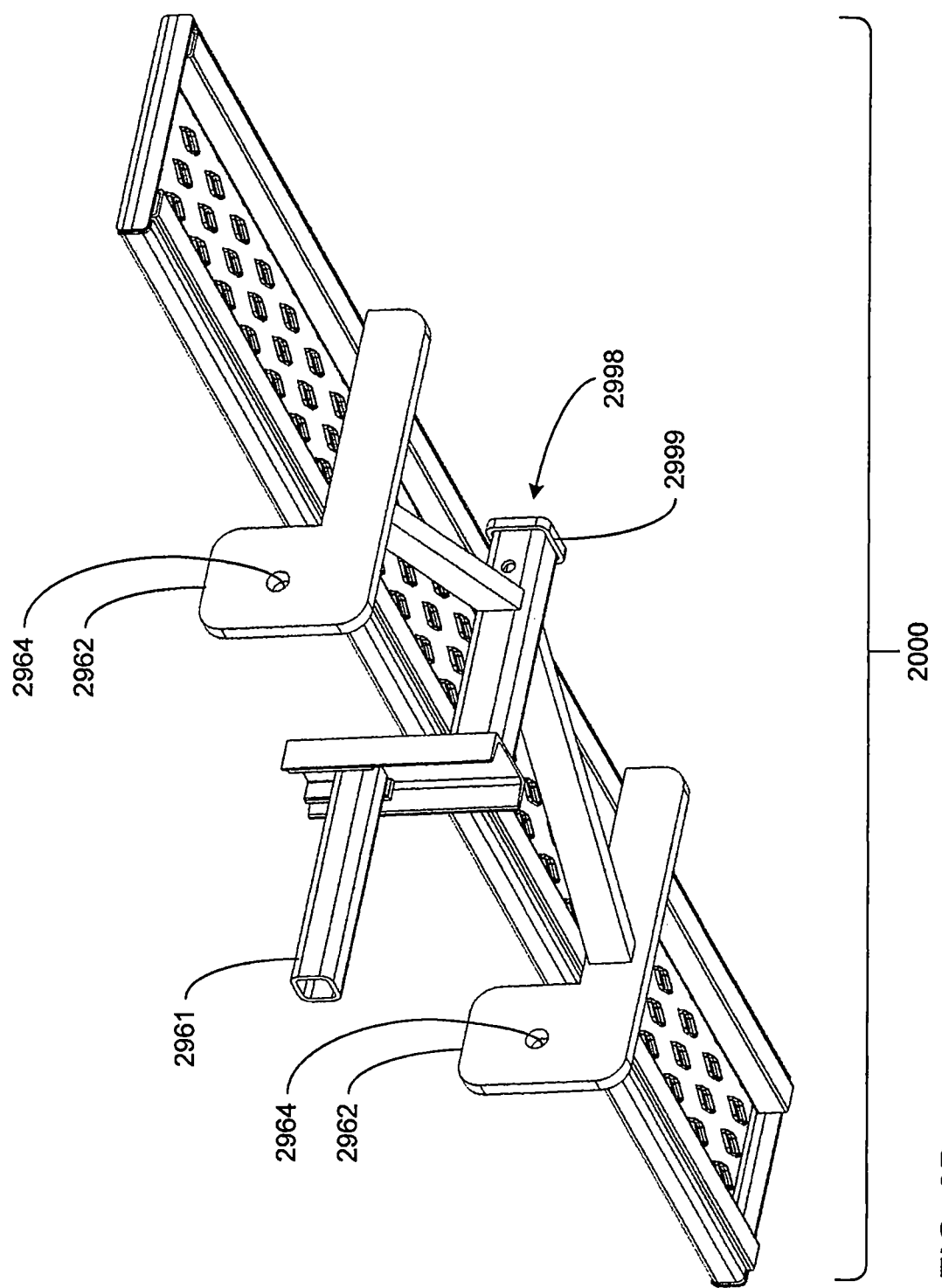
Figure 8E:
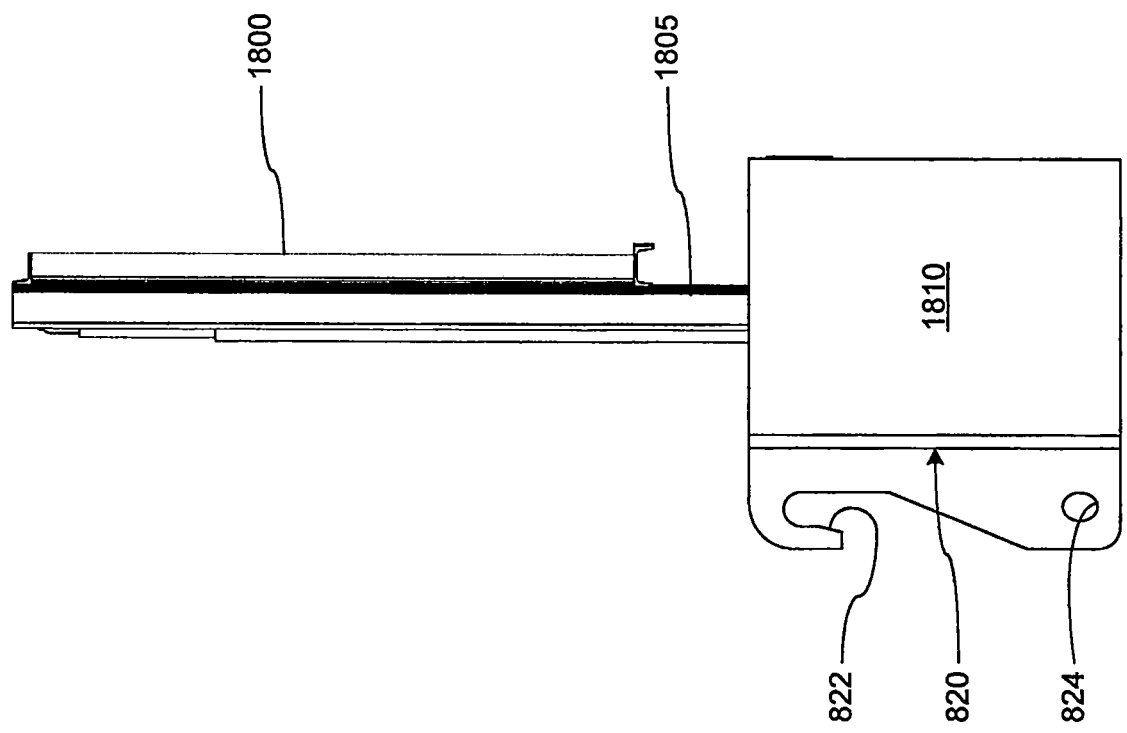
Figure 8F:
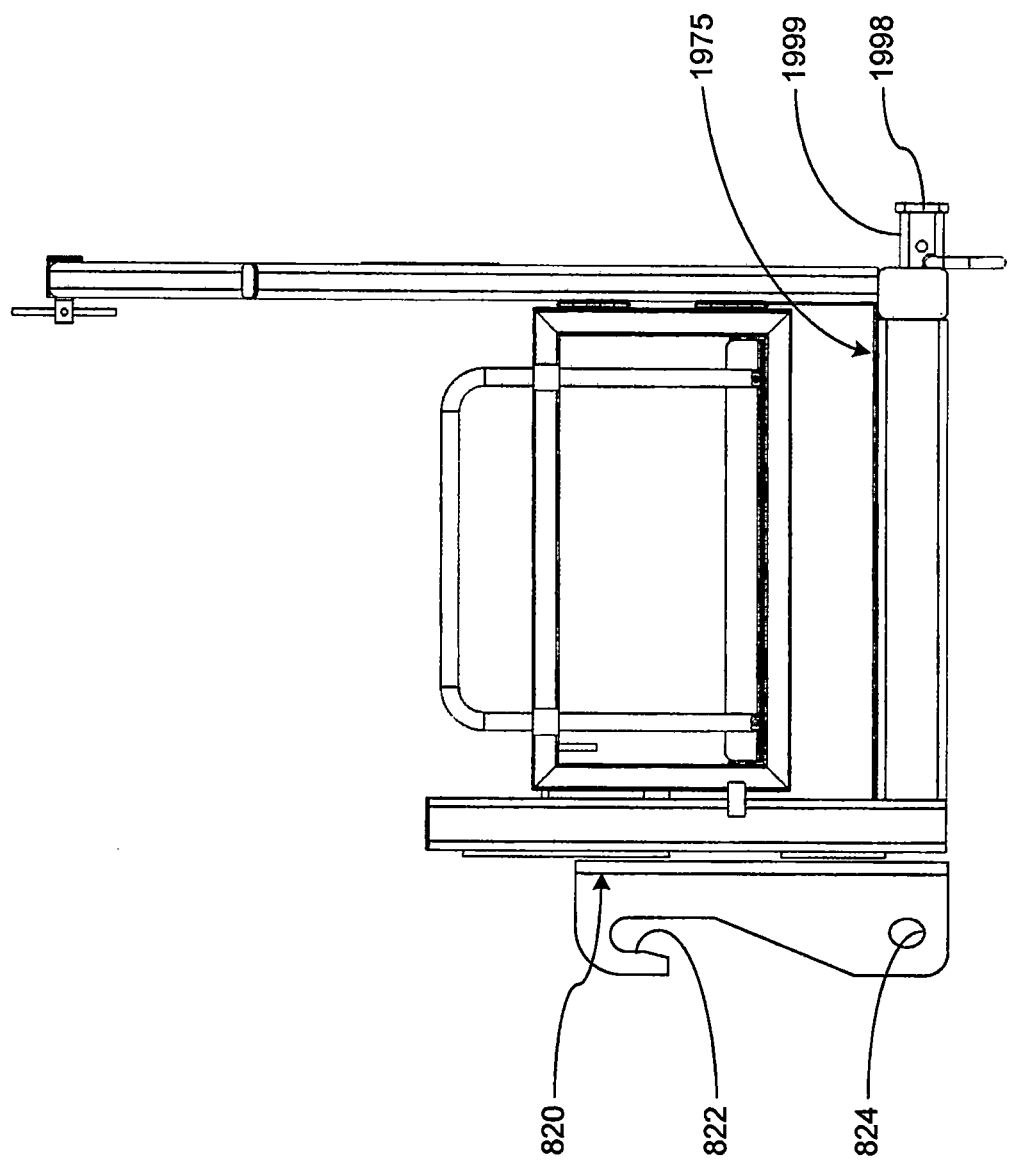
Figure 8G:
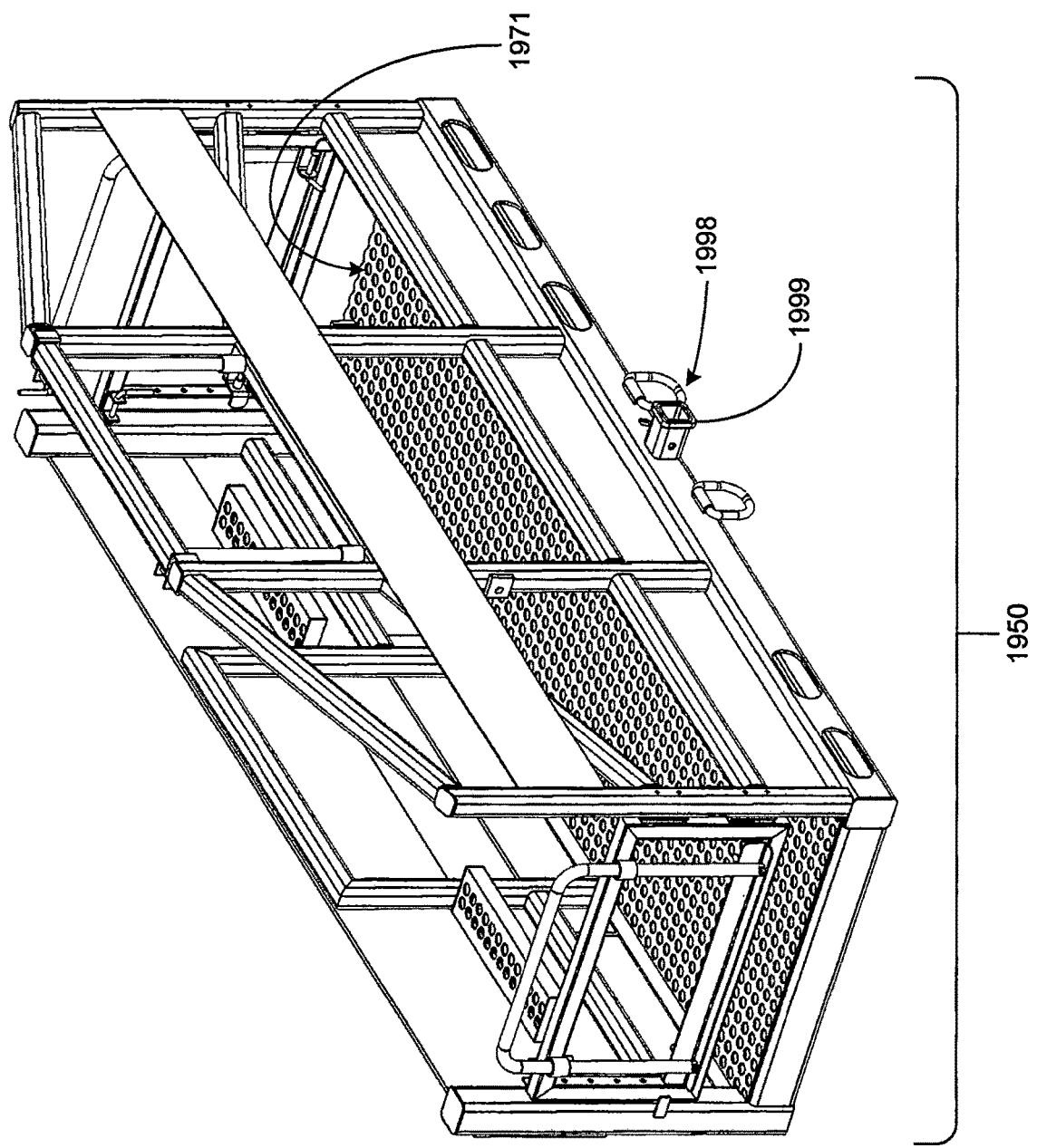

FIG. 6B is a schematic depiction of a TMA unit attachment folded upwardly and forwardly to a transport position overlying the stowed display board attachment;

FIG. 6C is a schematic depiction of the TMA unit attachment mid-way between being folded upwardly and forwardly towards its transport position, and being unfolded downwardly and rearwardly toward its operational position;

FIG. 6D is a schematic depiction of the TMA unit attachment with one of its two components extending rearwardly in its operational position;

FIG. 6E is a schematic depiction of the TMA unit attachment with both of its two components extending rearwardly in their operational position;

FIG. 7A is a perspective view of one of two embodiments of the relatively wide man basket attachment which is also shown in FIGS. 1A and 1D, with the view showing upper doors of the man basket attachment partially pivoted open;

FIG. 7B is a perspective view of the other of two embodiments of the relatively wide man basket attachment which is also shown in FIGS. 1B and 1C, with the view showing upper doors of the man basket attachment partially pivoted open;

FIG. 7C is a perspective view of one of two embodiments of the relatively narrow man basket attachment which is also shown in FIGS. 1F, 1G and 1H, with the view showing the upper door of the man basket pivoted closed to align with the flat upper surface of the flatbed of a safety truck;

FIG. 7D is another perspective view of the other of two embodiments of the relatively narrow man basket attachment, with the view showing the upper door of the man basket attachment pivoted to an open position;

FIG. 7E is a perspective view of the relatively wide man basket attachment also shown in FIG. 1I, with the view showing how the man basket attachment is received in an inset of the flatbed of a safety truck, and showing two guide posts the man basket attachment can move along while being raised and lowered relative to the safety truck's flatbed;

FIGS. 7F and 7G are other perspective views of the man basket attachment shown in FIG. 7E;

FIG. 7H is a schematic depiction of a horizontally extending stand-on surface, an upstanding housing sidewall, and a hydraulic cylinder interposed between a post connected to the stand-on surface and a plate connected to the upstanding housing sidewall, by which arrangement the stand-on surface can move up and down relative to the upstanding sidewall;

FIG. 8A is a perspective view of a rear region of a safety truck and showing heavy duty connection point components for supporting various attachments;

FIG. 8B is a rear perspective view showing a step bumper attachment connected to the rear of a safety truck using the heavy duty connection components shown in FIG. 8A;

FIGS. 8C and 8D are other perspective views of the step bumper attachment shown in FIG. 8B;

FIG. 8E is an elevational view of a display board attachment able to be coupled to some of the heavy duty connection components shown in FIG. 8A;

FIG. 8F is an elevational view of a safety basket attachment able to be coupled to some of the heavy duty connection components shown in FIG. 8A;

FIG. 8G is a perspective view of the safety basket attachment; and

Figure 9:
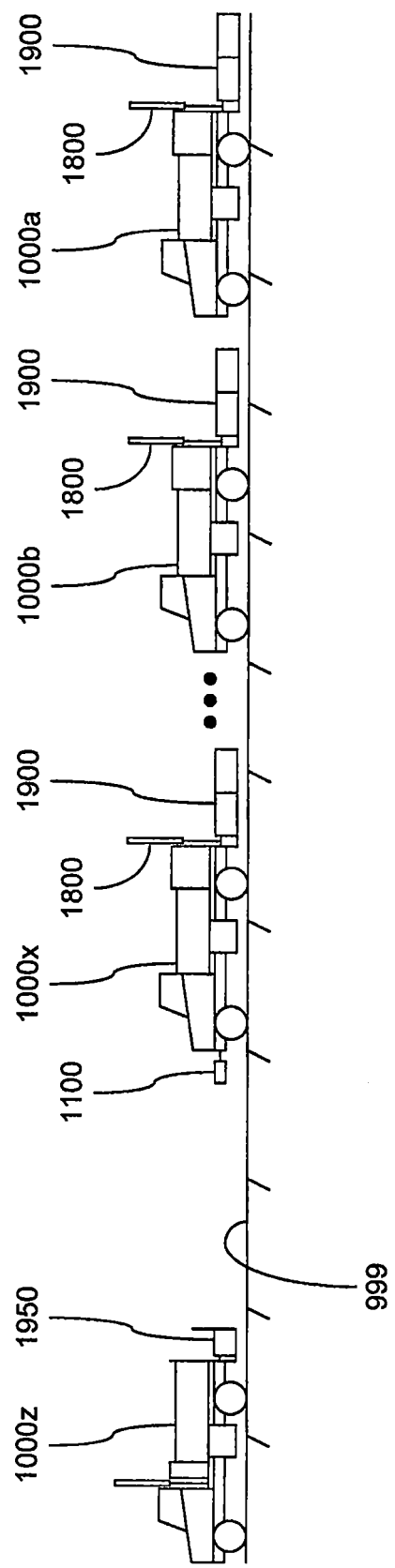

FIG. 9 is an elevational view of an embodiment of a line of safety trucks operated in a cooperative manner to safely dissipate the kinetic energy of a vehicular impact through use of the inertia of a succession of safety trucks, and the crumpling of a succession of associated TMA units.

DETAILED DESCRIPTION

This detailed description discloses a plurality of exemplary safety truck embodiments, attachment embodiments and connection point embodiments. The invention, as claimed, is broader than, and is not limited by the several exemplary embodiments that are disclosed in this document. The terms used in the claims have their full ordinary meanings except as is otherwise defined in this document.

Shown in FIG. 1A through FIG. 1I are example embodiments of flatbed safety trucks 1000 to which a variety of attachments can be releasably and interchangeably coupled at connection point embodiments, to enable the safety trucks 1000 to be used with increased effectiveness to safeguard roadway construction, maintenance and repair personnel as they perform tasks within and near to roadway workzones and worksites.

The most basic components of the safety truck embodiments 1000 shown in FIGS. 1A through 1I include a forwardly facing cab 1020, a rearwardly extending flatbed 1040, and a pair of lengthy spaced-apart channel members 300 that form a frame of each of the safety truck embodiments 1000 that underlies and connects the cab 1020 and the flatbed 1040 as is best shown in FIGS. 1D, 1I, 3A and 3C.

The depicted safety truck embodiments 1000 have substantially horizontally extending front bumpers 1010 (best shown in FIGS. 1A through 1E) that are the forwardmost component of the depicted safety truck embodiments 1000. Several of the depicted safety truck embodiments 1000 have an upstanding bulkhead 1030 located between the forwardly-facing cab 1020 and the rearwardly-extending flatbed 1040.

The following DIVISION A of this document provides a summary the many new safety truck CONNECTION POINT embodiments that may be provided by the safety truck embodiments 1000. DIVISION B summarizes the many new safety truck ATTACHMENT embodiments that may be provided by the safety truck embodiments 1000. DIVISION C discloses new METHODS OF OPERATION of safety truck embodiments 1000 that may enhance the capability of the safety truck embodiments 1000 to guard and protect roadway construction, maintenance and repair personnel while they work within and relatively near to roadway workzone and worksite locations.

Division A: Summary of Safety Truck Connection Points

The exemplary safety truck embodiments 1000 that are disclosed in this document may be provided with one or more connection points such as are listed below, to enable the safety truck embodiments 1000 to be provided with such attachments as are disclosed in DIVISION B of this document.

1) A Forwardmost Connection Point 650

Figure 2A:
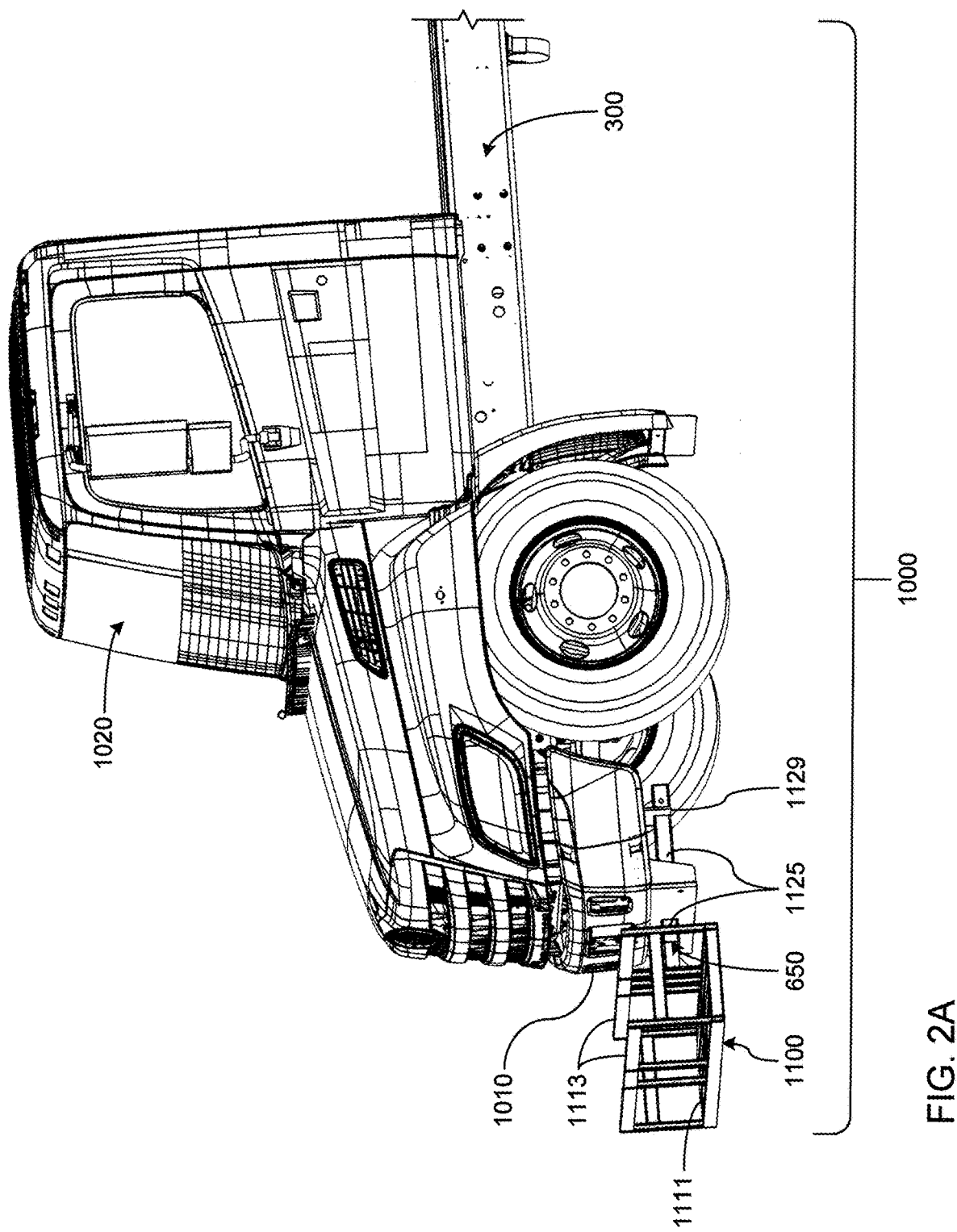
FIG. 2A is a left side perspective view of a cab portion of a typical safety truck, with a rumble strip basket attachment shown carried by the truck's forwardmost connection point and extending forwardly relative to a front bumper of the safety truck.
Figure 2B:
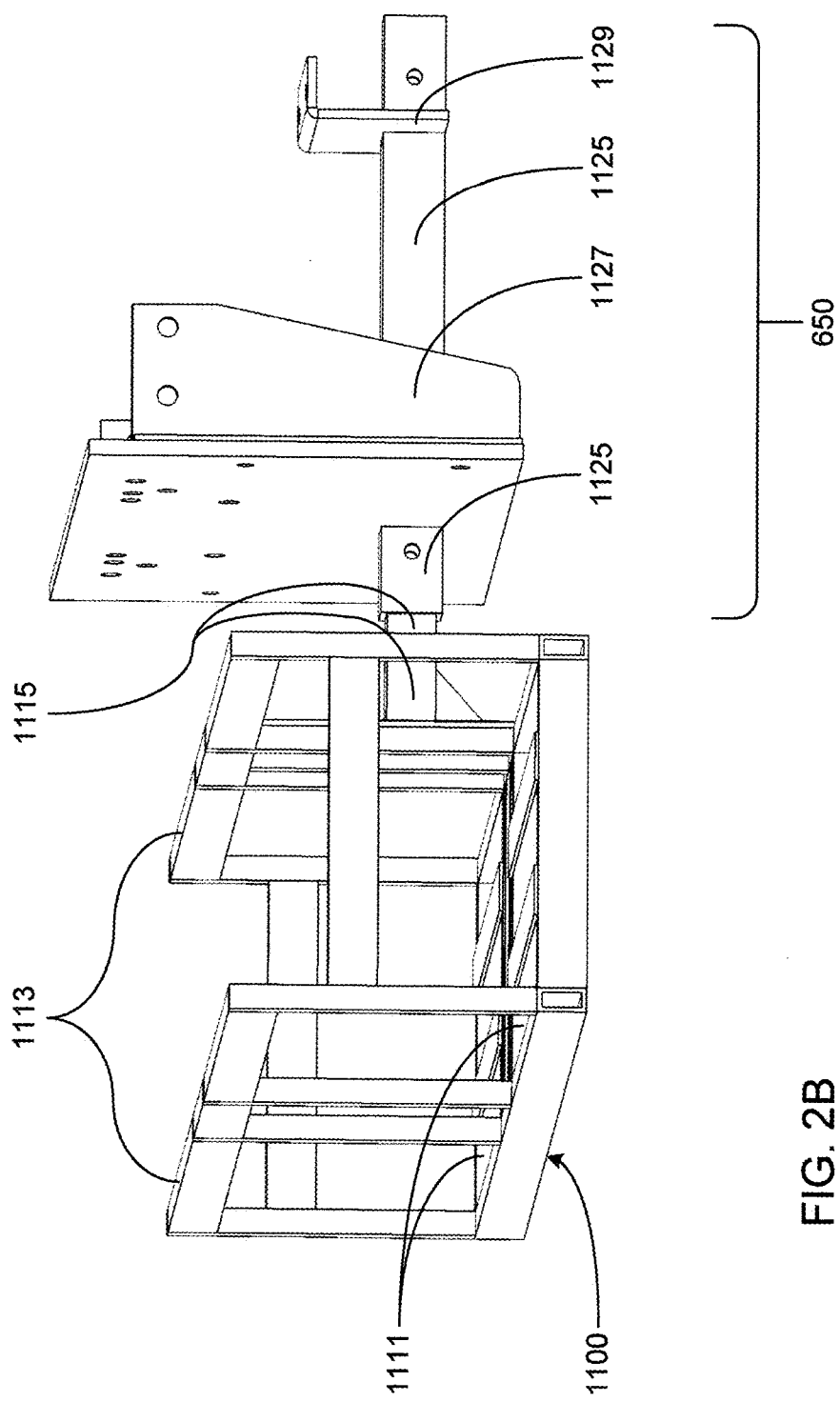
FIG. 2B is a left side perspective view on an enlarged scale of components of a forwardmost connection point shown supporting the rumble strip basket attachment shown in FIG. 2A.

Shown in FIG. 1A, and more clearly in FIG. 2B, is a forwardmost connection point 650 that includes an elongate, tubular sleeve 1125 of rectangular cross-section. A front portion of the elongate sleeve 1125 is rigidly connected to a mounting plate assembly 1127 that may be attached to the front bumper 1010 of a safety truck embodiment 1000, or to other nearby frame components of the safety truck embodiment 1000. A rear end region of the elongate sleeve 1125 extends through and is supported by a mounting bracket 1129 (shown in FIGS. 2A and 2B) that also connects to framework (not shown) of the safety truck embodiment—by which arrangement the rectangular tube of the hitch receiver 1125 is rigidly supported near both ends thereof so the elongate sleeve 1125 can carry various attachments such as a rumble strip basket 1100 which is shown in FIGS. 2A and 2B.

2) Dual Bulkhead Connection Points 710

Figure 1J:
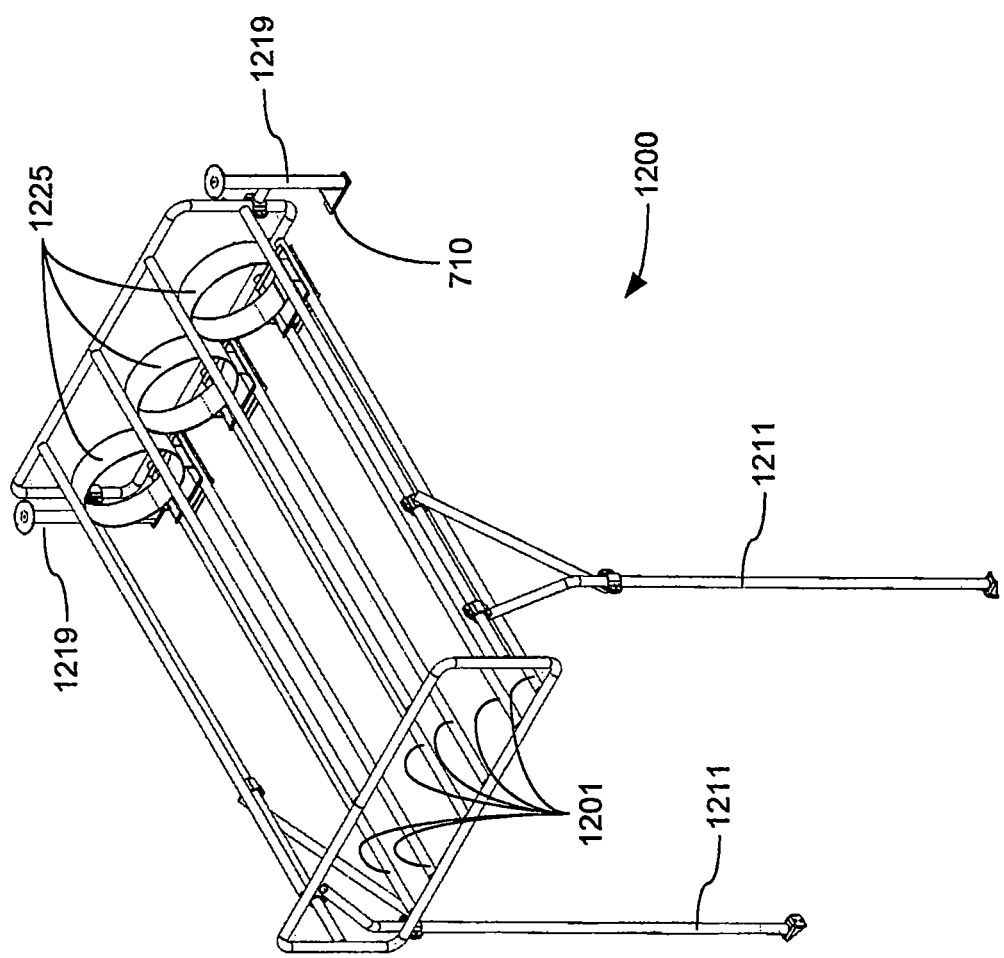
Figure 3C:
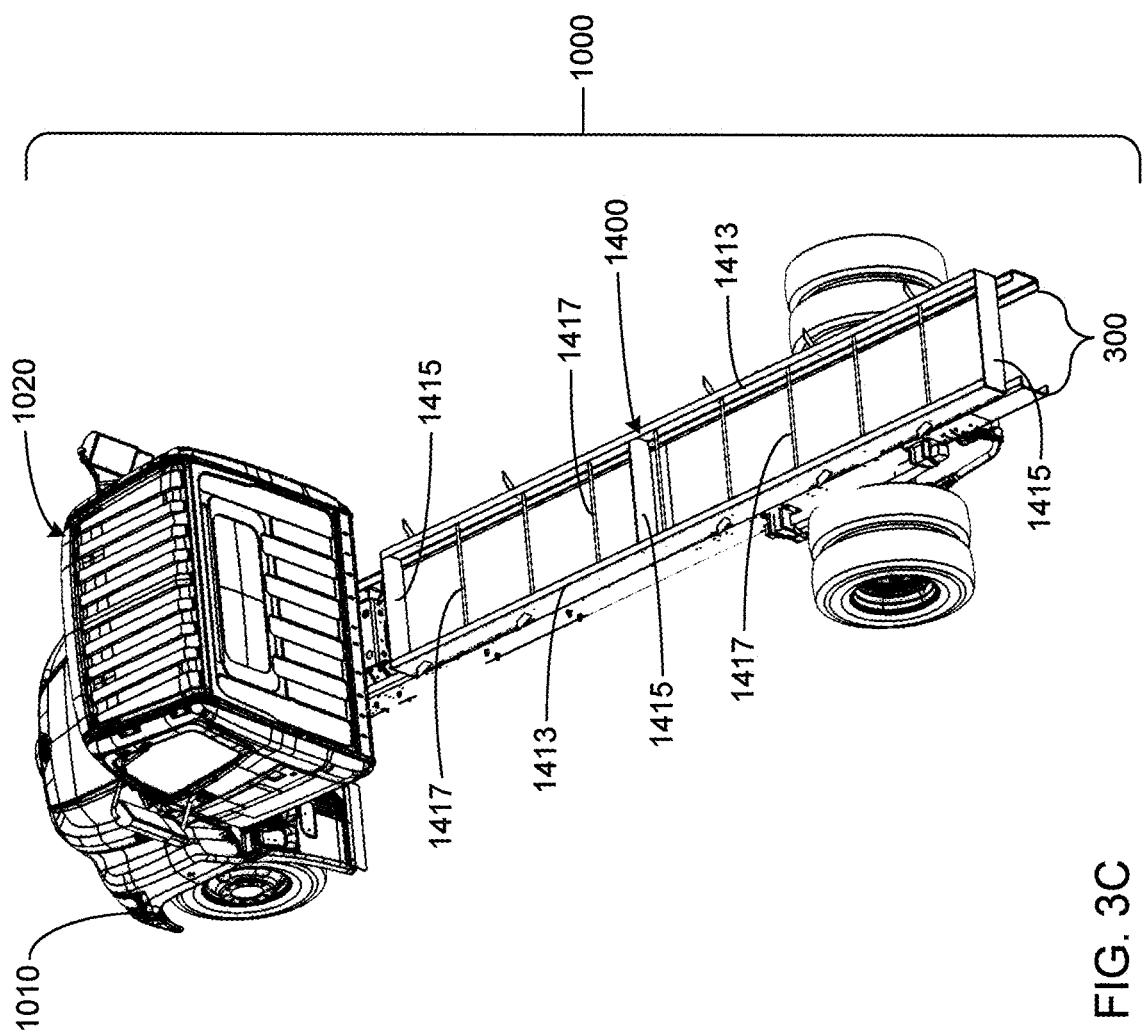
FIG. 3C is a perspective view similar to FIG. 3A, showing how the weight frame attachment shown in FIG. 3B is mounted atop the pair of elongate channel members shown in FIG. 3A.
Figure 3D:
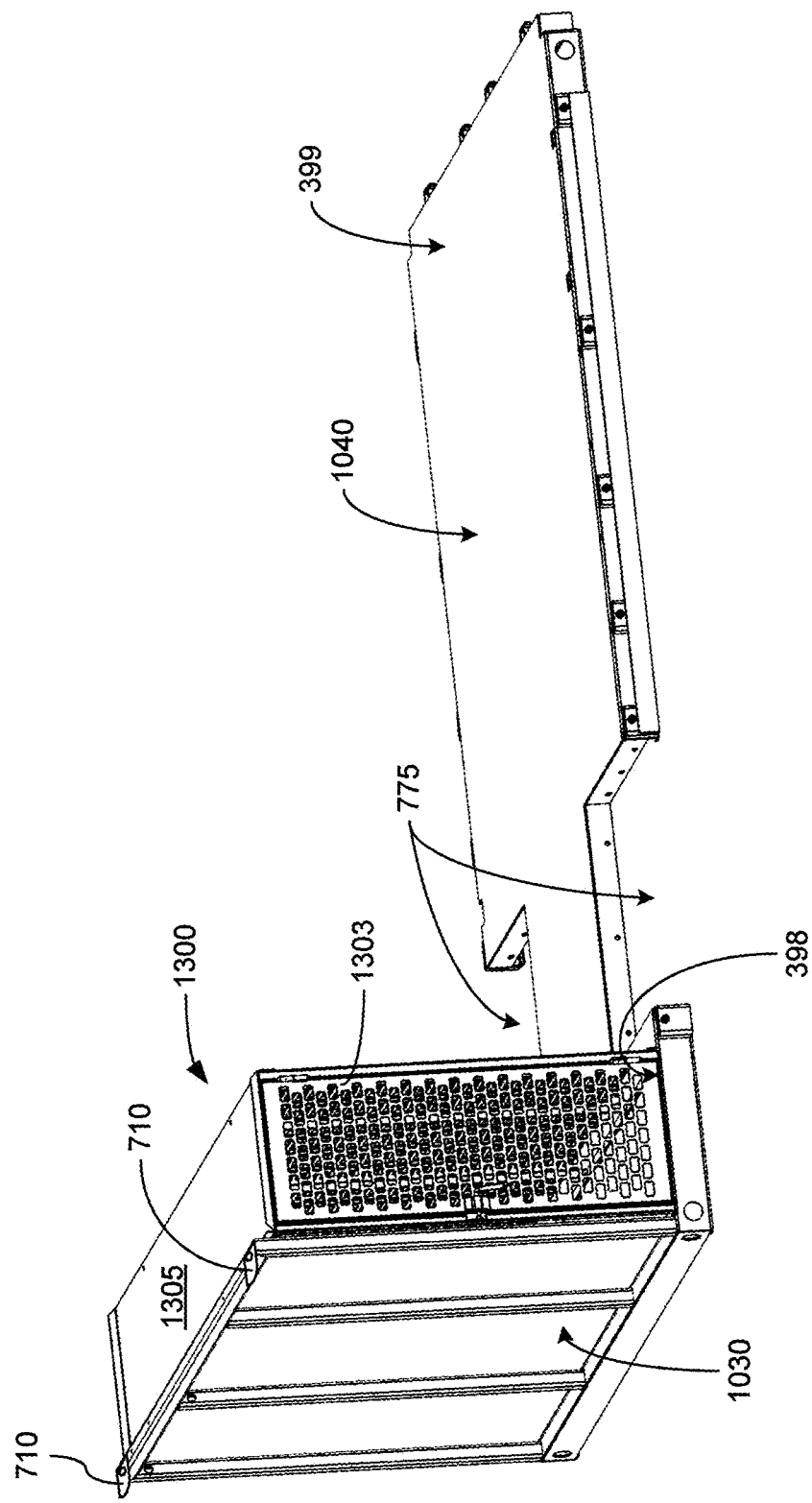
FIG. 3D is a perspective view showing the left side and the top of the flatbed of a safety truck, with a bulkhead and a front sign cage mounted on a front region of the flatbed, and showing left and right side insets in the flatbed where man baskets may eventually be installed.
Figure 3E:
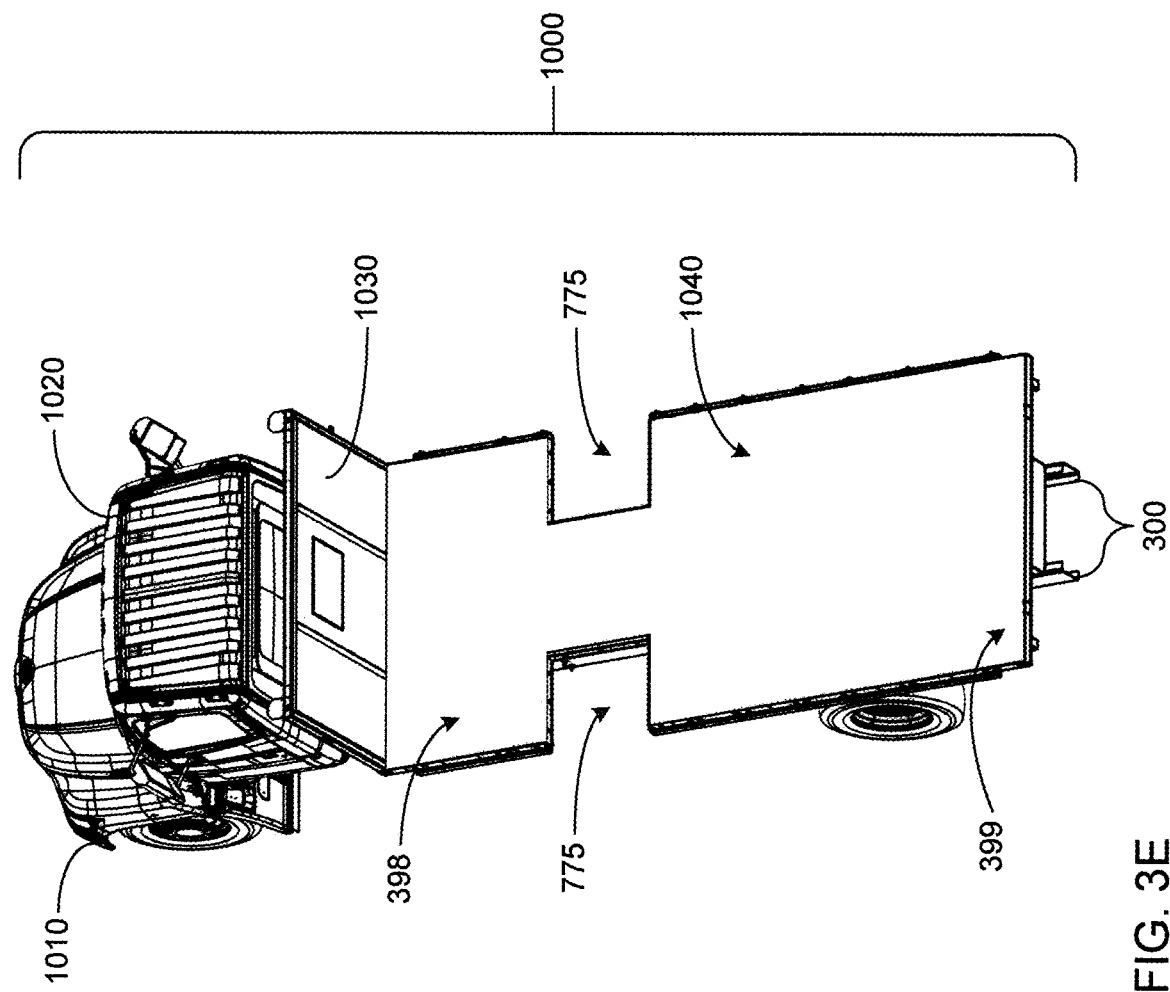
FIG. 3E is a perspective view similar to FIG. 3C showing the flatbed and bulkhead installed atop the weight frame attachment that is shown in FIG. 3C.

Shown in FIGS. 1C, 1D and 3D are flat left and right connection point surfaces 710 to which upstanding rear supports 1219 of the overcab rack attachment 1200 can connect to assist in supporting rear regions of the overcab rack attachment 1200, which is most completely depicted in FIG. 1J.

The flat left and right support surfaces 710 may also be used to underlie and support other attachments such as cameras and radar speed detection attachments 1513 which are depicted in FIGS. 1E and 1I.

3) Inbetween-Cab-and-Flatbed Connection Point Structures 750

Various embodiments of a connection point structure 750 may be provided at locations between the forwardly-facing cab 1020, and the rearwardly extending flatbed 1040 of various safety truck embodiments 1000.

Figure 4B:
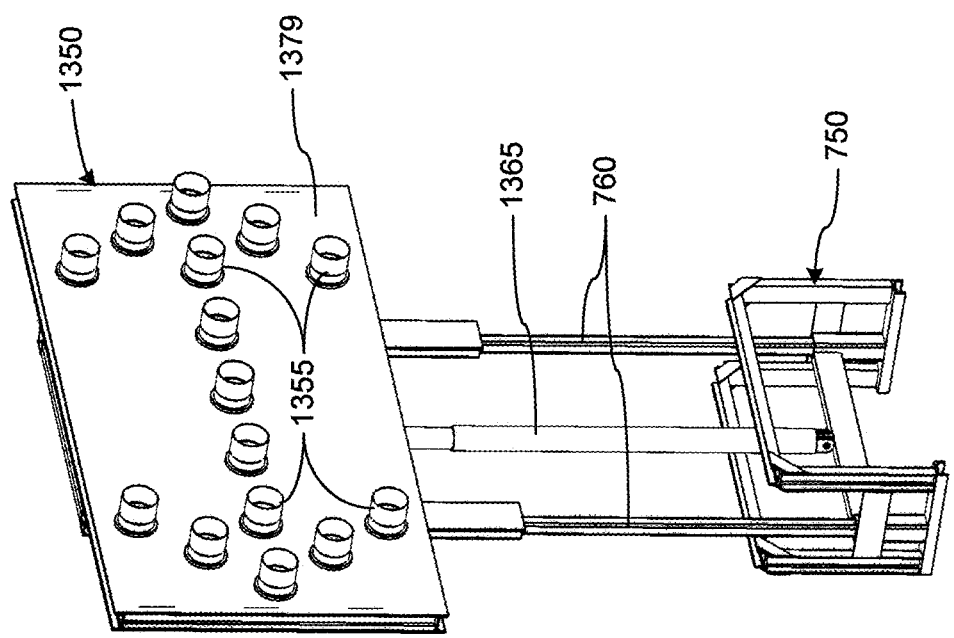
FIG. 4B is a perspective view similar to FIG. 4A but showing the arrow board attachment supported atop the welded frame embodiment of the inbetween-cab-and-flatbed connection point, with the arrow board in a fully raised position such as is also shown in FIG. 1G.
Figure 4C:
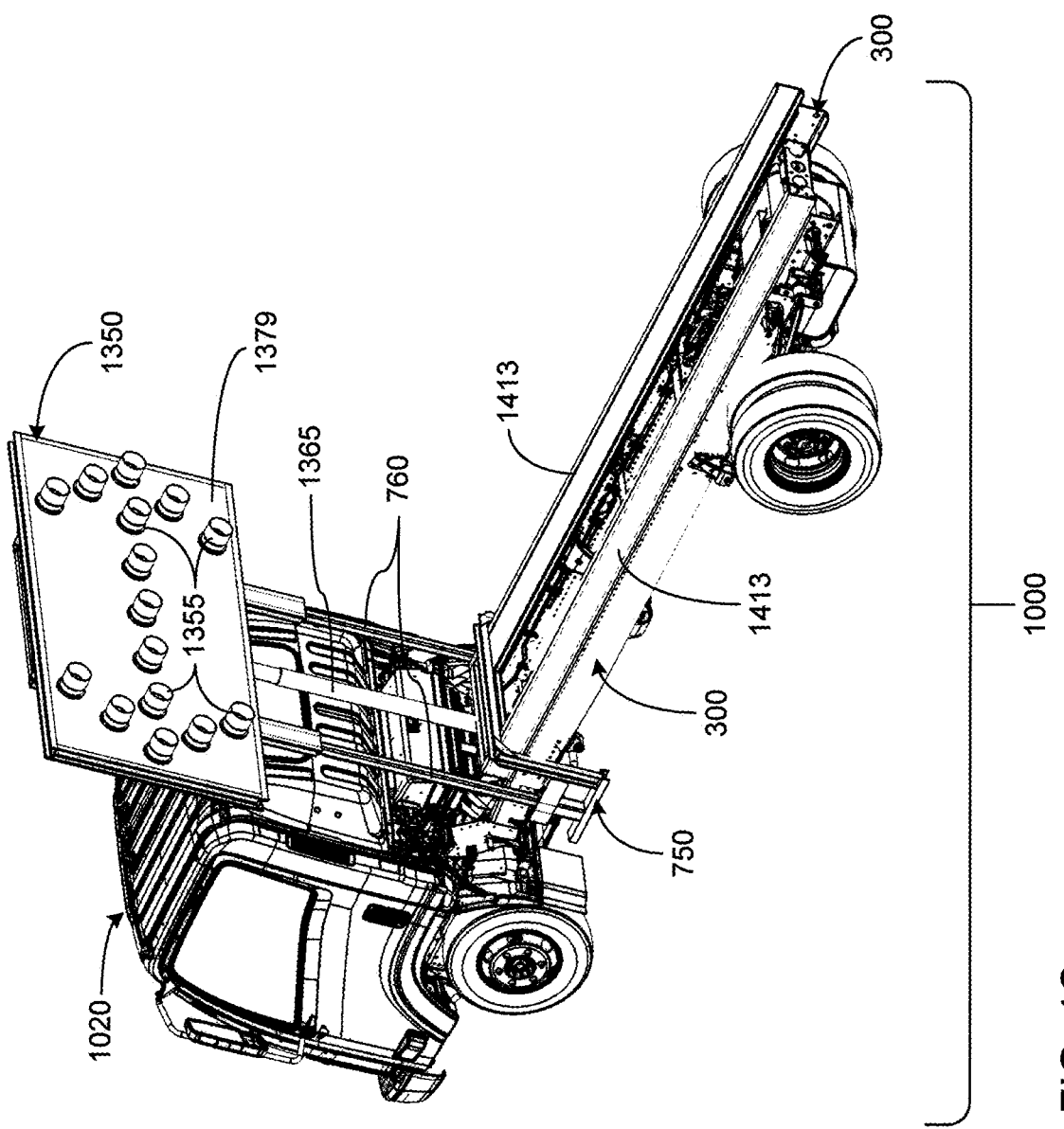
FIG. 4C is a rear and left side perspective view of another safety truck embodiment having with the arrow board attachment supported atop a simpler form of the inbetween-cab-and-flatbed connection point.

Shown in FIGS. 1G and 4C is a simple embodiment of a connection point structure 750 to which bottom regions of uprights 760 connect for supporting an upstanding arrow board attachment 1350 that can be selectively raised and lowered. In FIGS. 1H and 4A the arrow board attachment 1350 is shown in a lowered position. In FIGS. 1F, 1G and 4B, the arrow board attachment 1350 is shown in a raised position.

Shown in FIGS. 4A and 4B is a more complex embodiment of a connection point structure 750 that includes a welded frame, to which a pair of uprights 760 are connected that support the arrow board attachment 1350. Both the simple embodiment 750 shown in FIGS. 1G and 4C, and the more complex embodiment shown in FIGS. 4A and 4B include a hydraulic cylinder 1365 (or other similar components such as a pneumatic cylinder or a linear motor) located between the uprights 760 for raising and lowering the arrow board attachment 1350.

Both the simple embodiment (shown in FIGS. 1G and 4C) and the more complex embodiment (shown in FIGS. 4A and 4B) of the connection point structure 750 are connected to the pair of elongate channel members 300 that support the forwardly-facing cab 1020 and the rearwardly extending flatbed 1040, as is typically shown in FIG. 4C.

When the arrow board 1350 is raised as shown in FIGS. 1F, 1G and 4B, selected lights on the arrow board 1350 can be illuminated to direct traffic around the safety truck 1000, either to the right, or to the left.

4) Generator Compartment Connection Point Structures 455

As is shown in FIGS. 1A, 1B, 1E and 1H, compartment-type connection point structures 455 may assume any of a variety of configurations that are provided beneath a left or right forward part of the flatbed 1040 of various ones of the safety truck embodiments 1000 for containing and carrying an auxiliary electricity generator.

The auxiliary electricity generator (not shown) may take any of a wide variety of commercially available gas-engine powered forms for supplying electricity, as needed, to various ones of the safety truck embodiments 1000 and to such safety truck attachments such as are described in the next Division B of this document.

5) Front & Rear Flatbed Connection Point Regions 398 and 399

Shown best in FIG. 3D, are front and rear regions 398 and 399 of the flatbed 1040 which provide connection points for supporting a front sign cage 1300, and a rear sign cage 1700, respectively, either or both of which may be provided and/or used to contain and transport various safety barrier components and warning sign components (not shown).

The front sign cage 1300 is shown on various safety truck embodiments 1000 atop the front connection point region 398 in FIGS. 1F, 1G and 1H. The rear sign cage 1700 is shown on various safety truck embodiments 1000 atop the rear connection point region 399 in FIGS. 1A, 1B, 1C, 1D, 1E and 1I.

6) Mid-Flatbed Inset Region Connection Points 775

Shown best in FIG. 3D are substantially identical left and right open inset regions 775 of the flatbed 1040 that are each provided to receive and carry one of the three embodiments of man basket attachments 1600, 1650 and 2650 that are shown in FIGS. 7A through 7G. The dimensions of the open inset regions are preferably adjusted as may be needed to receive such man basket attachments as the relatively narrow man basket attachment 1600, or the relatively wide man basket attachments 1650 and 2650.

7) Heavy Duty Rear Connection Point Structure 800

Two principal components of a heavy-duty rear connection point structure 800 are best shown in FIG. 8A as including an upstanding vehicle-connected support plate 810, and a carrier plate 820. Such attachments as are to be connected to the vehicle-connected support plate 810 each carry one of the carrier plates 820. One such attachment is shown in FIG. 8E, and another is shown in FIG. 8F.

As is shown in FIG. 8A, the vehicle-connected support plate 810 is securely welded to the rear end regions of the two forwardly/rearwardly extending channel members 300 that form the frame that underlies the forwardly-facing cab 1020 and the rearwardly-extending flatbed 1040, as can best be seen in FIGS. 1D, 1E and 1G.

Referring again to FIG. 8A, the vehicle-connected support plate 810 has one pair of spaced-apart uprights 815 welded to its left side region, and another pair of spaced-apart uprights 815 welded to its right side region. Extending transversely between upper portions of each of the pairs of spaced-apart uprights 815 are tubular sleeves 812 that align with holes 813 that are formed through upper portions of each of the spaced-apart uprights 815. Formed through lower portions of the spaced-apart uprights 815 are aligned holes 814 that are sized to receive hitch pin members 825 in a slip fit.

Referring yet again to FIG. 8A, the attachment carrier plate 820 has upstanding hook structures 822 welded to its left and right side regions. The hook structures 822 are configured to receive corresponding ones of the tubular sleeves 812 that are securely welded to the pairs of the spaced-apart uprights 815 carried by the vehicle-connected support plate 810. Lower regions of the hook structures 822 are provided with holes 824 that can align with holes 814 formed through the spaced-apart uprights 815, to receive hitch pins 825 to thereby lock the hook structures 822 to the spaced-apart uprights 815 when the hook structures 822 engage the tubular sleeves 812 to securely attach the carrier plate 820 to the vehicle-connected support plate 810.

8) An Auxiliary Rear Connection Point 850

Referring to FIGS. 8A and 8B, a central region of the vehicle-connected support plate 810 is provided with a tubular sleeve that forms an auxiliary rear connection point 850. The tubular sleeve that has an opening 851 configured to receive such tubular hitch members as is indicated by the numeral 2961 in FIGS. 8C and 8D for connecting a variety of attachments, such as the step-bumper attachment 2000 shown in FIGS. 8C and 8D.

When the hitch member 2961 of the step-bumper attachment 2000 is inserted into the opening 851 of the auxiliary rear connection point 850, the hitch pins 825 (shown in FIG. 8A) can be inserted through holes 2964 that are provided in supports 2962 of the step-bumper attachment 2000 (as is shown in FIGS. 8C and 8D) and through holes 814 provided in the uprights 815 to assist in securely connecting the step-bumper attachment 2000 to the rear of a safety truck 1000.

In should be noted that, although each of the rearward connection points 800 and 850 are depicted and described herein as rigidly connected to the pair of forwardly-rearwardly extending channel members 300 that define the truck frame, other embodiments are possible in which one or both of the rearward connection points 800 and 850 may be indirectly mounted to the truck frame (and/or other structural components of an embodiment of the safety truck 1000) by any of a variety of actuators. Such actuators may include, and are not limited to, hydraulic and/or pneumatic cylinders, and/or electrically powered linear motors. Such actuators may be operable to raise or lower one of both of the rearward connection points 800 and 850 relative to the roadway surface to thereby raise or lower whatever safety attachment(s) that may be connected thereto.

Thus, for example, one or more of a rumble strip basket 1100, a mounting component 1810 of a display board attachment 1800 to which a TMA unit 1900 may also be coupled (as will be described), a safety basket attachment 1950, and/or a step bumper attachment 2000 that may be coupled to one or both of the rearward connection points 800 and 850 may, accordingly, be raised or lowered relative to the roadway surface.

By way of example, in some of such embodiments, the auxiliary rearward connection point 850 may extend through an aperture (not shown) formed through the support plate 810 of the rearward connection point 800, where such an aperture is shaped and sized to allow the auxiliary rearward connection point 850 a pre-selected degree of freedom of vertical movement rearward to the support plate 810. One or more actuators by which the auxiliary rearward connection point 850 is indirectly mounted to the truck frame and/or other structural components of an embodiment of the safety truck 1000 may be operable to move the auxiliary rearward connection point 850 vertically within the degree of freedom of movement afforded by such an aperture.

9) Attachment-Defined Connection Points 1999 and 2999

The step-bumper attachment 2950 shown in FIGS. 1H, 8B, 8C and 8D is provided with a forwardly-rearwardly extending tubular component 2999 (shown best in FIG. 8D) that has a rearwardly-facing rectangular opening 2998 (shown in FIG. 8B) into which standard tubular hitch components of rectangular cross-section (not shown) of various other attachments (not shown) may be inserted to support such other attachments.

Likewise, the safety basket attachment 1950 shown in FIGS. 1F, 1G, 8F and 8G is provided with a rearwardly extending tubular component 1999 that has a rearwardly-facing opening 1998 (shown in FIGS. 1F and 8G) into which standard tubular hitch components of rectangular cross-section (not shown) of various other attachments (not shown) can be inserted to support such other attachments.

Division B: Summary of Safety Truck Attachments

A wide variety of attachments may be releasably and interchangeably connected to the previously identified connection points, for example, as is described in the following paragraphs:

1) The Rumble Strip Basket Attachment 1100

Shown in FIGS. 2A and 2B is the previously-mentioned rumble strip basket attachment 1100 that may be releasably connected to the forward-most connection point 650 (shown in FIG. 1A) that includes an elongate hitch receiver tube 1125 of rectangular cross section, a front end region of which is indicated by the numeral 650 in FIG. 1A.

As has been explained, a front end region of the hitch receiver tube 1125 is connected to and is rigidly supported by a the mounting plate assembly 1127 (shown in FIG. 2B); and the rear end region of the hitch receiver tube 1125 extends through and is rigidly supported by the mounting bracket 1129.

In some embodiments, the cross-section of the rectangular tube of the hitch receiver 1125 may be shaped and sized to provide a 2-inch by 2-inch (or larger, e.g., 2.5 inch by 2.5 inch) hitch receiver that conforms to the specifications for a class III or class IV (or higher) hitch receiver promulgated by the Society of Automotive Engineers (SAE) International of Warrendale, Pa., USA. Thus, in such embodiments, the forward-most connection point 650 may be capable of supporting a range of weights from 650 to 1400 pounds in a cantilever configuration.

Referring to FIG. 2B, the rumble strip basket attachment 1100 includes a support beam 1115 that is inserted into the hitch receiver tube 1125 so as to be supported by the hitch receiver tube 1125. The support beam 1115 is shaped and sized to be inserted into, and to be releasably retained within, the tubular hitch receiver 1125 in a manner that may also conform to specifications promulgated by SAE International.

The rumble strip basket attachment 1110 may also include a generally rectangular basket fabricated from metal tubing and/or rods that form one or more upstanding side walls 1113, and a floor 1111 (which can also provide a stand-on surface) atop which a stack of rumble strips may be placed for being subsequently withdrawn, one at a time at spaced intervals along a roadway 999 (shown in FIG. 7F) that leads up to a roadway workzone or worksite.

As will be familiar to those skilled in the art, rumble strips are elongate strips of hard material having a cross-section that often resembles a typical "speed bump" or "speed hump," but thinner and narrower to interact with the tires of a vehicle in a manner that generates a low frequency "rumbling" noise that easily propagates into the cabin of a vehicle to alert a driver to an upcoming road hazard or to an instance of the vehicle drifting out of its lane. Where the upcoming road hazard is a roadway workzone or worksite, one or more parallel sets of rumble strips may be positioned on a roadway in a manner in which each rumble strip extends crosswise to the path of the vehicle tires that are to roll over the rumble strips, thereby imparting something of a "washboard" effect to the "rumbling" sound generated as a vehicle's tires roll over the one or more parallel sets of rumble strips.

Where rumble strips are to be so placed along a portion of a roadway, a safety truck embodiment 1000 that includes the forward-most connection point 650 to which the rumble strip basket 1100 has been connected may be driven so as to proceed slowly along that portion of the roadway while construction personnel walking alongside of, and/or in front of, such a slow moving safety truck embodiment 1000 install the rumble strips. More specifically, as such a safety truck embodiment 1000 is driven slowly, either forwardly or in reverse, such construction personnel may lift individual rumble strips out of the rumble strip basket attachment 1100, one at a time, and place the rumble strips on the roadway in front the rumble strip basket attachment 1100, while using asphalt and/or any of a variety of adhesives and/or mechanical hardware to secure each rumble strip in place.

It should be noted that, although the forward connection point 650 is depicted and described herein as being rigidly connected to structural portions of embodiments of the safety truck 1000 such that the rumble strip basket 1100 becomes rigidly connected thereto when attached to the forward connection point 650, other embodiments are possible wherein the forward connection point 650 may be indirectly mounted to structural components of an embodiment of the safety truck 1000 by any of a variety of actuators. Such actuators may include, and are not limited to, hydraulic and/or pneumatic cylinders, and/or electrically powered linear motors. Such actuators may be operable to raise or lower the forward connection point 650 relative to the roadway surface to thereby raise or lower whatever safety attachment(s) that may be connected thereto. Thus, for example, one or more of the rumble strip basket attachment 1100, the safety basket attachment 1950, and/or the step bumper attachment 2000 may, accordingly, be raised or lowered relative to the roadway surface.

2) The Over-Cab Rack Attachment 1200

Figure 1K:
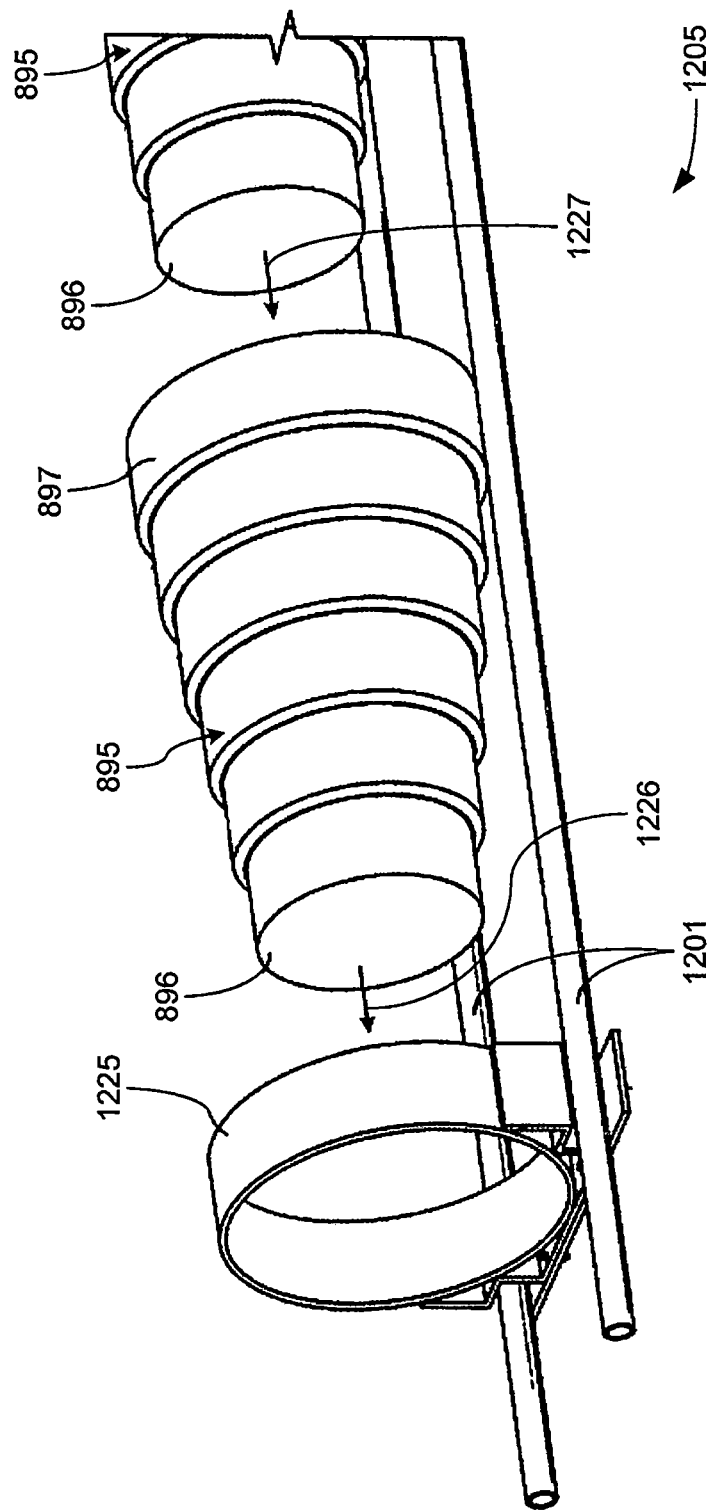

Shown in FIGS. 1A, 1B, 1E and 1J is an over-cab rack attachment 1200 for storing and transporting such barrel-type traffic delineators as are indicated by the numeral 895 in FIG. 1K. When construction and repair work is underway on a roadway surface, such barrel-type traffic delineators 895 are commonly positioned atop the roadway surface to separate lanes of traffic, and to guide traffic around roadway workzones and worksites.

The over-cab rack attachments 1200 shown in FIGS. 1A, 1B, 1E and 1J are each supported by a pair of relatively long upstanding front members 1211 that connect to front fenders of the associated one of the safety truck embodiments 1000, and by a pair of relatively short upstanding rear members 1219 that connect to the pair of flat plate connection points 710 which are provided atop the bulkhead 1030. At least one of the flat plate connection points 710 is shown in each of FIGS. 1A, 1C, 1D, 1I and 1J.

As can be seen in FIG. 1J (and is explained in the previously referenced applications Ser. Nos. 62/638,818 and Ser. No. 16/132,376), the over-cab rack attachment 1200 preferably provides three side-by-side forwardly-rearwardly extending rack structures such as is depicted in FIG. 1K.

Referring to FIG. 1K, each of the three side-by-side rack structures of the over-cab rack attachment 1200 includes a pair of tubular supports 1201, along which a hoop structure 1225 can move forwardly and rearwardly. The three identical hoop structures 1225 are of sufficient diameter to receive and support the relatively small diameter upper end regions 896 of a nested plurality of traffic delineators 895 which can be inserted into the hoop structures 1225 as is indicated by an arrow 1226 in FIG. 1K. Because the traffic delineators 895 are hollow, they can be nested by inserting the relatively small diameter front end region 896 of one traffic delineator 895 into the hollow interior of another of the traffic delineators 895, as is indicated by an arrow 1227. The tubular supports 1201 are spaced apart to support the relatively large diameter lower regions 897 of the traffic delineators 895.

Although the barrel-type traffic delineators 895 that can be supported by each of the hoop structures 1225 come in a variety of sizes and configurations, all have in common the closed, relatively small diameter upper end region 896, and the open, relatively large diameter lower end region 897 that provides access to the hollow interior of another traffic delineator 895.

Other details of construction, and a description of how the over-cab rack 1200 is used, are provided in the previously referenced provisional and utility applications Ser. No. 62/631,840 and Ser. No. 16/132,376, respectively.

3) The Forward & Rearward Sign Cage Attachments 1300 & 1700

Figure 5A:
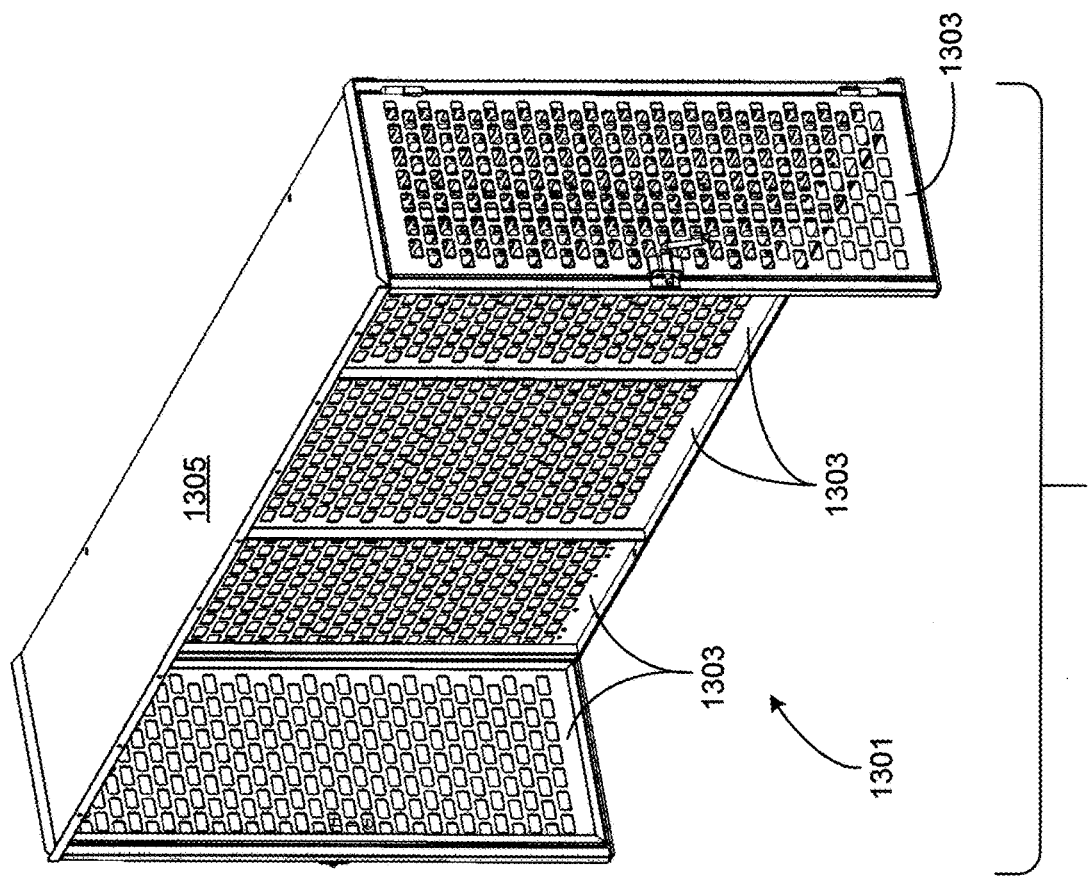
FIG. 5A is a perspective view of a forward sign cage attachment for storing and transporting warning sign components atop a front region connection point of the flat bed of a safety truck.
Figure 5B:
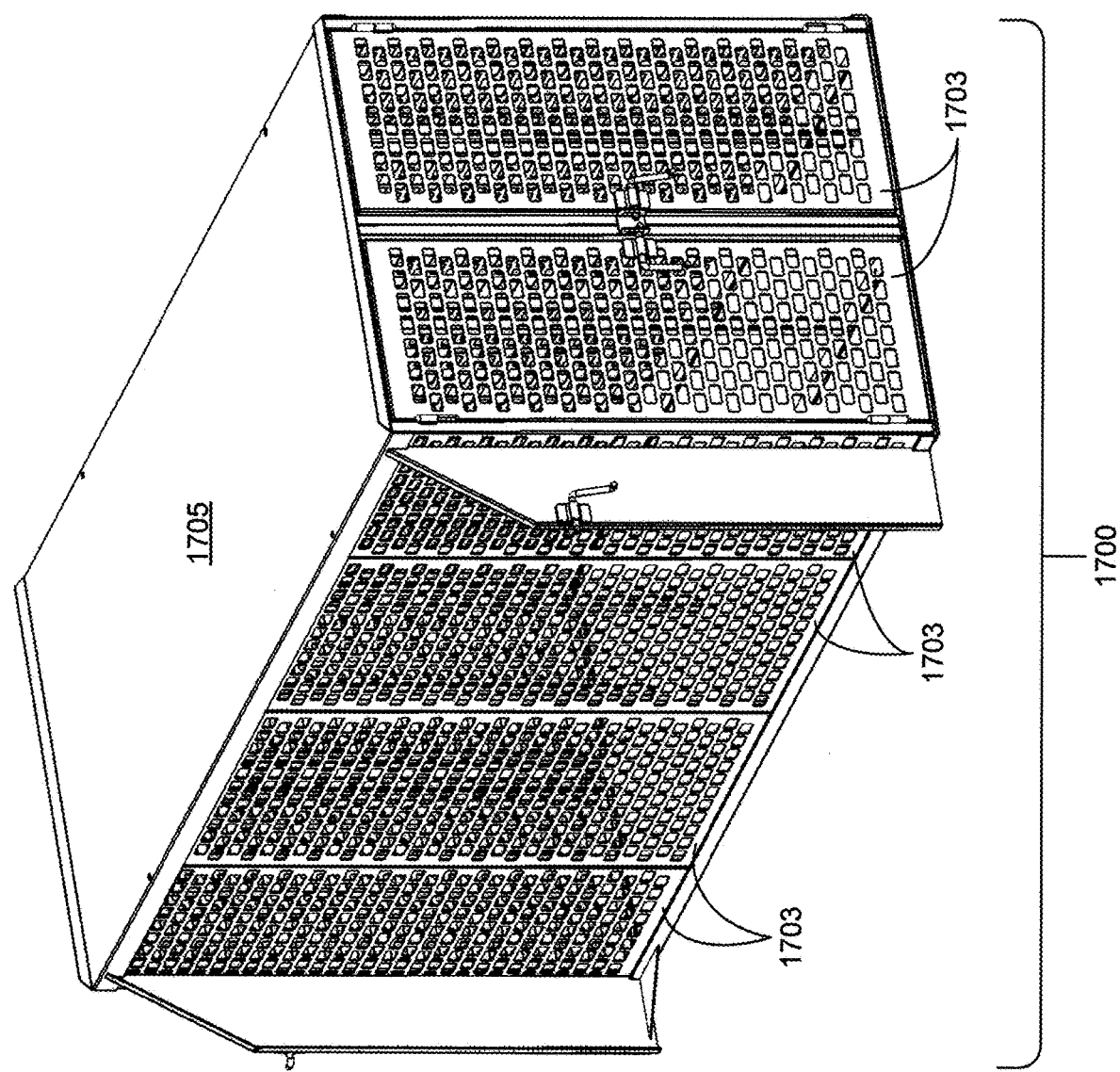
FIG. 5B is a perspective view of a rearward sign cage attachment for storing and transporting warning sign components atop a rear region connection point of the flat bed of a safety truck.
Figure 5C:
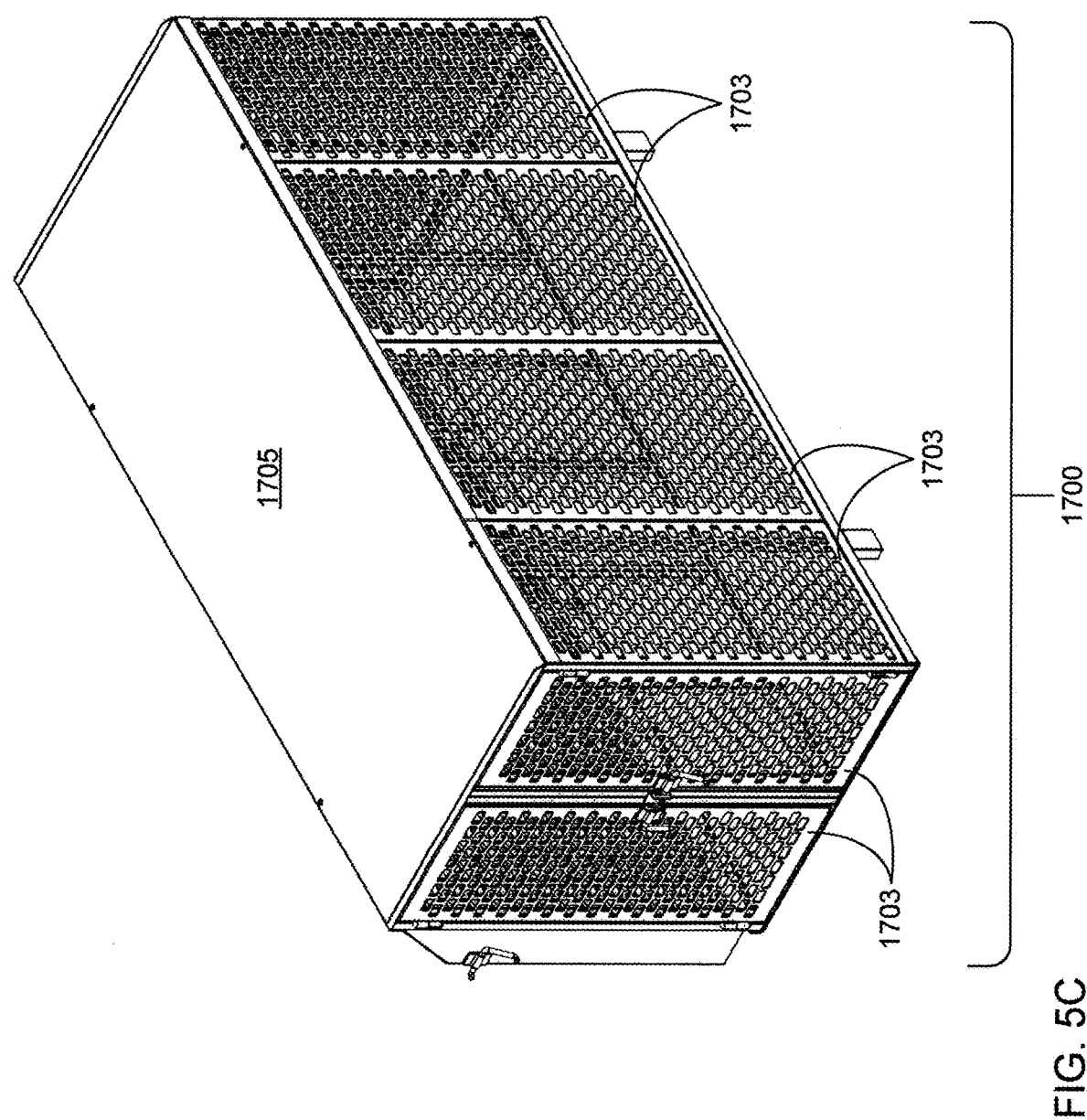
FIG. 5C is another perspective view of the rearward sign cage attachment of FIG. 5B.

The forward sign cage attachment 1300 is best shown in FIG. 5A, where it can be seen that the forward sign cage attachment 1300 has an open front 1301. As can be understood from what is shown in FIG. 3D, the open front 1301 is closed by virtue of the front sign cage 1300 being positioned atop the front connection point region 398 of the flatbed 1040 at a location immediately adjacent to the upstanding bulkhead 1030, so that the bulkhead 1030 closes the open front 1301 of the forward sign cage attachment 1300.

The forward sign cage attachment 1300 is shown positioned atop the forward connection point region 398 of the flatbeds 1040 of safety truck embodiments 1000 in FIGS. 1F, 1G and 1H.

The rearward sign cage attachment 1700 is shown positioned atop the rearward connection point region 399 of the flatbeds 1040 of safety truck embodiments 1000 in FIGS. 1A, 1B, 1C, 1D, 1E and 1I.

Selected ones of the screens 1303, 1703, that form the various upstanding walls of the sign cages 1300 and 1700 can be hinged, so the sign cages 1300 and 1700 can be opened, when needed, to place safety barrier components and/or warning sign components into, and to remove such components from, the front and rear sign cages 1300 and 1700, respectively. The top walls of the sign cages 1300 and 1700, are formed by metal plates 1305, 1705, respectively.

4) The Raisable and Lowerable Arrow Board Attachment 1350

Shown in FIGS. 1G and 4C is one embodiment of an upstanding arrow board attachment 1350 that is supported by one embodiment of the connection point structure 750, as has been explained above. Shown in FIGS. 4A and 4B is another embodiment of the upstanding arrow board attachment 1350 that is supported by a more complex embodiment of the connection point structure 750, as has also been explained above.

Situated between the pairs of upstanding support members 760 is an upstanding hydraulic cylinder 1365 (or other similar component such as a pneumatic cylinder or a linear motor) that can raise and lower the associated arrow board attachment 1350, as has been explained above.

Each of the depicted arrow board attachments 1350 shown in FIGS. 1F, 1G and 1H has a face 1379 that supports light components 1355 which extend away from the plane of the face 1379. The light components 1355 can be selectively illuminated to form left and right pointing arrows to guide traffic around left and right sides of the associated safety truck embodiment 1000.

5) Weight-Frame Defined Connection Point Compartments 1475

As can be seen in FIG. 3A, the pair of elongate, horizontally-extending channel members 300 that form a frame are provided to underlie the forwardly-facing cabs 1020 of the safety truck embodiments 1000. The elongate channel members 300 also extend rearwardly to underlie the flatbeds 1040 of the safety truck embodiments 1000.

Shown in FIG. 3B is a weight frame attachment 1400 that is positioned atop the elongate channel members 300 as is shown in FIG. 3C.

The weight frame attachment 1400 is comprised of a pair of side members 1413 that are interconnected at spaced intervals by a plurality of transversely extending cross members 1415 and rods 1417 that cooperate to define opposite ends of a set of connection point compartments 1475 into which weight attachments 1420 (shown in FIG. 3B) can be inserted to selectively increase the mass of a selected one of the safety truck embodiments 1000.

The weight attachments 1420 can take the form of pre-cast concrete blocks, or can be created by pouring concrete into the compartments 1475.

Referring to FIG. 3B, when the weight attachments 1420 are inserted into the connection point compartments 1475, the associated safety truck embodiment 1000 will have its mass increased so that more kinetic energy will be required to cause the associated safety truck embodiment 1000 to roll forwardly as the result of the associated TMA unit 1950 of the associated safety truck embodiment 1000 being crashed into.

6) Auxiliary Electric Generator Attachments 455

As has been explained, and as is shown in FIGS. 1A, 1B, 1E and 1H, compartments 455 of various sizes and dimensions can be provided to enclose electric generators (not shown) that each is powered by its own gas engine (not shown) to provide such auxiliary electric power as may be needed to operate various ones the attachments that are described in this document.

7) The Man Basket Attachments 1600, 1650 and 2650

The two embodiments of the relatively narrow man basket attachment 1600 that are shown in FIGS. 7C and 7D, are shown on safety truck embodiments 1000 in FIGS. 1F, 1G and 1H. Details and preferred features of the man basket attachment 1600 are disclosed in the previously referenced application Ser. No. 15/913,562 filed Mar. 6, 2018.

The two embodiments of the relatively wide man basket attachment 1650 shown in FIGS. 7A and 78, are shown on safety truck embodiments 1000 in FIGS. 1A, 1B, 1C and 1D. Details and preferred features of the relatively wide man basket attachment 1650 are disclosed in the previously referenced application Ser. No. 62/638,818 filed Mar. 5, 2018, and in previously referenced application Ser. No. 16/159,813 filed Oct. 5, 2018.

The relatively wide man basket attachment 2650 shown in FIGS. 7E, 7F and 7G, is shown on a safety truck embodiment 1000 in FIG. 1E. Details and preferred features of the man basket attachment 2650 are disclosed in the previously referenced application Ser. No. 15/913,562 filed Mar. 6, 2018.

The man baskets 1600 and 1650 have upper doors 1625 and 1675, respectively, that, when closed, continue the level of the flatbed surface 1040, but can be opened to permit personnel to enter the man baskets 1600 and 1650 from the flatbed surface 1040. The upper doors 1675 are best shown in FIGS. 7A and 7B, whereas the upper doors 1625 are best shown in FIGS. 7C and 7D.

The man baskets 1600, 1650 and 2650 have stand-on surfaces 1601, 1651 and 2651, respectively, for supporting personnel at selected heights above a roadway on which an associated safety truck 1000 is driving, while the personnel ergonomically place, install or retrieve such roadway safety articles as reflectors 1997 (which are shown in FIGS. 7F and 7G man basket 2650 has a seat surface 2652 atop a compartment 2673 wherein supplies and tools may be carried.

The stand-on surface 1601 of the relatively narrow man basket 1600 is shown in FIGS. 1F, 1G, 1H and 7D. The stand-on surface 1651 or the relatively wide man basket 1650 is shown in FIGS. 1A, 1B, 1C, 1D, 7A and 7B. The stand-on surface 2651 of the relatively wide man basket 2650 is shown in FIGS. 1E, 1I, 7E, 7F and 7G.

Referring to FIGS. 7A and 7B, the numeral 1655 designates a gate-like structure, a tubular portion of which can be moved upward and downward to various snap-in-place positions that will assist the gate-like structure 1655 to retain personnel in the man basket 1650. Similarly, in FIGS. 7C and 7D, the numeral 1605 designates another gate-like structure that has a tubular portion that can be moved up and down to various snap-in-place positions that will assist the gate structure in retaining personnel in the man basket 1600.

Each of the various stand-on surfaces mentioned in this document (for example, the stand-on surfaces 1601, 1651 and 2651 of the man baskets 1600, 1650 and 2650) can be provided with a simple mechanism for raising and lowering the stand-on surface relative to nearby upstanding housing walls. For example, as is shown schematically in FIG. 7H, any stand-on surface xxx1 can have an attached upstanding member xxx2, to which a ram of a hydraulic cylinder xxx3 (or other linear movement device) can be attached, with a housing of the hydraulic cylinder xxx3 being connected to an upstanding wall member xxx4, so that operation of the hydraulic cylinder xxx3 will cause the stand-on surface xxx1 to be raised or lowered relative to the upstanding wall member xxx4.

Moreover, as is shown in FIGS. 1E, 1I, 7E and 7F, the relatively wide man basket 2650 is preferably provided with a pair of upstanding posts 2669 for guiding up and down movements of the entire man basket 2650, by which arrangement, the entire man basket 2650 can be raised and lowered to travel from where the stand-on surface 2651 is at the level of the flatbed 1040, to a level only a few inches above an underlying road surface on which the associated safety truck 1000 is being driven.

Additionally, certain ones of the man baskets 1600, 1650 and 2650 may be provided with compartments or the like that can carry a supply of adhesive and/or hand tools (not shown) for Attaching reflectors 1997 or other roadway safety markers 1998 (shown in FIG. 7F) to roadway surfaces 1999 along which a safety truck 1000 drives.

The man baskets 1600, 1650, 2650 may also be provided with displays (not shown) that enable roadway workers carried by the man baskets 1600, 1650 and 2650 to view images and/or other information captured by one or more of the cameras, sensors and/or speed detection radar units 1513 (shown in FIGS. 1E and 1I) that may be carried by an associated safety truck embodiment 1000 and/or by various safety attachments of the associated safety truck embodiment 1000), and may have wire-based and/or wireless communications that permit personnel within the man baskets 1600, 1650 and 2650 to communicate with a driver of the associated safety truck embodiment 1000 who may be stationed within a cab 1020 of the associated safety truck 1000.

Referring to FIGS. 7E, 7F and 7G, the depicted man basket attachment 2650 has a housing 2661 that can be raised or lowered by a suitable power lift mechanism (not shown) to position the stand-on surface 2651 at a level below the flatbed surface 1040 and above an underlying roadway surface so a roadway worker who is standing atop the surface 2651 or who is seated atop a seat surface 2652 can perform various activities atop a roadway surface 1999 along which the associated safety truck 1000 is being driven.

One or more dispensers 2677 (shown in FIG. 7E) may be provided on one or more of the upstanding walls of the housing 2661 to hold a supply of reflectors 1997 (FIG. 7G) or other items that are to be installed on a roadway surface such as is indicated by the numeral 1999 in FIG. 7F. Controls (not shown) may be provided wherever within the housing 2661 wherever is most convenient for roadway construction workers to operate actuators (not shown) to selectively raise or lower the man basket attachment 2650 relative to the flatbed 1040 of the safety truck 1000. Manually operable controls (not shown) may also be provided in the man basket 2650, such as a throttle control (not shown) to increase or decrease the speed of the associated safety truck embodiment 1000, and/or a braking control (not shown) to stop the safety truck embodiment 1000.

8) The Raisable and Lowerable Display Board Attachment 1800

The raisable and lowerable display board 1800 shown in FIGS. 1B, 1C, 1D, 1E, 1I is preferably supported by a pair of uprights 1805 that are shown in FIGS. 6A, 6B, 6C, 6D, 6E and 8E. A hydraulic cylinder or other device capable of imparting linear motion (not shown) may be provided for raising the display board 1800 relative to a base structure 1810 in much the same manner as a hydraulic cylinder 1365 is provided (as shown in FIGS. 4A, 4B and 4C) for selectively raising and lowering the arrow board 1350.

The rearwardly-facing raisable and lowerable display board attachments 1800 are shown in raised positions in FIGS. 1B and 1E, and in lowered positions in FIGS. 1C, 1D, 1I. As is shown schematically in FIGS. 6A, 6B, 6D and 6E, the display board 1800 may carry cameras and/or speed detection radar units such as are indicated by numerals 1513 in FIGS. 1E and 1I—which may provide information to a control system (not shown) of an associated safety truck embodiment 1000 to predict impending collisions and/or other impending dangers to construction personnel, and may act to provide warnings to construction personnel. The speed detection radar of a display board attachment 1800 may be programmable to detect separate speeds of separate vehicles where each vehicle occupies a separate lane of a roadway.

The display board attachment 1800 may incorporate any of a variety of raster scan display technologies that present a grid of pixels that are able to be selectively illuminated, darkened and/or given any of a variety of colors. Such technologies include, and are not limited to, a liquid crystal display (LCD) panel, an electroluminescent (EL) display panel, a grid of discrete light emitting (LEDs), etc. Regardless of the exact display technology used, such a display may be operable as an all-points addressable display device capable of displaying text, graphical elements (e.g., depictions of road signs, symbols, etc.), motion graphics, motion video, etc.

An embodiment of the safety truck 1000 to which the display board attachment 1800 is connected may be parked at a location along a roadway portion that precedes a roadway workzone or worksite. While the safety truck 1000 remains stationary at that location, the display board attachment 1800 may be deployed to provide visible notices of a reduced speed limit in the vicinity of the associated roadway workzone or worksite, to employ radar incorporated into the display board attachment 1800 to detect the speeds of oncoming vehicles while the display board 1800 displays indications of the detected speeds of oncoming vehicles as well as imagery and/or textual messages reminding the motorists driving the oncoming vehicles to obey the reduced speed limit and/or to advise such motorists to be watchful for the presence of construction equipment, vehicles and/or personnel that may enter into the path of the oncoming vehicles.

9) The TMA Unit Attachments 1900

The safety truck embodiments 1000 shown in FIGS. 1A through 1E and 1I carry rearwardly-extending TMA unit attachments 1900 that are designed to crumple in a controlled manner to dissipate and absorb the kinetic energy of a roadway vehicle that may accidentally crash into the TMA unit attachments 1900 that extends rearwardly from such safety truck embodiments 1000 as are shown in FIGS. 1A through 1G and 1I.

The TMA unit attachments 1900 are each comprised of two hinge-connected components 1935 and 1949. The forward component 1935 can be folded upwardly (as is shown in FIGS. 1C, 1D, 1I, 6A and 6B), and the rearward component 1949 can be folded forwardly (as is shown in FIGS. 1C, 1D, 1I, 6A and 6B) to a transport position shown in FIGS. 1C, 1D, 1I, 6A and 6B.

Hinges 1937 that are shown schematically in FIGS. 6A, 6B, 6C, 6D and 6E pivotally connect the components 1935, 1949 of the TMA units 1900. Hinges 1923 that are shown schematically in the same FIGS. 6A through GE pivotally connect the component 1935 to the base structure 1810 also shown schematically in the same FIGS. 6A through 6E.

Shown in FIG. 6A is an upstanding support 1090 atop which is a plate 1099 onto which the forwardly extending component 1949 of the TMA unit attachment 1900 can rest when pivoted to the TMA unit's transport position shown in FIG. 6A.

10) The Safety Basket Attachment 1950

Shown in FIGS. 1F and 1G is a safety basket attachment 1950 that can be connected to rear portions of the safety trucks 1000 when no TMA unit 1900 is attached to the rear of a particular one of the safety truck embodiments 1000.

The mounting component 1810 may also carry the display board attachment 1800, and provides a way in which the display board attachment 1800 and the TMA unit 1900 can be releasably connected to a selected one of the safety trucks 1000. The safety basket attachment 1950 may include a generally rectangular open-top basket structure fabricated from metal tubing and/or rods.

As is shown in FIG. 8F, the safety basket attachment 1950 may include a hitch receiver 1999 that may take the form of a square 2 inch by 2 inch (or larger) receiver tube that, depending at least on the strength of the connection between the safety basket 1950 and the associated safety truck embodiment 1000, may conform to the specifications for a class IA or IVY (or higher) trailer hitch promulgated by SER International. Thus, the hitch receiver 1999 may enable a trailer or other accessory to be connected to the rear of the safety truck 1000 through the safety basket 1950.

11) The Step Bumper Attachment 2000

Shown in FIGS. 1H, 8B, 8C and 8D is a step bumper attachment 2000 that can be connected to a rear region of one of the safety truck embodiments 1000 in place of the TMA unit 1900 and in place of the safety basket attachment 1950 to address low speed vehicle impacts, and to enable construction personnel to step onto and off of the flatbed 1040 of a safety truck 1000 quickly, easily and safely. A step surface is indicated by the numeral 2975 in FIGS. 8B and 8C.

Such a step bumper attachment 2000 can be attached to the rear of a safety truck 1000 when no TMA unit is connected to the rear of the safety truck 1000. The step bumper attachment 2000 serves the dual purposes of providing some degree of protection from minor vehicular impacts to the rear of a safety truck 1000, and provides a step at a level between the roadway surface and a flatbed surface 1040. The step bumper attachment 2000 permits roadway construction personnel to more safely climb onto the surface of the flatbed 1040, or to descend from the flatbed surface 1040 to the roadway surface on which the safety truck 1000 is being driven.

12) Cameras and Radar Speed Detection Attachments 1513

Schematically depicted in FIGS. 1E and 1I are a few of the many cameras and radar speed detection attachments 1513 that may be mounted on portions of safety truck embodiments 1000, or on various ones of the attachments to the safety truck embodiments 1000. Each of the many camera and speed detection attachments 1513 may be aimed at, and/or otherwise configured to capture real-time images of portions of the safety truck embodiments 1000, and/or portions of one or more lanes of a roadway surface being traversed by a safety truck embodiment 1000, including images of other vehicles that may be in motion in roadway lanes extending around one or both sides of the safety truck embodiment 1000.

Division C: Summary of The Use of Combination Safety Truck and TMA Units to Protect Workzones and Worksites The long list of connection points described above in Division A, taken together with the long list of attachments described above in Division B, provide considerable flexibility to create many different safety truck configurations 1000, including but not limited to the possible embodiments depicted in FIGS. 1A through 1I.

Further, the relative ease with which some of the attachments may be releasably connected to at least the front-most connection point 650, and the rearward connection points 800 and 850, enables further configuration and reconfiguration of safety truck embodiments 1000 in the field, including on roar and/or at worksites.

Through such flexibility of configuration, various embodiments of the safety truck 1000 may be configured in various ways to perform different safety enhancing functions at a roadway worksite at different times, as the safety needs of a particular roadway worksite change over time.

By way of example, an embodiment of the safety truck 1000 incorporating the over-cab storage rack 1200 and the man basket(s) 1600, 1650 or 1650, and to which a combination of the display board 1800 and the TMA 1900 has been attached, may initially be used to distribute warning signage and/or safety barriers along a portion of a roadway that leads up to the location of a worksite. More precisely, while one member of a team of construction personnel drives such an embodiment of the safety truck 1000 from within the cab 1020, another member of the team may stand on a lowered support surface 1601 or 1651 provided by a man basket 1600 or 1650, respectively, as such an embodiment of the safety truck 1000 is driven slowly alongside a portion of roadway to place warning signage and/or safety barriers in a manner that forms a boundary line thereof. Still another member of the team may stand upon a flatbed 1040 of the safety truck 1000 to retrieve stacks of barrel-type traffic delineators 895 from the over-cab rack 1200 to replenish the supply of traffic delineators 995 being placed by the team member standing within the man basket 1600 or 1650.

As is familiar to those skilled in the art, such a line of warning signage and/or traffic delineators 995 may define the boundaries of a worksite and/or to shift a lane of traffic to make needed room for the roadway worksite. Additionally, during such activity, the display board attachment 1800 may be deployed to provide visible warnings of at least the presence of such a slow moving embodiment of the safety truck 1000 to make motorists aware of the need to drive around the safety truck 1000.

Further, during such activity, the TMA unit attachment 1900 may be deployed to extend rearwardly from such an embodiment of the safety truck 1000 to provide a degree of protection against the impact of a vehicle driven by a motorist who somehow does not notice or does not take appropriate action in response to the warnings provided by the deployed display board attachment 1800.

By way of another example, an embodiment of the safety truck 1000 to which a combination of the display board attachment 1800 and the TMA unit attachment 1900 have been connected may be parked at a location along a roadway 999 that precedes a roadway worksite. While such an embodiment of the safety truck 1000 remains stationary at that location, the display board attachment 1800 may be deployed to provide visible notices of a reduced speed limit in the vicinity of the roadway worksite.

Additionally, a radar speed detection attachment 1513 may be connected to an embodiment of the safety truck 1000, and/or the display board attachment 1800 may incorporate radar to detect the speeds of oncoming vehicles. In such embodiments, the display board attachment 1800 may be used to display indications of the detected speeds of oncoming vehicles, and to display any of a variety of visual imagery and/or textual messages reminding the motorists driving the oncoming vehicles to obey the reduced speed limit, and/or to advise such motorists to be watchful for the presence of construction equipment, vehicles and/or personnel that may enter the path of the oncoming vehicles.

Further, while such an embodiment of the safety truck 1000 remains stationary, the TMA unit attachment 1900 may be deployed to extend rearwardly therefrom to provide some degree of protection against the impact of a vehicle driven by a motorist who somehow does not notice, or does not take appropriate action in response to the warnings and notice provided by the deployed display board attachment 1900.

Although a single one of the safety truck embodiments 1000 may provide various features that can be used to improve the safety or a roadway worksite, it may be deemed desirable and/or may be necessary to employ a line of safety trucks 1000 in a cooperative manner to more effectively do so.

Although it has been known in the prior art to use a single combination safety truck 100 and TMA unit 1900 to protect personnel working in and near a roadway workzone or worksite, this has not always provided either a proper or a complete solution to the problem of protecting personnel who are working in and relatively near to a workzone or worksite.

A first problem that arises when providing a combination safety truck and TMA unit (positioned just rearwardly from a workzone or worksite) to protect the workzone or worksite is that, when a roadway vehicle traveling a typically fast highway speed crashes into the TMA unit of a combination safety truck and TMA unit is that the very substantial kinetic energy of the fast-moving roadway vehicle is almost always sufficiently extreme as to NOT ONLY cause a crashed-into TMA unit to be crumpled, BUT ALSO to cause the crashed-into combination safety truck and TMA unit to roll forwardly after its TMA unit has crumpled. This "roll forwardly" problem can cause a workzone or worksite that was intended to be protected to be invaded by the combination safety truck and TMA unit that has been caused to "roll forwardly."

A similar problem can arise if a series of two or more combination safety trucks and TMA units are positioned just rearwardly from a workzone or worksite (that is intended to be protected), namely that, after the TMA unit of any one of the combination safety truck and TMA units has been crumpled, the crashed-into combination safety truck and TMA unit is caused to roll forwardly to either crash into a next combination safety truck and TMA unit and/or to cause the most forward-most of the combination safety trucks and TMA units to roll forwardly to invade the workzone or worksite that was intended to be protected.

To prevent such problems as are explained above, the inventors of the present invention have formulated the following guidelines that should be obeyed, namely that:

1) Not only should the forwardmost combination safety truck and TMA unit be spaced sufficiently far to the rear of a workzone or worksite (that is to be protected) to prevent the forwardmost combination safety truck and TMA unit from "rolling forwardly" to invade the workzone or worksite (that is to be protected), but also that:

2) All combination safety truck and TMA units in a series of combination safety truck and TMA units (positioned to the rear of a workzone or worksite that is to be protected) must be spaced sufficiently far to the rear of other adjacent ones of the combination safety truck and TMA units so that no "rolling forwardly" of the combination safety trucks and TMA units will cause anything more than crumpling of the TMA units (of the spaced series of combination safety trucks and TMA units).

3) As an additional safeguard, weight attachments 1420 such as are shown in FIG. 3A may be inserted into the compartments 1475 of the weight frame attachment 1400 to increase the inertia of the associated safety trucks 1000 so the trucks can better resist the tendencies of these associated safety trucks 1000 to "roll forwardly"—which will minimize the distances through which these safety trucks 1000 "roll forwardly" to thereby minimize the problems that are explained above.

As still another safeguard, only the forwardmost one of the combination safety truck and TMA units should carry any personnel on the flatbed 1040 and in the man basket(s) 1600, 1650 and/or 2650, and each of the other ones of the combination safety truck and TMA units should carry personnel only within the cab 1020. This serves to reduce the possibility that personnel may be hit with flying debris from a vehicular collision with the rearmost one of the combination safety truck and TMA unit. This also takes advantage of the fact that the forwardmost one of the combination safety truck and TMA unit will be subjected to the lowest magnitude of kinetic energy from a vehicular crash with the TMA unit of the rearmost one of the combination safety truck and TMA unit. As a result, personnel standing atop the flatbed 1040 and/or in the man basket(s) 1600, 1650 and/or 2650 of the forwardmost one of the combination safety truck and TMA unit are least likely to be thrown therefrom during such a vehicular crash.

If the guidelines explained just above are followed, the damage to safety trucks can usually be limited to a progressive and sequential crumpling of TMA units when one or more combination safety truck and TMA units are provided to protect a particular workzone or worksite, AND will ensure that the protected workzones and worksites are not invaded by front-most ones of the safety trucks 1000 as to cause injuries to personnel working within and near to the protected workzones and worksites.

FIG. 9 depicts an example of a deployment of a line of safety trucks 1000a, 1000b and onward to 1000x that are each equipped with a TMA unit 1900, and that are positioned end-to-end at a location along a reach of roadway 999 that precedes (i.e., leads up to) the location of a roadway worksite. If the TMA unit of the rearward-most safety truck 1000a is hit from behind by an oncoming vehicle at moving at highway speed, the TMA unit thereof may absorb an initial significant amount of the kinetic energy exerted on the TMA unit of the rearmost safety truck 1000a, while much of the rest of that kinetic energy may cause the rearmost safety truck 1000a to roll forwardly and collide with the TMA unit of the next safety truck 1000b in the line of safety trucks. The TMA unit of the next safety truck 1000b in the line of safety trucks may then absorb another significant portion of the kinetic energy so that, even if the next safety truck 1000b in that line is also caused to roll forwardly, it will be at a significantly reduced speed compared to the speed at which the rearmost safety truck 1000a was caused to roll forward. As that next safety truck 1000b in the line is caused to roll forwardly, the TMA unit of still another safety truck 1000 (e.g., the depicted safety truck 1000x, or another intervening safety truck that is not shown) in the line may then absorb still more of the kinetic energy, and so on.

This combination of absorption and transfer of portions of an ever diminishing amount of kinetic energy among the safety trucks 1000a through 1000x in such a line may continue to propagate through that line until the TMA unit of the forwardmost safety truck 1000x may also be impacted and absorb much of the greatly diminished remainder of the kinetic energy from the collision so that the forward-most safety truck 1000x may not move at all. As a result, personnel, construction machinery and/or construction vehicles (such as the depicted safety truck 1000z) located in front of the forward-most safety truck 1000x of the depicted line of safety trucks are protected from the collision.

The same protections that are provided to a roadway worksite by a stationary line of safety trucks 1000a through 1000x may also be provided to a slow moving vehicle associated with a roadway worksite, such as the aforedescribed example of a slow moving one of the safety trucks 1000 employed to carry personnel who are placing a line of warning signage and/or safety barriers along a lengthy portion of roadway leading up to a roadway worksite. More specifically, it may be deemed desirable to position such a slow moving safety truck 1000 as the forward-most safety truck 1000x in a line of safety trucks 1000a through 1000x (again referring to FIG. 9), where the entire line of safety trucks 1000a through 1000x moves slowly in unison. In this way, personnel standing on the flatbed 1040 and/or within the man basket(s) 1600, 1650 and/or 2650 of the forward-most safety truck 1000x are protected from at least the majority of the kinetic energy that would be exerted in a collision of a vehicle with the TMA unit 1900 of the rearmost safety truck 1000a.

Further, where the quantity of warning signs and/or safety barriers to be placed along the roadway 999 is sufficiently large that no one safety truck 1000 is able to carry all of them, the relative positions of the safety trucks 1000a through 1000x within the line of safety trucks may be changed as the supply of warning signs and/or safety barriers carried within each of the safety trucks is exhausted so that whichever one of the safety trucks 1000a through 1000x is currently employed in placing the warning signs and/or safety barriers is always at the forward-most position in the line of safety trucks (i.e., becomes the forward-most safety truck 1000x).

Correspondingly, the depicted line of safety trucks 1000a through 1000x may, at another time, be driven slowly and in unison to pick up a line of warning signage and/or safety barriers along a lengthy reach of roadway, instead of placing them. More specifically, it may be deemed desirable to position a slow moving safety truck 1000 that is being utilized to pick up such warning signage and/or barriers from a roadway surface as the forward-most safety truck 1000x in such a slow moving line of safety trucks 1000a through 1000x.

Again, the personnel standing on the flatbed 1040 and/or within the man basket(s) 1600, 1650 and/or 2650 of the forward-most safety truck 1000x are protected from at least the majority of the kinetic force that would be exerted in a collision of a vehicle with the TMA unit 1900 of the rearmost safety truck 1000a. Further, where the quantity of warning signs and/or safety barriers to be placed along the roadway 999 is sufficiently large that no one safety truck 1000 is able to carry all of them, the relative positions of the safety trucks 1000a through 1000x within the line of safety trucks may be changed as each of the depicted safety trucks is filled to its capacity with warning signs and/or safety barriers collected from atop the roadway 999 so that whichever one of the safety trucks 1000a through 1000x is currently employed in picking up the warning signs and/or safety barriers is always at the forward-most position in the line of safety trucks (i.e., becomes the forward-most safety truck 1000x).

Regardless of whether such a line of safety trucks 1000a through 1000x are employed to provide protection while stationary or while moving, more than one of the safety trucks 1000a through 1000x may also have a display board attachment 1800 carried thereby and deployed such that a line of display board attachments 1800 is operated to display warning messages or detected vehicular speeds, etc. in an effort to provide an even more conspicuous visual notice of the upcoming roadway worksite, and of the need for motorists to slow down and/or alter their path of travel while passing the roadway worksite.

Where such a set of the safety trucks 1000 are used in such a cooperative manner, wireless communications may be employed amount those safety trucks 1000 to enable voice communications between the teams of personnel who are associated with different ones of those safety trucks, to enable data to be shared thereamong for recording, and/or to enable warnings of impending vehicular collisions and/or other vehicle-related dangers to be relayed thereamong.

As an alternative to the depicted line of safety trucks 1000a through 1000x being utilized solely for purposes of providing protection for either a stationary or a slow rolling worksite, in other embodiments, such a line of safety trucks may be more directly involved in the performance of the work at a rolling worksite in addition to performing their various safety functions. More specifically, the forward-most safety truck 1000x may, itself, be involved in the actual work of a slow rolling worksite with the remainder of the safety trucks positioned behind it providing protection for it against a vehicular crash.

By way of example, at least the forward-most safety truck 1000x may be equipped with one or more of the man baskets 2650 by which a member of working personnel may be positioned relatively close to the roadway surface to perform such work as installing and/or replacing a line of the roadway reflectors 997 that cooperate with painted lines 998

(shown in FIG. 7F) to define separate lanes of a roadway surface 999, as previously explained.

As with the above example of placing a line of warning signage and/or safety barriers, supplies of new roadway reflectors 997 and the various adhesives and/or anchoring hardware used to affix the reflectors 997 to the roadway surface 999 are exhaustable resources of which the forward-most safety truck 1000x can carry only finite amounts. Thus, as with the above example of placing a line of warning signage and/or safety barriers, as the supply of new roadway reflectors 997, and/or the supply of associated adhesives and/or anchoring hardware, carried by the forward-most safety truck 1000x is exhausted, the positions of the forward-most safety truck 1000x and another of the safety trucks in the line of safety trucks that is fully supplied with new reflectors 997 and associated adhesives and/or anchoring hardware may be exchanged to cause that other one of the safety trucks in the line to become the new forward-most safety truck 1000x.

Again, in this way, the guideline that only the forward-most safety truck 1000x is permitted to have personnel stationed on its flatbed 1040 and/or within such open and vulnerable positions aboard one of the other safety trucks that is located closer within the line to where a vehicle may collide with the TMA unit of the rearmost safety truck 1000a.

Further, the relative ease with which at least some attachments needed by the forward-most safety truck 1000x are able to be quickly and efficiently switched among the safety trucks within the line of safety trucks 1000a through 1000x may enable those attachments to always be releasably attached to whichever one of the safety trucks within the line becomes the forward-most safety truck 1000x.

By way of example, the rumble strip basket attachment 1100 may be releasably connected to the forward-most attachment point 650 of the forward-most safety truck 1000x in embodiments in which the forward-most safety truck 1000x is employed to install a lengthy set of rumble strips (e.g., sets of rumble strips that occupy a shoulder of a highway to discourage improper use thereof).

As has been discussed in regard to other exhaustable resources that may be carried by the forward-most safety truck 1000x, as the supply of rumble strips carried by the forward-most safety truck 1000x is exhausted, the forward-most safety truck 1000x may be exchanged with another of the safety trucks within the line of safety trucks 1000a through 1000x such that the other of those safety trucks becomes the new forward-most safety truck 1000x. As part of this exchange of safety trucks, the rumble strip basket attachment 1100 may be detached from the forward-most connection point 650 of the safety truck 100 that is to cease being the forward-most safety truck 1000x, and then attached to the forward-most connection point 650 of the other safety truck that then becomes the forward-most safety truck 1000x.

Still further, the relative ease with which at least some attachments needed by each of the safety trucks within the line of safety trucks 1000a through 1000x depicted in FIG. 9 are able to be quickly and efficiently switched between the safety trucks within the line and others that are not may enable those attachments to be releasably attached to a safety truck that is exchanged for one within the line of safety trucks 1000a through 1000x that needs to be pulled out of the line.

By way of example, it may be that one of the safety trucks within the line of safety trucks 1000a through 1000x develops a mechanical problem or other issue that requires its replacement with another safety truck that is not already within the line, and that may not already be specifically configured for inclusion in the line (e.g., the safety truck 1000z, which as previously discussed, may be involved in other work at the worksite). At a minimum, the provision of the rearward connection points 800 and/or 850 may improve the ease with which attachments that are connected thereto on both trucks involved in such an exchange may be detached and switched therebetween. Thus, for example, the depicted safety truck 1000z with its safety basket attachment 1950 may be swapped for the TMA unit 1900 attached to the one of the safety trucks within the line that the safety truck 1000z is to replace, thereby allowing the replaced safety truck from the line to be driven (or towed, if need be) to where the mechanical problem can be addressed.

It should be noted, however, that mechanical problems are not the only reason why safety trucks within the line of safety trucks 1000a through 1000x may need to be replaced. For example, where the line of safety trucks 1000a through 1000x are operated to more in unison in support of slowly moving worksite, and/or to place or pick up a line of warning signage and/or safety barriers, it may be that each of the safety trucks within the line must be replaced to allow each to be driver to a refueling station or other location for refueling. The aforedescribed ability to relatively easily switch at least TMA units 1900 between safety trucks that are used to replace those within the line and that are replaced may greatly reduce the effort required to do so.

Although the invention has been described in a preferred form with particularity, it is understood that the present disclosure of the preferred form has been made only by way of example, and that numerous changes in the details of construction and the combination and arrangement of parts may be resorted to without departing from the spirit and scope of the invention.

What is claimed is:

1. A flatbed safety truck, comprising:
    a) a forwardly-facing cab containing controls for driving the safety truck along a roadway surface;
    b) a rearwardly extending flatbed located behind the forwardly-facing cab, defining a generally flat surface atop which roadway safety items including at least one of traffic delineators, components of roadway warning signs, and components of traffic barriers may be transported;
    c) an upstanding bulkhead connected to a forward end region of the rearwardly extending flatbed;
    d) an arrow board attachment interposed between the cab and the upstanding bulkhead, with the arrow board being connected to and supported by a pair of elongate channel members that define a frame of the safety truck that extends beneath and supports both the cab and the flatbed; and
    e) at least one connection point defined by at least one of the forwardly-facing cab, the rearwardly extending flatbed, the upstanding bulkhead, the frame, and the arrow board attachment, to which at least one of a group of attachments may be coupled.

2. The flatbed safety truck of claim 1 wherein a structure that supports the arrow board attachment atop the frame is provided with a mechanism for selectively raising and lowering the arrow board of the arrow board attachment between a raised display position above the upstanding bulkhead to enable information displayed by the arrow board to be viewed by drivers of vehicles on the roadway surface behind the safety truck, and a lowered transport position.

3. The flatbed safety truck of claim 1 wherein the group of attachments includes attachments that each provide a stand-on surface located below the flatbed surface and above the roadway surface when coupled to a connection point of the safety truck, including at least one of a man-basket attachment, a step-bumper attachment, and a safety basket attachment.

4. The flatbed safety truck of claim 3 additionally including means for selectively raising and lowering the stand-on surface.

5. The flatbed safety truck of claim 1 wherein the group of attachments includes at least one of a rumble strip basket attachment, a display board attachment, a man-basket attachment, a step-bumper attachment, a TMA unit attachment, a camera attachment, a radar speed detection attachment, and a safety basket attachment.

6. A roadway work site safety truck comprising:
an arrow board supported on a chassis frame of the safety truck at a location between a rear portion of a cab of the safety truck and a front-most portion of a flat bed of the safety truck;
a first man basket mounted within a first inset formed in a flat bed of the safety truck along one of a left side and a right side of the safety truck to provide a first support platform at a level below the flat bed and a second support platform at a level below the first support platform to enable a first member of construction personnel standing on the second support platform to ergonomically move barrel-type safety barriers between a roadway surface and the first support platform, and to enable a second member of the construction personnel to ergonomically move the barrel-type safety barriers between the first support platform and the flat bed;
a sign cage mounted to the flat bed to store components of warning signs to be placed on the roadway; and
a truck-mounted attenuator (TMA) releasably connected to the rear portion of the safety truck, and movable between a stowed position for travel of the safety truck along a roadway and a deployed position to enhance safety of the roadway work site in which the TMA extends rearward from the safety truck to absorb kinetic energy of an approaching vehicle colliding with the TMA at the rear of the safety truck.

7. The safety truck of claim 6, further comprising a second man basket that is configured to be a mirror image of the first man basket, and that is mounted within a second inset formed in the flat bed along the other of the left side and the right side of the safety truck at a location therealong that is opposite the first man basket, to also provide two supports platforms at differing levels below the flat bed to also enable ergonomic movement of the barrel-type safety barriers.

8. The safety truck of claim 6, wherein the sign cage is also mounted to a rearwardly facing surface of a bulkhead of the safety truck that separates a front-end of the flat bed from the a rear portion of the cab, wherein the sign cage is fabricated with an open front that is to be closed by the bulkhead when the sign cage is mounted to the bulkhead and an open bottom that is to be closed by the flat bed when the sign cage is mounted to the flat bed.

9. The safety truck of claim 6, wherein:
the TMA comprises multiple elongate sections that are connected by hinge components;
the TMA folds up and over the rear end of the safety truck when moved to the stowed position of the TMA; and
one of the multiple elongate sections rests atop a TMA support post that extends upwardly from a rearward portion of the flat bed when the TMA is moved to the stowed position of the TMA.

10. The safety truck of claim 6, further comprising a mounting point carried at the rear end of the safety truck to engage a mating mounting point carried by the TMA to enable the TMA to be releasably attached to the rear of the safety truck at the location of the mounting point carried by the TMA truck.

11. The safety truck of claim 10, wherein a safety basket that also a carries a mating mounting point is able to be mounted to releasably attached to the rear of the TMA truck at the mounting carried by the TMA truck in place of the TMA.

12. A method of protecting a rolling roadway worksite at which road construction or maintenance work is performed, the method comprising:
positioning a plurality of safety trucks end-to-end in a line along a portion of the roadway leading up to the roadway worksite, wherein:
each safety truck in the line of safety trucks includes a rearward connection point at a rearmost portion of the safety truck, and to which a variety of attachments may be connected;
the variety of attachments includes at least a truck-mounted attenuator (TMA);
each safety truck in the line of safety trucks carries a TMA attached to its rearward connection point, and deployed to extend horizontally rearwardly over the roadway from the rearward connection point; and
at least one safety truck in the line of safety trucks carries at least one of an arrow board and a display board to provide a visual warning of the roadway worksite to a driver of a vehicle on a portion of the roadway behind the rearmost safety truck in the line of safety trucks;
operating the safety trucks in the line of safety trucks to move in unison along the roadway to maintain the end-to-end line of safety trucks, wherein:
between each pair of adjacent safety trucks in the line of safety trucks, a front end of the rearward safety truck of the pair is aligned with the TMA of the forward safety truck of the pair such that the TMA of the forward safety truck of the pair is interposed between the pair to enable the front end of the rearward safety truck of the pair to collide with the TMA of the forward safety truck of the pair; and
upon an occurrence of a collision of a vehicle with the TMA of the rearmost safety truck in the line of safety trucks, the kinetic energy imparted by the collision to the TMA of the rearmost safety truck is dissipated among a succession of TMAs among the line of safety trucks as each TMA in the succession of TMAs is crumpled, and is dissipated among a succession of the safety trucks in the line of safety trucks as inertia of each safety truck in the succession of safety trucks is overcome by a portion of the kinetic energy; and
in response to depletion of a resource carried by the forward-most safety truck in the line of safety trucks, exchanging the forward-most safety truck in the line of safety trucks with another one of the safety trucks in the line of safety trucks such that the other one of the safety trucks becomes the new forward-most safety truck, wherein the resource comprises at least one of a supply of a safety item for use in providing protection to the worksite and a supply of a component of the roadway.

13. The method of claim 12 wherein:

each safety truck in the line of safety trucks includes at least one of a flat bed atop which personnel may stand and a man basket that provides a standing surface atop which personnel may stand;

the method further comprise permitting personnel to stand atop a flat bed or a standing surface of a man basket of only the forward-most safety truck in the line of safety trucks to mitigate possibilities for injury; and exchanging the forward-most safety truck in the line of safety trucks with the other one of the safety trucks comprises permitting personnel to stand atop a flat bed or standing surface of a man basket of only the other one of the safety trucks.

14. The method of claim 12 wherein:

the resource comprises a supply of rumble strips to be affixed onto a surface of the roadway or of a shoulder of the roadway;

each safety truck in the line of safety trucks includes a forward connection point at a forward-most portion of the safety truck to which a rumble strip basket may be attached to assist personnel in affixing the supply of rumble strips onto the surface of the roadway or of the shoulder; and exchanging the forward-most safety truck in the line of safety trucks with the other one of the safety trucks comprises:

detaching the rumble strip basket from the forward connection point of the forward-most safety truck; and attaching the rumble strip basket to the forward connection point of the other one of the safety trucks.

15. The method of claim 12 wherein:

each safety truck in the line of safety trucks includes a radar to detect a speed of an approaching vehicle on the roadway;

each safety truck in the line of safety trucks includes a display board capable of displaying an indication of the detected speed to a driver of the approaching vehicle;

the method further comprises using the radar and the display board of the rearmost safety truck in the line of safety trucks to detect and display speeds of approaching vehicles; and exchanging the forward-most safety truck in the line of safety trucks within the other of the safety trucks comprises:

exchanging the forward-most safety truck with the rearmost safety truck;

discontinuing use of the radar and the display of the rearmost safety truck to detect and display speeds of approaching vehicles; and commencing use of the radar and the display of the forward-most safety truck to detect and display speeds of approaching vehicles.

16. The method of claim 12 wherein the resource comprises at least one of:

a supply of safety barriers used to redirect a flow of traffic on the roadway around the worksite;

a supply of rumble strips;

a supply of roadway reflectors for installation onto the roadway;

a supply of mounting hardware to affix rumble strips or roadway reflectors onto the roadway;

a supply of liquid roadway material or an adhesive compound to affix rumble strips or roadway reflectors onto the roadway; and a supply of paint for paint of stripes onto the roadway.

17. The method of claim 12 wherein the method further comprises, in response to depletion of fuel of the forward-most safety truck in the line of safety trucks down to a pre-selected amount of fuel remaining, exchanging the forward-most safety truck in the line of safety trucks with another safety truck not included in the line of safety trucks such that the other safety truck becomes the new forward-most safety truck, wherein exchanging the foreword-most safety truck with the other safety truck not included in the line of safety trucks comprises:

detaching the TMA from the rearward connection point of the forward-most safety truck; and attaching the TMA to the rearward connection point of the other safety truck.

18. A method of protecting a stationary roadway worksite at which road construction or maintenance work is performed, the method comprising:

positioning a plurality of safety trucks end-to-end in a stationary line along a portion of the roadway leading up to the roadway worksite, wherein:

each safety truck in the line of safety trucks includes a rearward connection point at a rearmost portion of the safety truck, and to which a variety of attachments may be connected;

the variety of attachments includes at least a truck-mounted attenuator (TMA);

each safety truck in the line of safety trucks carries a TMA attached to its rearward connection point, and deployed to extend horizontally rearwardly over the roadway from the rearward connection point;

between each pair of adjacent safety trucks in the line of safety trucks, a front end of the rearward safety truck of the pair is aligned with the TMA of the forward safety truck of the pair such that the TMA of the forward safety truck of the pair is interposed between the pair to enable the front end of the rearward safety truck of the pair to collide with the TMA of the forward safety truck of the pair;

at least one safety truck in the line of safety trucks carries at least one of an arrow board and a display board to provide a visual warning of the roadway worksite to a driver of a vehicle on a portion of the roadway behind the rearmost safety truck in the line of safety trucks; and upon an occurrence of a collision of a vehicle with the TMA of the rearmost safety truck in the line of safety trucks, the kinetic energy imparted by the collision to the TMA of the rearmost safety truck is dissipated among a succession of TMAs among the line of safety trucks as each TMA in the succession of TMAs is crumpled, and is dissipated among a succession of the safety trucks in the line of safety trucks as inertia of each safety truck in the succession of safety trucks is overcome by a portion of the kinetic energy; and in response to depletion of fuel of one of the safety trucks in the line of safety trucks down to a pre-selected amount of fuel remaining, exchanging the one of the safety trucks with another safety truck not included in the line of safety trucks, wherein exchanging the one of the safety trucks in the line of safety trucks with the other safety truck not included in the line of safety trucks comprises:

detaching the TMA from the rearward connection point of the one of the safety trucks in the line of safety trucks; and attaching the TMA to the rearward connection point of the other safety truck.

19. The method of claim 18 wherein:

the at least one safety truck in the line of safety trucks that carries at least one of an arrow board and a display board comprises the one of the safety trucks in the line of safety trucks that is exchanged with the other safety truck; and exchanging the one of the safety trucks in the line of safety trucks with the other safety truck comprises:

detaching the at least one of the arrow board and the display board, along with the TMA, from the rearward connection point of the one of the safety trucks in the line of safety trucks; and attaching the at least one of the arrow board and the display board, along with the TMA, to the rearward connection point of the other safety truck.

20. The flatbed safety truck of claim 1 additionally including an over-cab rack attachment for transporting a plurality of side-by-side sets of nested traffic delineators for deployment from the safety truck when the safety truck is operated as the forward-most safety truck in a plurality of safety trucks positioned end-to-end to protect a rolling roadway worksite.

21. The flatbed safety truck of claim 1 additionally including an auxiliary electrical generator attachment connected to the safety truck at a location below the flatbed surface for supplying auxiliary electrical power to at least one of the safety truck and an attachment connected to the safety truck.

22. The safety truck of claim 6 wherein the first man-basket attachment includes at least one of a throttle control to enable control of a speed of movement of the safety truck from within the first man-basket attachment and a brake control to enable stopping of the safety truck from within the first man-basket attachment.

23. The safety truck of claim 22 wherein the first man-basket attachment includes a display to present images captured by a camera attachment of a portion of the roadway surface either in front of the safety truck or behind the safety truck to be displayed within the first man-basket attachment.

24. The method of claim 14 wherein either the safety truck or an attachment connected to at least one of the connection points includes a mechanism for selectively raising and lowering a stand-on surface of said attachment.

25. The method of claim 12 wherein at least one safety truck of the plurality of safety trucks additionally includes at least one weight attachment connected to the frame to increase the mass of the at least one safety truck to aid in the dissipation kinetic energy among the succession of the safety trucks upon the occurrence of a collision of a vehicle with the TMA of the rearmost safety truck.

26. The method of claim 18 wherein at least one safety truck of the plurality of safety trucks additionally includes at least one weight attachment connected to the frame to increase the mass of the at least one safety truck to aid in the dissipation kinetic energy among the succession of the safety trucks upon the occurrence of a collision of a vehicle with the TMA of the rearmost safety truck.

27. The method of claim 18 wherein at least one safety truck of the plurality of safety trucks additionally includes an auxiliary electrical generator attachment connected to the at least one safety truck at a location below the flatbed surface for supplying auxiliary electrical power to at least one of the at least one safety truck and an attachment connected to the at least one safety truck.

\* \* \* \* \*